(12) United States Patent
Tomita

(10) Patent No.: US 7,185,811 B2
(45) Date of Patent: Mar. 6, 2007

(54) INFORMATION PROVIDING SYSTEM AND METHOD, INFORMATION PROCESSING APPARATUS AND METHOD, DISPLAY APPARATUS AND METHOD, AND PROGRAM

(75) Inventor: Nobuyoshi Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 131 days.

(21) Appl. No.: 10/860,490

(22) Filed: Jun. 4, 2004

(65) Prior Publication Data

US 2005/0017072 A1    Jan. 27, 2005

(30) Foreign Application Priority Data

Jun. 9, 2003  (JP) ............................. 2003-163120
Jun. 13, 2003 (JP) ............................. 2003-168707

(51) Int. Cl.
*G06F 19/00* (2006.01)
(52) U.S. Cl. ................. 235/385; 235/435; 235/472.02; 235/492; 705/1; 705/26
(58) Field of Classification Search ................ 235/451, 235/472.02
See application file for complete search history.

(56) References Cited

U.S. PATENT DOCUMENTS

| 6,550,672 B1 * | 4/2003 | Tracy et al. ................. 235/383 |
| 2002/0002504 A1 * | 1/2002 | Engel et al. .................. 705/26 |
| 2002/0065680 A1 * | 5/2002 | Kojima et al. ................. 705/1 |

* cited by examiner

*Primary Examiner*—Seung Ho Lee
(74) *Attorney, Agent, or Firm*—Oblon, Spivak, McClelland, Maier & Neustadt, P.C.

(57) ABSTRACT

An information providing or processing system and method is disclosed which can provide information conforming to liking of a user to the user. If the user brings a contactless IC card, in which a user ID of the user is stored, close to a contactless IC tag mounted on a favorite commodity in a selling agent, then the contactless IC card acquires and stores a commodity ID stored in the contactless IC tag. Then, if the user brings the contactless IC card close to an information providing apparatus, then the information providing apparatus acquires the user ID and the commodity ID from the contactless IC card. Thereafter, the information providing apparatus acquires user information corresponding to the user ID from a customer information management server and acquires commodity information corresponding to the commodity ID from a commodity information management server. Then, the information providing apparatus produces and displays provision information conforming to the liking of the user. The invention can be applied to a system which utilizes an IC card.

28 Claims, 40 Drawing Sheets

| USER ID | USER INFORMATION |
|---------|------------------|
| USER A  | USER INFORMATION A |
| USER B  | USER INFORMATION B |
| USER C  | USER INFORMATION C |
| USER D  | USER INFORMATION D |

150 (1103)

| COMMODITY ID | COMMODITY INFORMATION |
|---|---|
| COMMODITY A | COMMODITY INFORMATION A |
| COMMODITY B | COMMODITY INFORMATION B |
| COMMODITY C | COMMODITY INFORMATION C |
| COMMODITY D | COMMODITY INFORMATION D |

| USER ID | 103176 |
|---|---|
| SEX | MALE |
| AGE GROUP | FROM 25 TO 29 |
| LIKING INFORMATION — SPORTS | SOCCER |
| LIKING INFORMATION — CLOTHES | WHITE T-SHIRT |

| COMMODITY ID | 9726420 |
|---|---|
| CATEGORY | T-SHIRT |
| MAKER | XX CLOTHING |
| COLOR | WHITE |
| SIZE | M SIZE |

| GENRE ID | BOOK ID | BOOK INFORMATION |
|---|---|---|
| GENRE A | BOOK E | BOOK INFORMATION E |
|  | BOOK F | BOOK INFORMATION F |
| GENRE B | BOOK G | BOOK INFORMATION G |
|  | BOOK H | BOOK INFORMATION H |
| GENRE C | BOOK I | BOOK INFORMATION I |
|  | BOOK J | BOOK INFORMATION J |
| GENRE D | BOOK K | BOOK INFORMATION K |
|  | BOOK L | BOOK INFORMATION L |

1253

| USER ID | GENRE ID |
|---|---|
| USER A | GENRE A |
| | GENRE B |
| | GENRE C |
| | GENRE D |

| BOOK ID | 9726420 |
|---|---|
| GENRE | NOVEL |
| AUTHOR | SOSEKI NATSUBI |
| AGE GROUP | FROM 18 TO 25 |
| AMOUNT OF MONEY | 500 YEN |

FIG. 39

| USER ID | | 103176 |
|---|---|---|
| SEX | | MALE |
| AGE GROUP | | FROM 21 TO 25 |
| LIKING INFORMATION | NOVEL | SOSEKI NATSUBI |
| | COMICS | DORIEMON |
| | SPORTS | SOCCER |

FIG. 44

| FLAG | BOOK ID | BOOK INFORMATION |
|------|---------|------------------|
| 1 | BOOK M | BOOK INFORMATION M |
| 0 | BOOK N | BOOK INFORMATION N |
| 1 | BOOK O | BOOK INFORMATION O |
| 1 | BOOK P | BOOK INFORMATION P |
| 1 | BOOK Q | BOOK INFORMATION Q |

1803

INFORMATION PROVIDING SYSTEM AND METHOD, INFORMATION PROCESSING APPARATUS AND METHOD, DISPLAY APPARATUS AND METHOD, AND PROGRAM

BACKGROUND OF THE INVENTION

This invention relates to an information providing system and method, an information processing apparatus and method, a display apparatus and method and a program, and more particularly to an information providing system and method, an information processing apparatus and method, a display apparatus and method and a program which allow provision of information conforming to liking of a user to the user.

Usually, when a user purchases a commodity, the user goes to a selling agent in which commodities are presented for sales, actually accesses the commodities there and purchases those commodities which the user wants to acquire.

As a service on the selling agent side in such an instance as just described, for example, a service of specifying the position of the user in the selling agent through an access point and allowing a portable information terminal possessed by the user to display details of commodities near to the position of the user has been proposed.

Further, an information transmitting system is disclosed, for example, in Japanese Patent Laid-Open No. 2003-85494 wherein a radio tag is used as a medium for information and an advertisement or a guide in a local area is transmitted to a user.

The information transmitting system, however, is disadvantageous in that, since the selling agent side cannot know a taste or liking of a user, it is difficult to provide information conforming to the taste or liking of the user.

The information transmitting system further has a problem in that the selling agent side cannot provide information for reliably supporting the act of the user of choosing commodities from among commodities actually existing in the selling agent either.

SUMMARY OF THE INVENTION

It is an object of the present invention to provide an information providing system and method, an information processing apparatus and method, a display apparatus and method and a program by which information conforming to liking of a user can be provided to the user.

In order to attain the object described above, according to a first aspect of the present invention, there is provided an information providing system comprising a first information processing apparatus for utilizing electromagnetic induction to transmit first information, a second information processing apparatus for utilizing electromagnetic induction to receive the first information from the first information processing apparatus and transmit the first information and second information, and a display apparatus for utilizing electromagnetic induction to receive the first and second information from the second information processing apparatus, the first information processing apparatus including first storage means for storing the first information including at least identification information corresponding to an object on which the first information processing apparatus is mounted, and first transmission means for utilizing electromagnetic induction to transmit the first information stored in the first storage means to the second information processing apparatus, the second information processing apparatus including first reception means for utilizing electromagnetic induction to receive the first information transmitted from the first transmission means, second storage means for storing the second information including identification information of a user, and second transmission means for transmitting the first information received by the first reception means and the second information stored in the second storage means to the display apparatus, the display apparatus including second reception means for receiving the first and second information transmitted from the second transmission means, production means for producing provision information corresponding to the user based on the first and second information received by the second reception means, and display means for performing a displaying process based on the provision information produced by the production means.

According to a second aspect of the present invention, there is provided an information providing method for an information providing system which includes a first information processing apparatus for utilizing electromagnetic induction to transmit first information stored therein, a second information processing apparatus for utilizing electromagnetic induction to receive the first information from the first information processing apparatus and transmitting second information stored therein together with the first information, and a display apparatus for utilizing electromagnetic induction to receive the first and second information from the second information processing apparatus, comprising a step performed by the first information processing apparatus of utilizing electromagnetic induction to transmit the stored first information including at least identification information corresponding to an object on which the first information processing apparatus is mounted to the second information processing apparatus, a step performed by the second information processing apparatus of utilizing electromagnetic induction to receive the transmitted first information and transmitting the first information and the stored second information including identification information of a user to the display apparatus, and a step performed by the display apparatus of receiving the first and second information transmitted from the second information processing apparatus, producing provision information corresponding to the user based on the received first and second information, and performing a displaying process based on the produced provision information.

In the information providing system and method, the first information processing apparatus utilizes electromagnetic induction to transmit first information stored therein and including at least identification information corresponding to an object on which the first information processing apparatus is mounted to the second information processing apparatus. The second information processing apparatus receives the first information and transmits the first information and second information stored therein and including identification information of a user to the display apparatus. The display apparatus receives the first and second information and produces and displays provision information corresponding to the user based on the received first and second information.

With the information providing system and method, information corresponding to a user can be provided to the user. Particularly, the display apparatus can produce provision information corresponding to the user based on information including at least corresponding identification information and information including identification information of the user.

According to a third aspect of the present invention, there is provided an information processing apparatus which utilizes electromagnetic induction to transmit information, comprising reception means for utilizing electromagnetic induction to receive first information including at least identification information corresponding to an object on which a first different information processing apparatus is mounted from the first different information processing apparatus, storage means for storing second information including identification information of a user in advance and storing the first information received by the reception means, and transmission means for utilizing electromagnetic induction to transmit the first and second information stored in the storage means to a second different information processing apparatus.

According to a fourth aspect of the present invention, there is provided an information processing method for an information processing apparatus which utilizes electromagnetic induction to transmit information, comprising the steps of utilizing electromagnetic induction to receive first information including at least identification information corresponding to an object on which a first different information processing apparatus is mounted from the first different information processing apparatus, storing the received first information, and utilizing electromagnetic induction to transmit the stored first information together with second information stored in advance and including identification information of a user to a second different information processing apparatus.

According to a fifth aspect of the present invention, there is provided a program for controlling an information processing apparatus which utilizes electromagnetic induction to transmit information, the program causing a computer to execute the steps of utilizing electromagnetic induction to receive first information including at least identification information corresponding to an object on which a first different information processing apparatus is mounted from the first different information processing apparatus, storing the received first information, and utilizing electromagnetic induction to transmit the stored first information together with second information stored in advance and including identification information of a user to a second different information processing apparatus.

In the information processing apparatus and method and the program, electromagnetic induction is utilized to receive first information including at least identification information corresponding to an object on which a first different information processing apparatus is mounted from the first different information processing apparatus, and the received first information is stored. Then, electromagnetic induction is utilized to transmit the stored first information together with second information stored in advance and including identification information of a user to a second different information processing apparatus.

With the information processing apparatus and method and the program, information including at least identification information corresponding to an object and information stored in advance and including identification information of a user can be transmitted.

According to a sixth aspect of the present invention, there is provided a display apparatus which utilizes electromagnetic induction to receive information, comprising reception means for utilizing electromagnetic induction to receive first information including identification information of a user and second information including identification information corresponding to an object on which a first different information processing apparatus is mounted from a second different information processing apparatus, production means for producing provision information corresponding to the user based on the first and second information received by the reception means, and display means for performing a displaying process based on the provision information produced by the production means.

According to a seventh aspect of the present invention, there is provided a display method for a display apparatus which utilizes electromagnetic induction to receive information, comprising the steps of utilizing electromagnetic induction to receive first information including identification information of a user and second information including identification information corresponding to an object on which a first different information processing apparatus is mounted from a second different information processing apparatus, producing provision information corresponding to the user based on the received first and second information, and performing a displaying process based on the produced provision information.

According to an eighth aspect of the present invention, there is provided a program for controlling a display apparatus which utilizes electromagnetic induction to receive information, the program causing a computer to execute the steps of utilizing electromagnetic induction to receive first information including identification information of a user and second information including identification information corresponding to an object on which a first different information processing apparatus is mounted from a second different information processing apparatus, producing provision information corresponding to the user based on the received first and second information, and performing a displaying process based on the produced provision information.

In the display apparatus and method and the program, electromagnetic induction is utilized to receive first information including identification information of a user and second information including identification information corresponding to an object on which a first different information processing apparatus is mounted from a second different information processing apparatus. Then, provision information corresponding to the user is produced based on the received first and second information, and a displaying process is performed based on the produced provision information.

With the display apparatus and method and the program, information corresponding to a user can be produced. Particularly, provision information corresponding to the user can be produced based on information including identification information of the user and information including identification information corresponding to an object.

According to a ninth aspect of the present invention, there is provided an information providing system for providing information, comprising acquisition means for acquiring first information including identification information corresponding to an object of mounting and second information including identification information of a user, requesting means for issuing a request for provision information to the user, acceptance means for accepting the request for provision information from the requesting means, production means for producing, when the request for provision information is accepted by the acceptance means, the provision information based on the first and second information acquired by the acquisition means, and display means for performing a displaying process based on the provision information produced by the production means.

According to a tenth aspect of the present invention, there is provided an information providing method for an information providing system for providing information, comprising an acquisition step of acquiring first information including identification information corresponding to an object of mounting and second information including identification information of a user, a requesting step of issuing a request for provision information to the user, an acceptance step of accepting the request for provision information by the process of the requesting step, a production step of producing, when the request for provision information is accepted by the process of the acceptance step, the provision information based on the first and second information acquired by the process of the acquisition step, and a display control step of controlling a displaying process based on the provision information produced by the process of the production step.

In the information providing system and method, first information including identification information corresponding to an object of mounting and second information including identification information of a user are acquired. Then, when a request for provision information to the user is accepted, the provision information is produced based on the first and second information and a displaying process is performed based on the provision information.

With the information providing system and method, information corresponding to a user can be provided. Particularly, provision information to the user can be produced and displayed based on information including identification information of an object and information including identification information of the user.

According to an eleventh aspect of the present invention, there is provided an information processing apparatus for processing information, comprising acquisition means for acquiring first information including identification information of an object on which a first different information processing apparatus is mounted and second information including identification information of a user, acceptance means for accepting a request for provision information to the user, and production means for producing, when the request for provision information is accepted by the acceptance means, the provision information based on the first and second information acquired by the acquisition means.

According to a twelfth aspect of the present invention, there is provided an information processing method for an information processing apparatus for processing information, comprising an acquisition step of acquiring first information including identification information of an object on which a first different information processing apparatus is mounted and second information including identification information of a user, an acceptance step of accepting a request for provision information to the user, and a production step of producing, when the request for provision information is accepted by the process of the acceptance step, the provision information based on the first and second information acquired by the process of the acquisition step.

According to a thirteenth aspect of the present invention, there is provided a program for processing information, the program causing a computer to execute an acquisition step of acquiring first information including identification information of an object on which a first different information processing apparatus is mounted and second information including identification information of a user, an acceptance step of accepting a request for provision information to the user, and a production step of producing, when the request for provision information is accepted by the process of the acceptance step, the provision information based on the first and second information acquired by the process of the acquisition step.

In the information processing apparatus and method and the program, first information including identification information of an object on which a first different information processing apparatus is mounted and second information including identification information of a user are acquired. Then, when a request for provision information to the user is accepted, the provision information is produced based on the first and second information.

With the information processing apparatus and method and the program, information corresponding to a user can be provided. Particularly, provision information to the user can be produced based on information including identification information of an object and information including identification information of the user.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWNGS

FIG. 16 is a view illustrating user information received at step S106 of FIG. 14;

FIG. 17 is a view illustrating commodity information received at step S109 of FIG. 15;

FIG. 38 is a view illustrating part of book information received at step S1405 of FIG. 35;

FIG. 39 is a view illustrating user information acquired at step S1407 of FIG. 35;

FIG. 44 is a view illustrating information stored in a book information storage section shown in FIG. 42;

DETAILED DESCRIPTION OF THE PREFERRED EMBODIMENTS

Before preferred embodiments of the present invention are described in detail, a corresponding relationship between several features recited in the accompanying claims and particular elements of the preferred embodiments described below is described. The description, however, is merely for the confirmation that the particular elements which support the invention as recited in the claims are disclosed in the description of the embodiments of the present invention. Accordingly, even if some particular element which is recited in description of one of the embodiments is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiments of the present invention is all described in the claims. In other words, the following description does not deny the presence of an invention which corresponds to a particular element described in the description of the embodiments of the present invention but is not recited in the claims, that is, the description does not deny the presence of an invention which may be filed for patent in a divisional patent application or may be additionally included into the present patent application as a result of later amendment to the claims.

Figure 8:
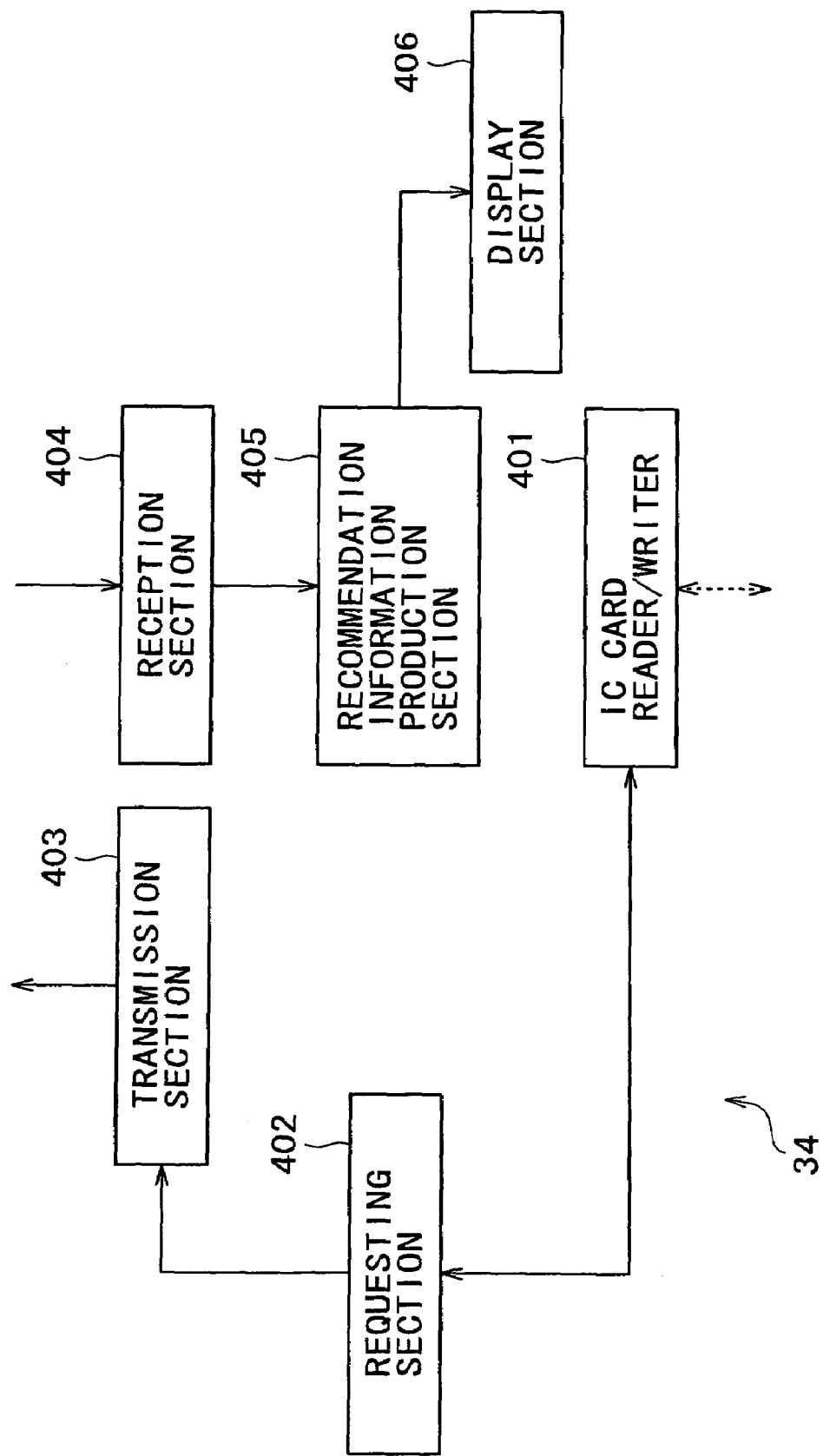
FIG. 8 is a block diagram showing a functional configuration of an information providing apparatus shown in FIG. 1.

An information providing system as set forth in claim 1 comprises a first information processing apparatus (for example, a contactless IC tag 36 of FIG. 1) for utilizing electromagnetic induction to transmit first information (for example, a commodity ID), a second information processing apparatus (for example, a contactless IC card 31 of FIG. 1) for utilizing electromagnetic induction to receive the first information from the first information processing apparatus and transmit the first information and second information (for example, a user ID), and a display apparatus (for example, an information providing apparatus 34) for utilizing electromagnetic induction to receive the first and second information from the second information processing apparatus, the first information processing apparatus including first storage means (for example, a memory 201 of FIG. 5) for storing the first information including at least identification information (for example, a commodity ID) corresponding to an object on which the first information processing apparatus is mounted, and first transmission means (for example, a transmission/reception section 202 of FIG. 5) for utilizing electromagnetic induction to transmit the first information stored in the first storage means to the second information processing apparatus, the second information processing apparatus including first reception means (for example, a transmission/reception section 73 of FIG. 2 which executes a process at step S4 of FIG. 10) for utilizing electromagnetic induction to receive the first information transmitted from the first transmission means, second storage means (for example, a memory 72 of FIG. 2) for storing the second information including identification information (for example, the user ID) of a user, and second transmission means (for example, the transmission/reception section 73 of FIG. 2 which executes a process at step S7 of FIG. 10) for transmitting the first information received by the first reception means and the second information stored in the second storage means to the display apparatus, the display apparatus including second reception means (for example, a reception section 404 of FIG. 8) for receiving the first and second information transmitted from the second transmission means, production means (for example, a recommendation information production section 405 of FIG. 8) for producing provision information corresponding to the user based on the first and second information received by the second reception means, and display means (for example, a display section 406 of FIG. 8) for performing a displaying process based on the provision information produced by the production means.

Figure 14:
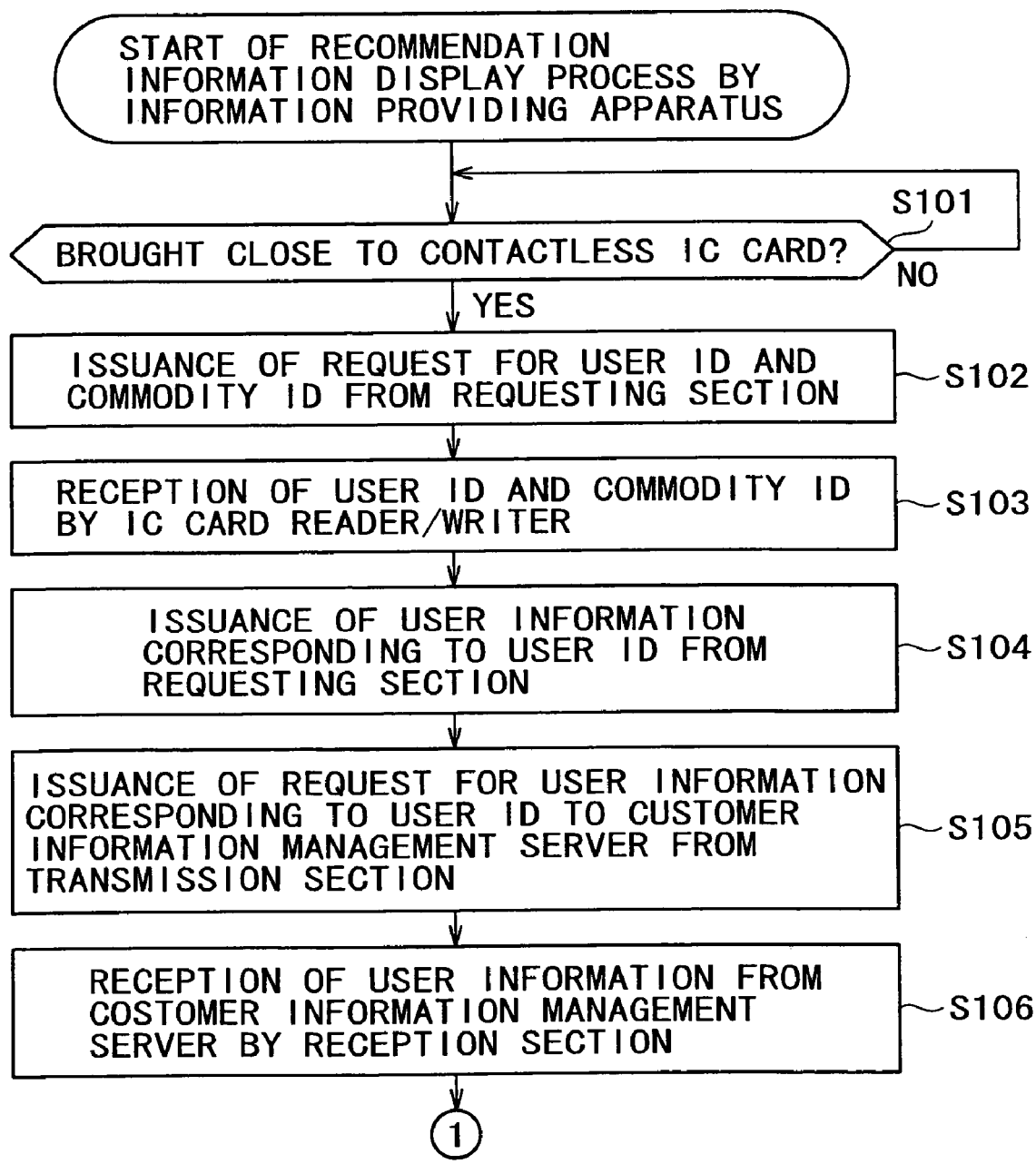
FIGS. 14 and 15 are flow charts illustrating a recommendation information display process by the information providing apparatus of FIG. 8.
Figure 15:
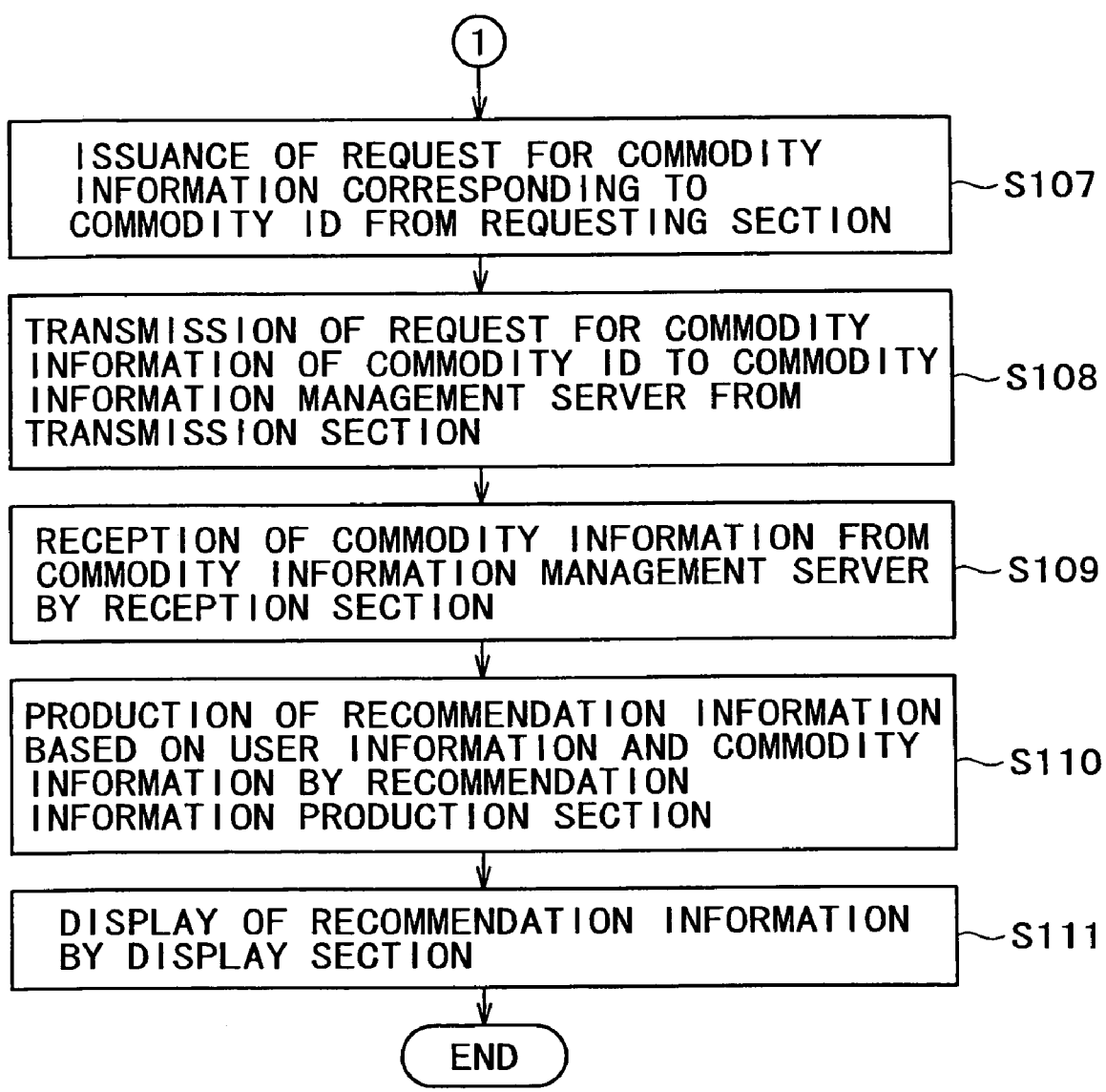

An information providing method as set forth in claim 2 is for an information providing system which includes a first information processing apparatus for utilizing electromagnetic induction to transmit first information stored therein, a second information processing apparatus for utilizing electromagnetic induction to receive the first information from the first information processing apparatus and transmitting second information stored therein together with the first information, and a display apparatus for utilizing electromagnetic induction to receive the first and second information from the second information processing apparatus, and comprises a step performed by the first information processing apparatus of utilizing electromagnetic induction to transmit the stored first information including at least identification information corresponding to an object on which the first information processing apparatus is mounted to the second information processing apparatus (for example, a step S54 of FIG. 11), a step performed by the second information processing apparatus of utilizing electromagnetic induction to receive the transmitted first information (for example, a step S4 of FIG. 10) and transmitting the first information and the stored second information including identification information of a user to the display apparatus (for example, a step S9 of FIG. 10), and a step performed by the display apparatus of receiving the first and second information transmitted from the second information processing apparatus (for example, a step S103 of FIG. 14), producing provision information corresponding to the user based on the received first and second information (for example, a step S110 of FIG. 15), and performing a displaying process based on the produced provision information (for example, a step S111 of FIG. 15).

An information processing apparatus (for example, a contactless IC card 31 of FIG. 2) as set forth in claim 3 comprises reception means (for example, a transmission/reception section 73 of FIG. 2 which executes a process at step S4 of FIG. 10) for utilizing electromagnetic induction to receive first information including at least identification information corresponding to an object on which a first different information processing apparatus is mounted from the first different information processing apparatus, storage means (for example, a memory 72 of FIG. 2) for storing second information including identification information of a user in advance and storing the first information received by the reception means, and transmission means (for example, the transmission/reception section 73 of FIG. 2 which executes a process at step S9 of FIG. 10) for utilizing electromagnetic induction to transmit the first and second information stored in the storage means to a second different information processing apparatus.

In the information processing apparatus as set forth in claim 4, the first information received by the reception means includes not only the identification information (for example, a commodity ID of FIG. 7) corresponding to the object but also object information (for example, a category, maker, color or size of FIG. 17) which is detailed information of the object.

In the information processing apparatus as set forth in claim 5, the second information stored in the storage means includes not only the identification information (for example, a user ID of FIG. 4) of the user but also liking information (for example, liking information of FIG. 16) regarding liking of the user.

Figure 10:
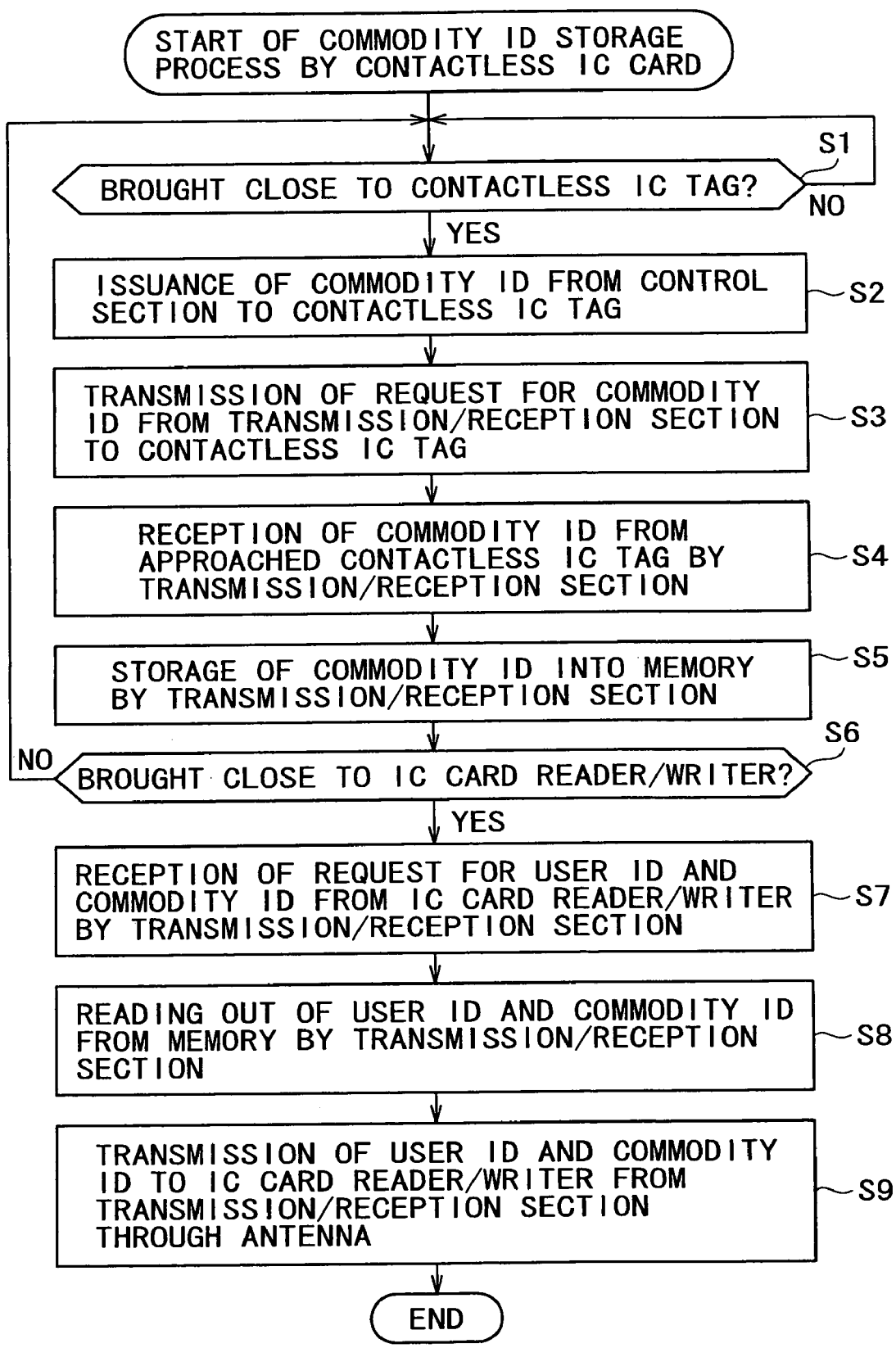
FIG. 10 is a flow chart illustrating a commodity ID storage process by the contactless IC card of FIG. 2.

An information processing method for an information processing apparatus as set forth in claim 6 comprises the steps of utilizing electromagnetic induction to receive first information including at least identification information corresponding to an object on which a first different information processing apparatus is mounted from the first different information processing apparatus (for example, a step S4 of FIG. 10), storing the received first information (for example, a step S5 of FIG. 10), and utilizing electromagnetic induction to transmit the stored first information together with second information stored in advance and including identification information of a user to a second different information processing apparatus (for example, a step S9 of FIG. 10).

A display apparatus (for example, an information providing apparatus 34 of FIG. 8) as set forth in claim 8 comprises reception means (for example, a reception section 404 of FIG. 8) for utilizing electromagnetic induction to receive first information including identification information (for example, a user ID) of a user and second information including identification information (for example, a commodity ID) corresponding to an object on which a first different information processing apparatus is mounted from a second different information processing apparatus, production means (for example, a recommendation information production section 405 of FIG. 8) for producing provision information corresponding to the user based on the first and second information received by the reception means, and display means (for example, a display section 406 of FIG. 8) for performing a displaying process based on the provision information produced by the production means.

In the display apparatus as set forth in claim 9, the first information received by the reception means includes not only the identification information of the user but also liking information (for example, liking information of FIG. 16) regarding liking of the user.

In the display apparatus as set forth in claim 10, the second information received by the reception means includes not only the identification information corresponding to the object but also object information (for example, a category, maker, color or size of FIG. 17) which is detailed information of the object.

The display apparatus as set forth in claim 11 further comprises recording means (for example, a customer information management server 33 of FIG. 3) for recording liking information regarding liking of the user corresponding to the identification information of the user included in the first information to be received by the reception means, the production means acquiring the liking information recorded in the recording means based on the first information received by the reception means and producing the provision information based on the liking information and the second information.

Figures 6, 7:
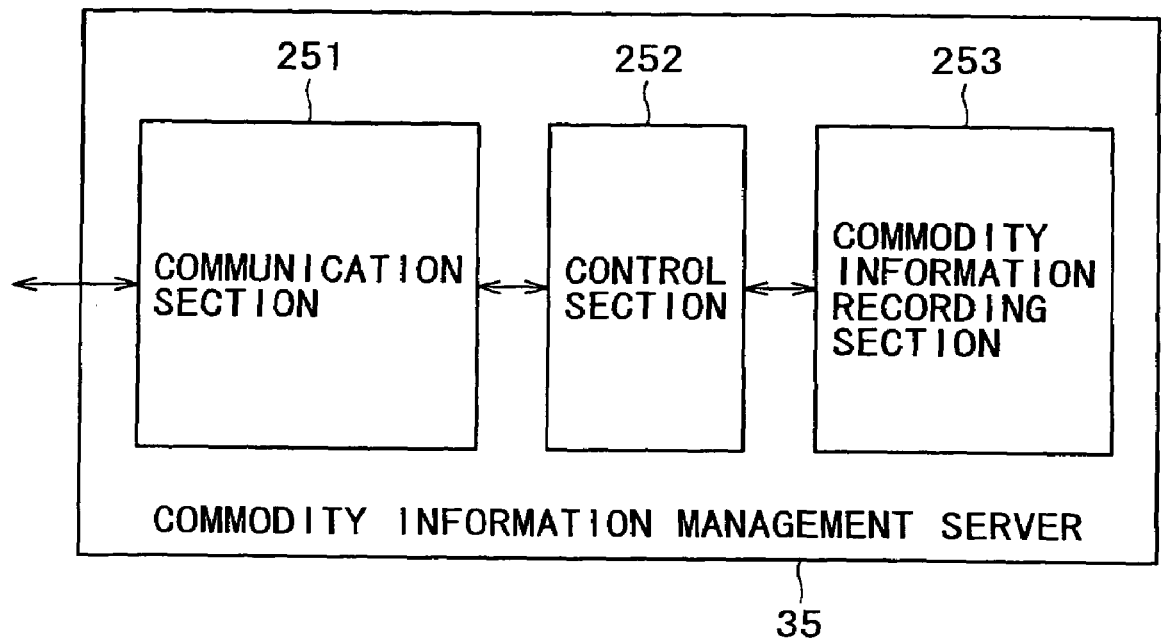
FIG. 6 is a block diagram showing a functional configuration of a commodity information management server shown in FIG. 1.
FIG. 7 is a view illustrating information recorded in a commodity information recording section shown in FIG. 6.

The display apparatus as set forth in claim 12 further comprises recording means (for example, a commodity information management server 35 of FIG. 6) for recording object information which is detailed information of the object and corresponds to the identification information regarding the object included in the second information received by the reception means, the production means acquiring the object information recorded in the recording means based on the second information received by the reception means and producing the provision information based on the object information and the first information.

A display method as set forth in claim 13 comprises the steps of utilizing electromagnetic induction to receive first information including identification information of a user and second information including identification information corresponding to an object on which a first different information processing apparatus is mounted from a second different information processing apparatus (for example, a step S103 of FIG. 14), producing provision information corresponding to the user based on the received first and second information (for example, a step S110 of FIG. 15), and performing a displaying process based on the produced provision information (for example, a step S111 of FIG. 15).

It is to be noted that the relationship between the features of the program as set forth in claim 7 and particular elements of the embodiments of the present invention is similar to that of the information processing method as set forth in claim 6 described hereinabove, and therefore, overlapping description of it is omitted hereinto avoid redundancy. Also the relationship between the features of the program as set forth in claim 14 and particular elements of the embodiments of the present invention is similar to that of the display method as set forth in claim 13 described hereinabove, and therefore, overlapping description of it is omitted hereinto avoid redundancy.

Figure 22:
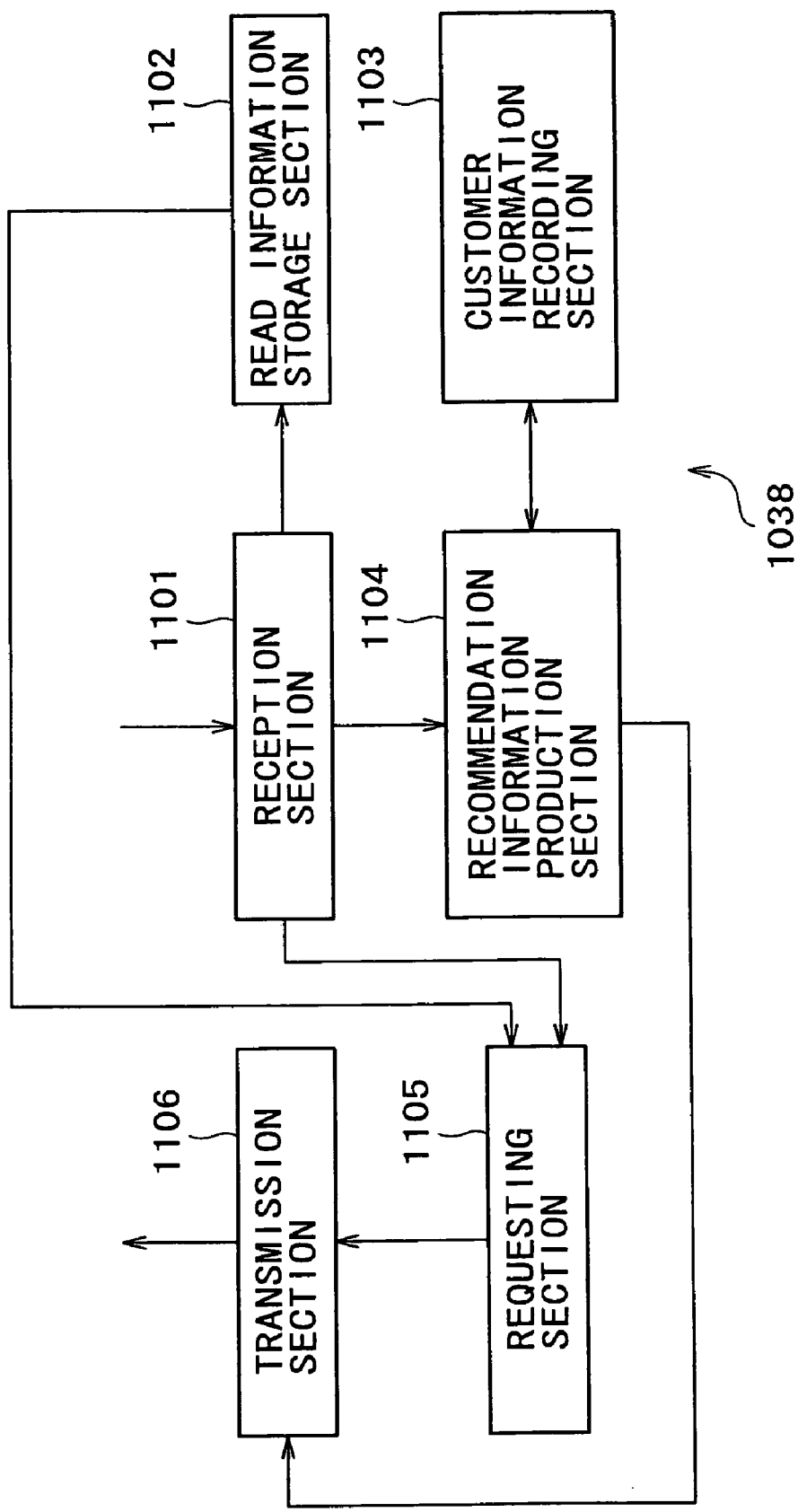
FIG. 22 is a block diagram showing an example of a functional configuration of a customer information management server shown in FIG. 21.
Figure 34:
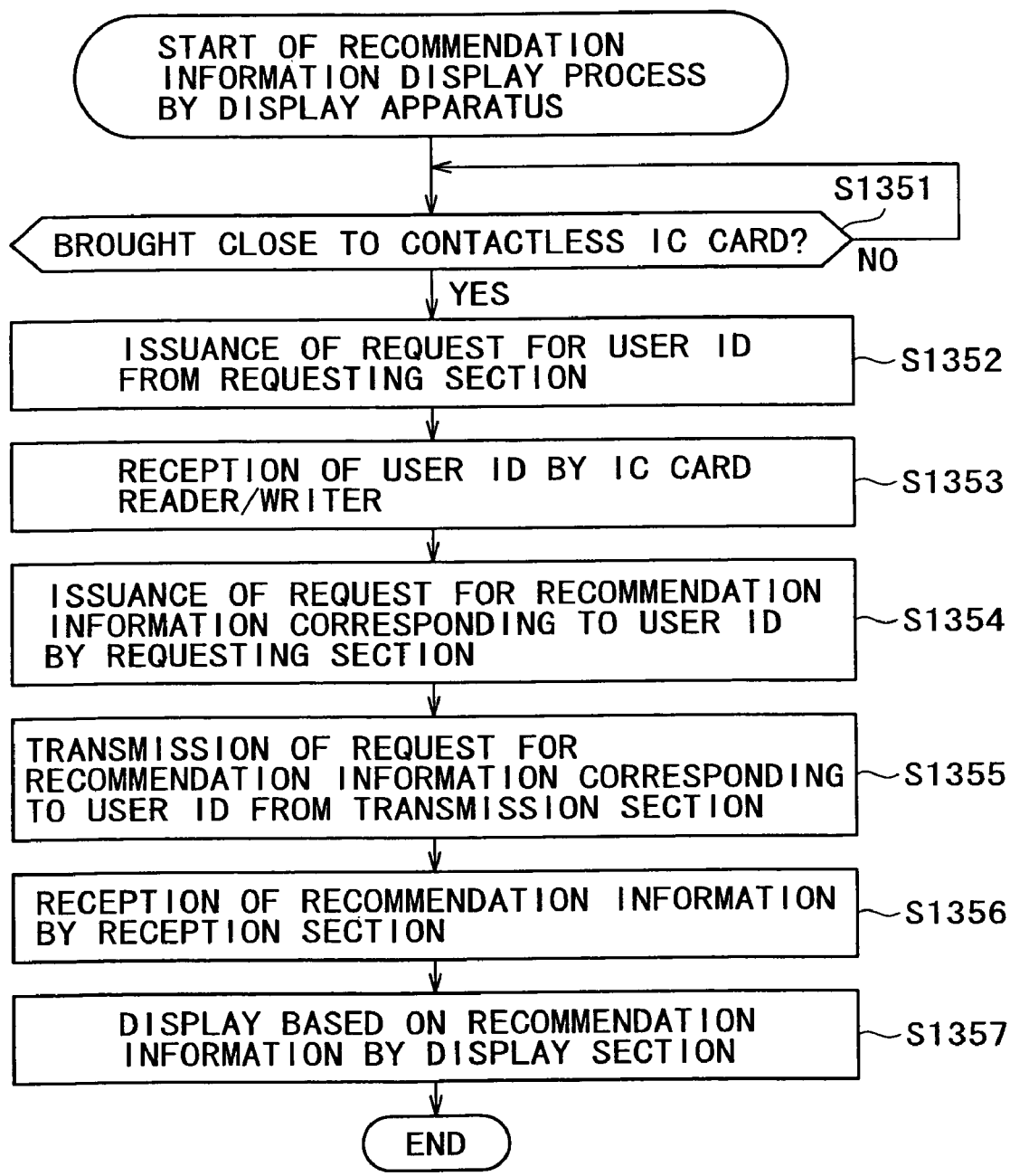
FIG. 34 is a flow chart illustrating a recommendation information display process by the display apparatus of FIG. 26.
Figure 35:
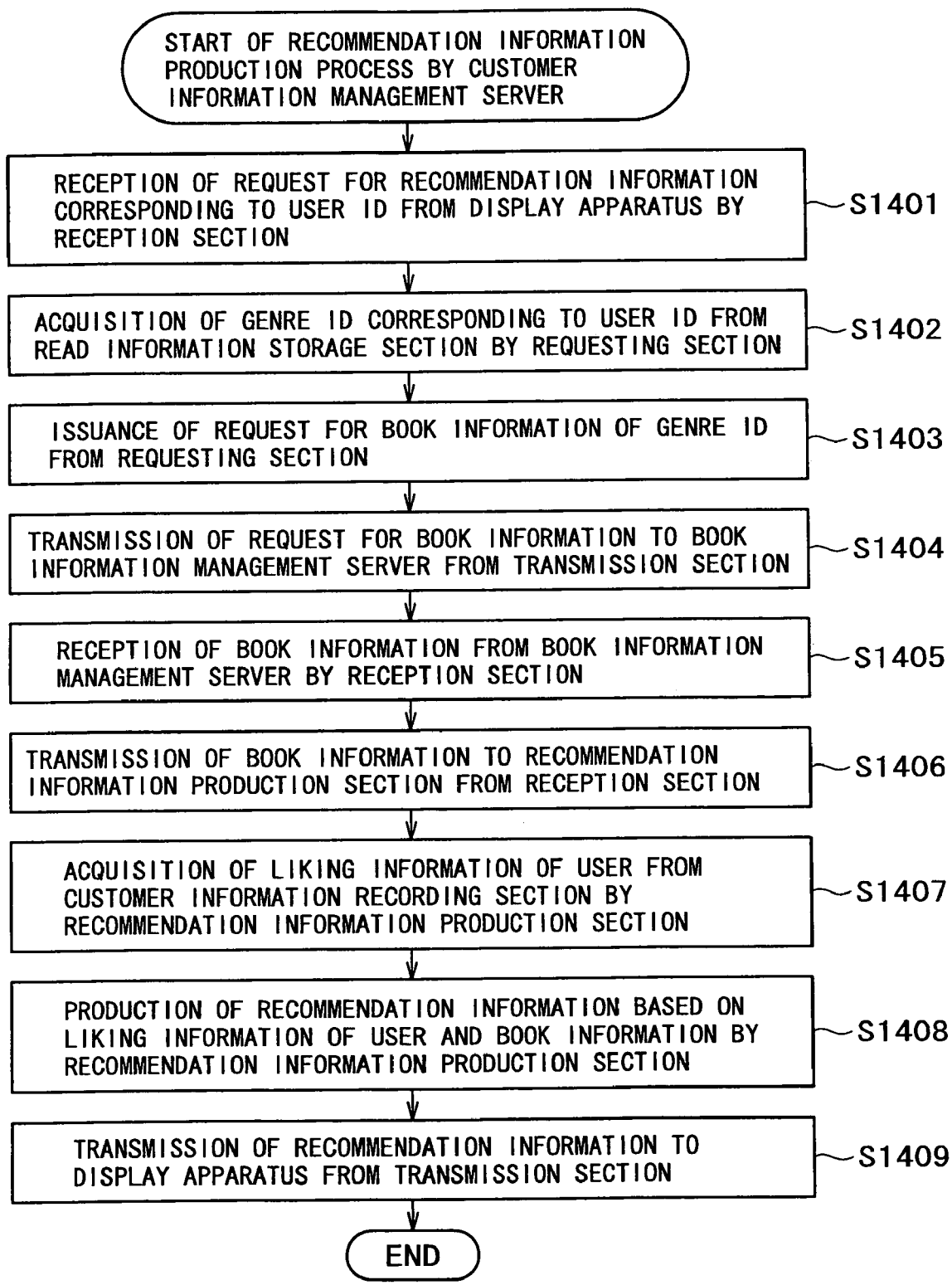
FIG. 35 is a flow chart illustrating a recommendation information production process by the customer information management server of FIG. 22.

An information providing system as set forth in claim 15 comprises acquisition means (for example, a reception section 1101 of FIG. 22 which executes a process at step S1301 of FIG. 32) for acquiring first information including identification information (for example, a genre ID) corresponding to an object of mounting (for example, a book) and second information including identification information of a user, requesting means (for example, a requesting section 1402 of FIG. 26 which executes a process at step S1354 of FIG. 34) for issuing a request for provision information to the user, acceptance means (for example, the reception section 1101 of FIG. 22 which executes a process at step S1401 of FIG. 35) for accepting the request for provision information from the requesting means, production means (for example, a recommendation information production section 1104 of FIG. 22 which executes a process at step S1408 of FIG. 35) for producing, when the request for provision information is accepted by the acceptance means, the provision information based on the first and second information acquired by the acquisition means, and display means (for example, a display section 1405 of FIG. 26 which executes a process at step S1357 of FIG. 34) for performing a displaying process based on the provision information produced by the production means.

An information providing method as set forth in claim 16 comprises an acquisition step (for example, a step S1301 of FIG. 32) of acquiring first information including identification information (for example, a genre ID) corresponding to an object of mounting and second information including identification information of a user, a requesting step (for example, a step S1354 of FIG. 34) of issuing a request for provision information to the user, an acceptance step (for example, a step S1401 of FIG. 35) of accepting the request for provision information by the process of the requesting step, a production step (for example, a step S1408 of FIG. 35) of producing, when the request for provision information is accepted by the process of the acceptance step, the provision information based on the first and second information acquired by the process of the acquisition step, and a display control step (for example, a step S1357 of FIG. 34) of controlling a displaying process based on the provision information produced by the process of the production step.

Figure 21:
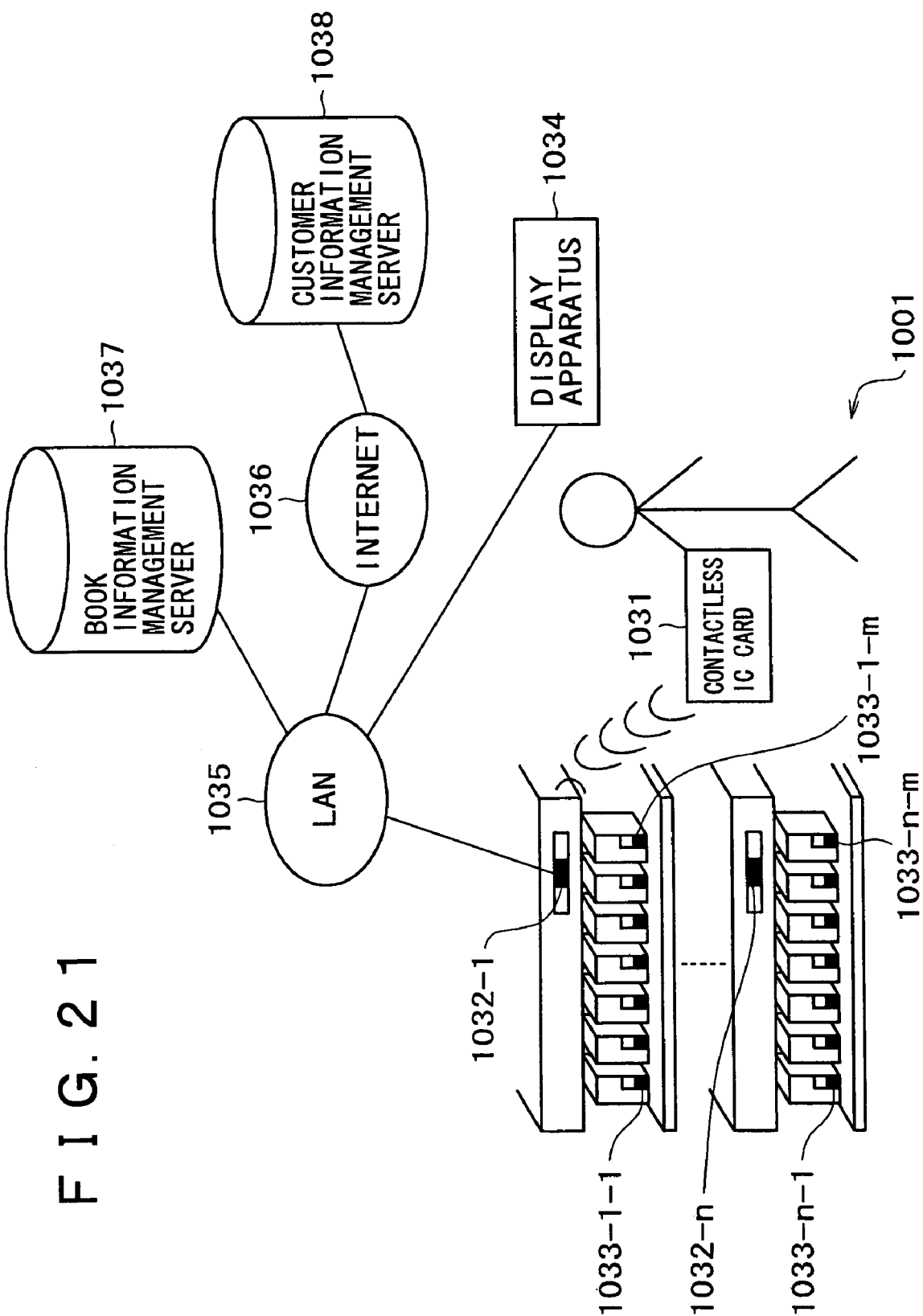
FIG. 21 is a schematic block diagram showing an example of a general configuration of a further information providing system to which the present invention is applied.

An information processing apparatus (for example, a customer information management server 1038 of FIG. 21) as set forth in claim 17 comprises acquisition means (for example, a reception section 1101 of FIG. 22 which executes a process at step S1301 of FIG. 32) for acquiring first information including identification information (for example, a genre ID) of an object (for example, a book) on which a first different information processing apparatus (for example, a contactless IC chip 1032 of FIG. 21) is mounted and second information including identification information of a user, acceptance means (for example, the reception section 1101 of FIG. 22 which executes a process at step S1401 of FIG. 35) for accepting a request for provision information to the user, and production means (for example, a recommendation information production section 1104 of FIG. 22 which executes a process at step S1408 of FIG. 35) for producing, when the request for provision information is accepted by the acceptance means, the provision information based on the first and second information acquired by the acquisition means.

The information processing apparatus (for example, a book information management server 1704 of FIG. 40) as set forth in claim 18 further comprises storage means (for example, a book information storage section 1803 of FIG. 42) for storing object information which is detailed information of the object corresponding to the identification information of the object, and identification means (for example, a control section 1802 of FIG. 42 which executes a process at step S1703 or S1706 of FIG. 43) for identifying whether or not the first different information processing apparatus is present based on the first information acquired by the acquisition means and the object information stored in the storage means.

Figure 45:
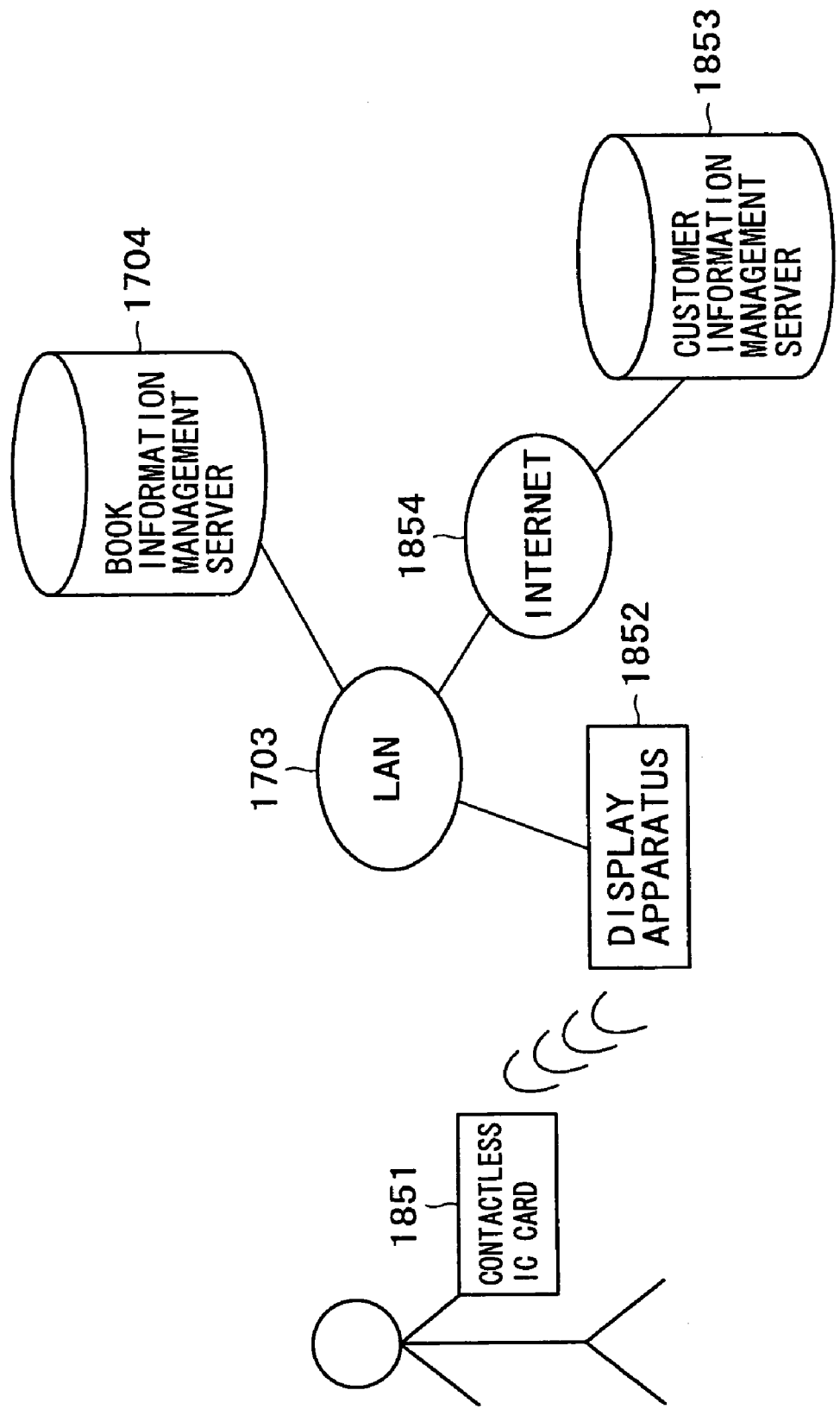
FIG. 45 is a schematic diagrammatic view showing a system wherein the book information management server of FIG. 42 provides information conforming with a liking of a user.

The information processing apparatus as set forth in claim 19 further comprises requesting means (for example, a requesting section 1805 of FIG. 42 which executes a process at step S1802 of FIG. 47) for requesting, when the request for provision information is accepted by the acceptance means, a second different information processing apparatus (for example, a customer information management server 1853 of FIG. 45) for liking information representative of liking of the user based on the identification information of the user, and reception means (for example, a reception section 1801 of FIG. 42 which executes a process at step S1804 of FIG. 47) for receiving the liking information transmitted from the second different information processing apparatus in response to the request from the requesting means.

In the information processing apparatus as set forth in claim 21, the first information acquired by the acquisition means further includes, in addition to the identification information of the object, object information (for example, book information of FIG. 38) which is detailed information of the object.

In the information processing apparatus as set forth in claim 22, the second information acquired by the acquisition means further includes, in addition to the identification information of the user, liking information (for example, user information of FIG. 39) representative of liking of the user.

The information processing apparatus as set forth in claim 23 further comprises transmission means (for example, a transmission section 1106 of FIG. 22 which executes a process at step S1409 of FIG. 35) for transmitting the provision information produced by the production means to a display apparatus which performs a display process based on the provision information.

The information processing apparatus as set forth in claim 24 further comprises requesting means (for example, a requesting section 1105 of FIG. 22 which executes a process at step S1403 of FIG. 35) for requesting, when the request for provision information is accepted by the acceptance means, a second different information processing apparatus for object information which is detailed information of the object based on the identification information of the object, and reception means (for example, a reception section 1101 of FIG. 22 which executes a process at step S1405 of FIG. 35) for receiving the object information transmitted from the second different information processing apparatus in response to the request from the requesting means.

The information processing apparatus as set forth in claim 25 further comprises storage means (for example, a customer information recording section 1103 of FIG. 22) for storing liking information representative of liking of the user corresponding to the second information.

The information processing apparatus as set forth in claim 26 further comprises storage means (for example, a book information recording section 1253 of FIG. 23) for storing object information which is detailed information of the object corresponding to the identification information of the object.

An information processing method as set forth in claim 27 comprises an acquisition step (for example, a step S1301 of FIG. 32) of acquiring first information including identification information (for example, a genre ID) of an object on which a first different information processing apparatus is mounted and second information including identification information of a user, an acceptance step (for example, a step S1401 of FIG. 35) of accepting a request for provision information to the user, and a production step (for example, a step S1408 of FIG. 35) of producing, when the request for provision information is accepted by the process of the acceptance step, the provision information based on the first and second information acquired by the process of the acquisition step.

It is to be noted that the relationship between the features of the program as set forth in claim 28 and particular elements of the embodiments of the present invention is similar to that of the information processing method as set forth in claim 27 described hereinabove, and therefore, overlapping description of it is omitted hereinto avoid redundancy.

Now, preferred embodiments of the present invention are described in detail with reference to the accompanying drawings.

Figure 1:
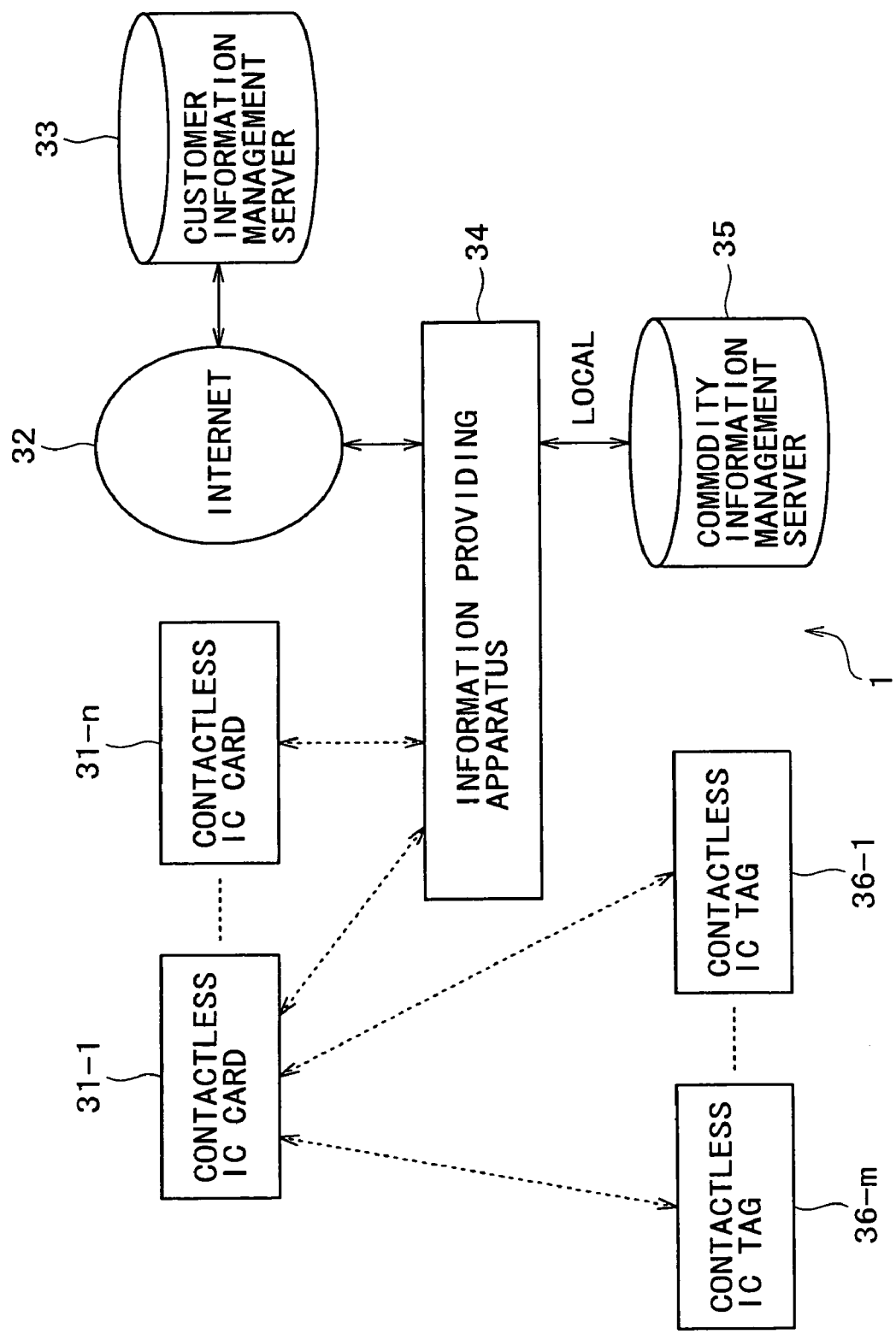
FIG. 1 is a block diagram showing an example of a general configuration of an information providing system to which the present invention is applied.

Referring first to FIG. 1, there is shown a general configuration of an information providing system 1 to the present invention is applied.

Contactless IC cards 31-1 to 31-n are owned individually by different users from one another. A customer information management server 33 is connected to the Internet 32. The customer information management server 33 is installed outside a selling agent and managed, for example, by a credit company. On the other hand, an information providing apparatus 34, a commodity information management server 35 and contactless IC tags 36-1 to 36-m are provided in the selling agent.

The contactless IC cards 31-1 to 31-n are owned by different users as described above and have identification information (user IDs) of the users by whom they are owned individually. It is to be noted that, in the following description, where there is no necessity to individually distinguish the contactless IC cards 31-1 to 31-n from each other, any of them is referred to merely as contactless IC card 31.

The customer information management server 33 has recorded therein in advance user information (user information including, for example, hobby and/or liking information) corresponding to the identification information (user IDs) stored individually in the contactless IC cards 31-1 to 31-n. For example, a credit company which sells a credit card as a contactless IC card 31 performs, in advance upon subscription of a user, such processes as to acquire information of the user including hobby and/or liking information and store identification information into the contactless IC card 31, and then cause the customer information management server 33 to register user information corresponding to the identification. The customer information management server 33 and the information providing apparatus 34 are connected to the Internet 32 and communicate information therebetween.

The contactless IC tags 36-1 to 36-m are mounted on different commodities from one another in the selling agent. The contactless IC tags 36-1 to 36-m have stored therein identification information (for example, commodity IDs) corresponding to the individual commodities. It is to be noted that, in the following description, where there is no necessity to distinguish the contactless IC tags 36-1 to 36-m from one another, any of them is referred to merely as contactless IC tag 36.

The commodity information management server 35 has recorded therein in advance commodity information (commodity information including, for example, a category, a maker, a color, a size and so forth) corresponding to the identification information (commodity IDs) of the commodities individually stored in the contactless IC tags 36-1 to 36-m. For example, the selling agent side registers, upon arrival of commodities, commodity IDs and corresponding commodity information into the contactless IC tags 36-1 to 36-m and the commodity information management server 35. Further, in the present case, the information providing apparatus 34 is connected locally to the commodity information management server 35.

The information providing apparatus 34 includes an IC card reader/writer (an IC card reader/writer 401 of FIG. 8 hereinafter described). The information providing apparatus 34 utilizes, when a contactless IC card 31 is relatively brought close thereto, electromagnetic induction to read information stored in the contactless IC card 31.

Meanwhile, the contactless IC card 31 has an IC card reader function and utilizes, when it is relatively brought close to a contactless IC tag 36, electromagnetic induction to communicate with the contactless IC tag 36 to read information stored in the contactless IC tag 36.

It is to be noted that, in the example of FIG. 1, the information providing apparatus 34, commodity information management server 35 and contactless IC tags 36 are provided, for example, in a garment selling agent.

Figure 2:
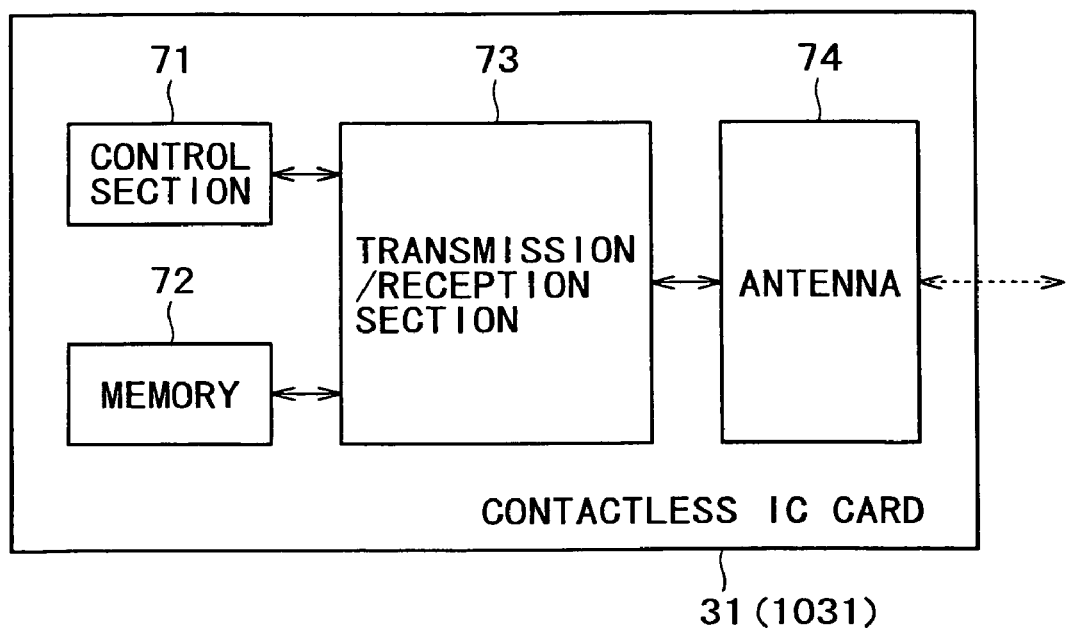
FIG. 2 is a block diagram showing a functional configuration of a contactless IC card shown in FIG. 1 (FIG. 21)

FIG. 2 shows an example of a functional configuration of the contactless IC cards 31 of FIG. 1.

Referring to FIG. 2, the contactless IC card 31 includes a control section 71, a memory 72, a transmission/reception section 73 and an antenna 74.

The memory 72 has stored therein in advance identification information (user ID) of the user who owns the contactless IC card 31. The transmission/reception section 73 controls communication with another apparatus which can utilize electromagnetic induction for communication through the antenna 74. The control section 71 produces various requesting signals.

Figure 3:
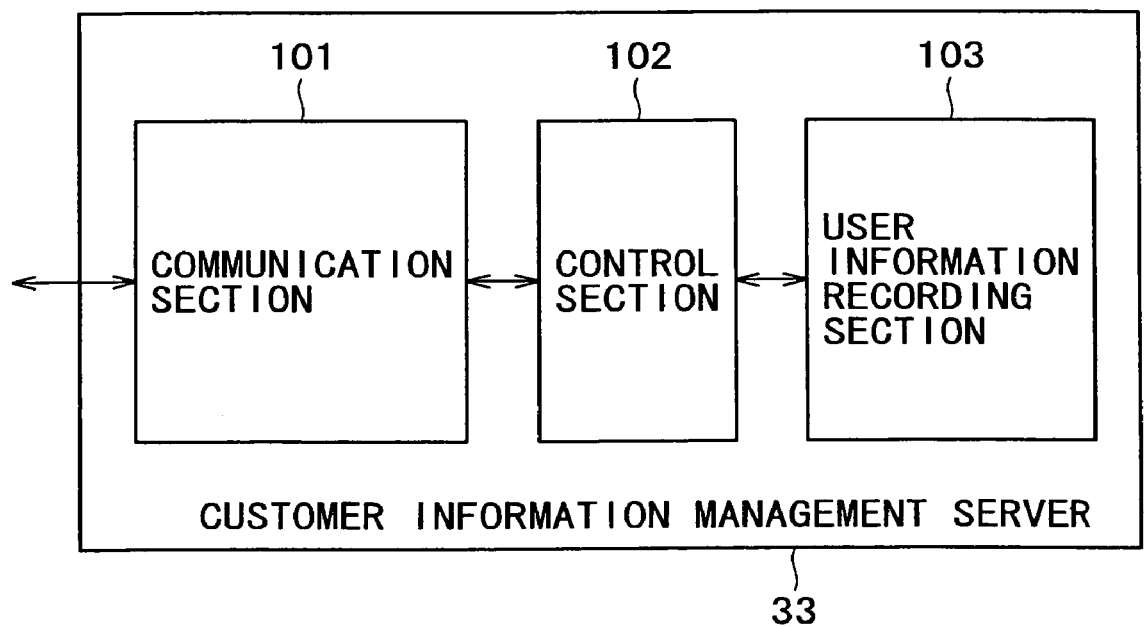
FIG. 3 is a block diagram showing a functional configuration of a customer information management server shown in FIG. 1.

FIG. 3 shows an example of a functional configuration of the customer information management server 33 of FIG. 1.

Referring to FIG. 3, the customer information management server 33 includes a communication section 101, a control section 102 and a user information recording section 103.

Figures 4, 5:
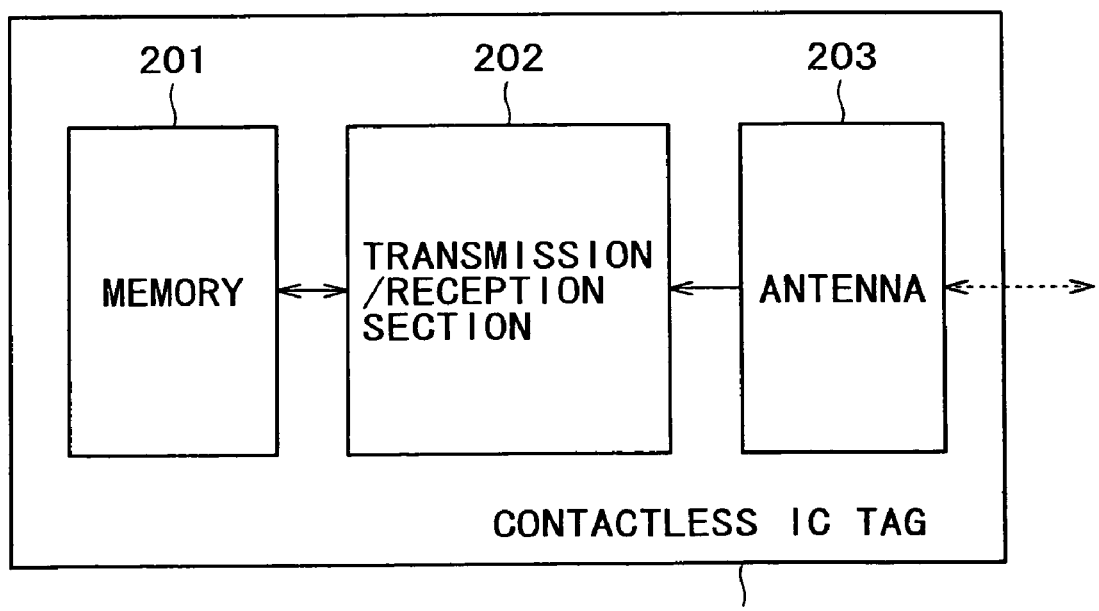
FIG. 4 is a view illustrating information recorded in a user information recording section shown in FIG. 3 (FIG. 22)
FIG. 5 is a block diagram showing a functional configuration of a contactless IC tag shown in FIG. 1 (FIG. 21)

The user information recording section 103 has stored therein in advance such user information 150 as illustrated in FIG. 4. In particular, the user information 150 includes a plurality of user IDs (in the example of FIG. 4, user A, user B, user C and user D) individually stored in the contactless IC cards 31-1 to 31-n and user information corresponding to the user IDs (in the example of FIG. 4, user information A corresponding to the user A, user information B corresponding to the user B, user information C corresponding to the user C and user information D corresponding to the user D). The individual user information (for example, the user information A) includes hobby and liking information of the corresponding user. It is to be noted that details of the user information are hereinafter described with reference to FIG. 16.

Referring back to FIG. 3, the communication section 101 is connected to the Internet 32 and controls communication with another apparatus. The control section 102 executes a process of reading out information from the user information recording section 103 and so forth.

FIG. 5 illustrates an example of a functional configuration of the contactless IC tag 36 of FIG. 1.

Referring to FIG. 5, the contactless IC tag 36 includes a memory 201, a transmission/reception section 202 and an antenna 203.

The memory 201 has stored therein in advance identification information (commodity ID) of a commodity on which the contactless IC tag 36 itself is mounted. The transmission/reception section 202 controls communication with another apparatus which can utilize electromagnetic induction for communication through the antenna 203.

FIG. 6 illustrates an example of a functional configuration of the commodity information management server 35 of FIG. 1.

Referring to FIG. 5, the commodity information management server 35 includes a communication section 251, a control section 252 and a commodity information recording section 253.

The commodity information recording section 253 has stored therein in advance such commodity information 300 as illustrated in FIG. 7. In particular, the commodity information 300 includes a plurality of commodity IDs (in the example of FIG. 7, commodity A, commodity B, commodity C and commodity D) individually stored in the contactless IC tags 36-1 to 36-n and commodity information corresponding to the commodity IDs (in the example of FIG. 7, commodity information A corresponding to the user A, commodity information B corresponding to the user B, commodity information C corresponding to the user C and commodity information D corresponding to the user D). The individual commodity information includes information of a category, a maker, a color, a size and so forth corresponding to the commodity ID. It is to be noted that details of the commodity information are hereinafter described with reference to FIG. 17.

The communication section 251 in this instance communicates with the information providing apparatus 34 through a local network. The control section 252 executes a control process of reading out information from the commodity information recording section 253 and so forth.

FIG. 8 illustrates an example of a functional configuration of the information providing apparatus 34 of FIG. 1.

Referring to FIG. 8, the information providing apparatus 34 includes an IC card reader/writer 401, a requesting section 402, a transmission section 403, a reception section 404, a recommendation information production section 405 and a display section 406.

The IC card reader/writer 401 utilizes electromagnetic induction to read information from another apparatus with which it communicates or write information into another apparatus. The requesting section 402 transmits a signal for requesting predetermined information to the transmission section 403 or the IC card reader/writer 401. The transmission section 403 transmits information to the commodity information management server 35 connected thereto locally and transmits information to the customer information management server 33 through the Internet 32. The reception section 404 receives information from the commodity information management server 35 connected thereto locally or receives information from the customer information management server 33 through the Internet 32.

The recommendation information production section 405 produces recommendation information corresponding to the user based on the hobby and liking information of the user and information of a commodity selected by the user and supplies the recommendation information to the display section 406. The display section 406 displays an image, a text or the like based on the recommendation information supplied thereto.

Figure 9:
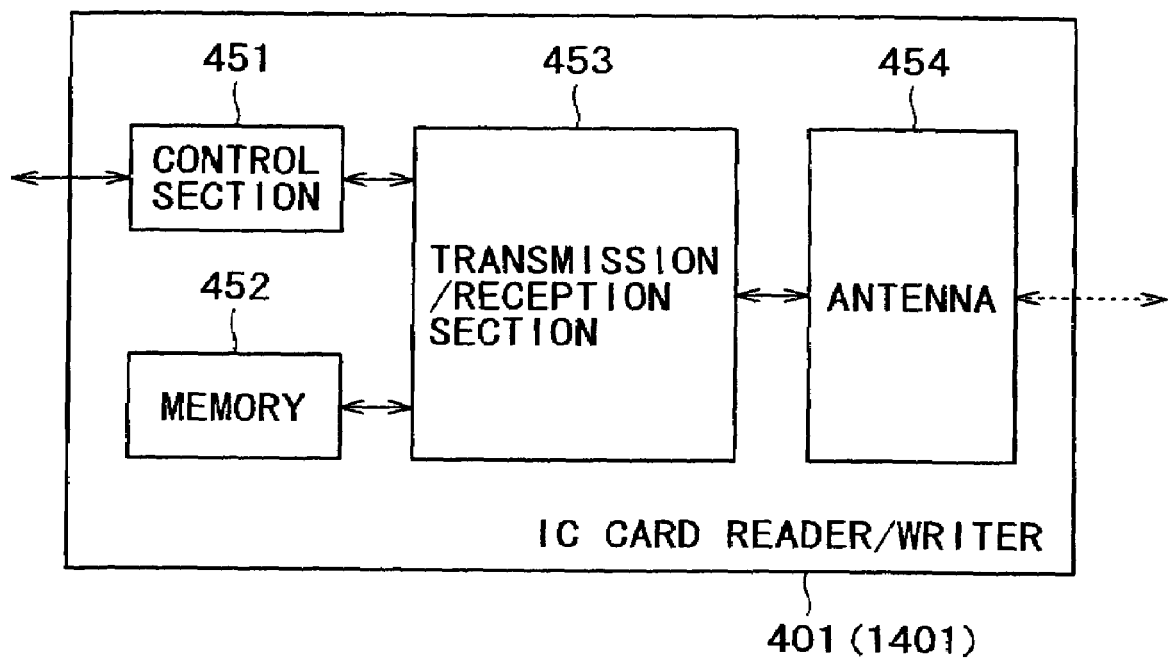
FIG. 9 is a block diagram showing a functional configuration of an IC card reader/writher shown in FIG. 8 (FIG. 26)

FIG. 9 illustrates an example of a functional configuration of the IC card reader/writer 401 of FIG. 8. Referring to FIG. 9, the IC card reader/writer 401 of FIG. 9 has a configuration similar to that of the contactless IC card 31 of FIG. 2 as can be seen apparently from comparison with FIG. 2.

In particular, the IC card reader/writer 401 includes a control section 451, a memory 452, a transmission/reception section 453 and an antenna 454 corresponding to the control section 71, memory 72, transmission/reception section 73 and antenna 74 of FIG. 2, respectively. Those elements having like names have like functions. It is to be noted, however, the memory 452 of FIG. 9 does not have identification information of the user (user ID) or the like stored therein.

Now, a process executed by a contactless IC card 31 of acquiring a commodity ID stored in a contactless IC tag 36 is described with reference to FIGS. 10 and 11. As described hereinabove, the user owns a contactless IC card 31 in which identification information of the user (user ID) is stored while each of all commodities in the garment selling agent has a contactless IC tag 36 mounted thereon in which identification information of the commodity (commodity ID) is stored.

First, a commodity information storage process executed by the contactless IC card 31 of FIG. 2 is described.

Figure 12:
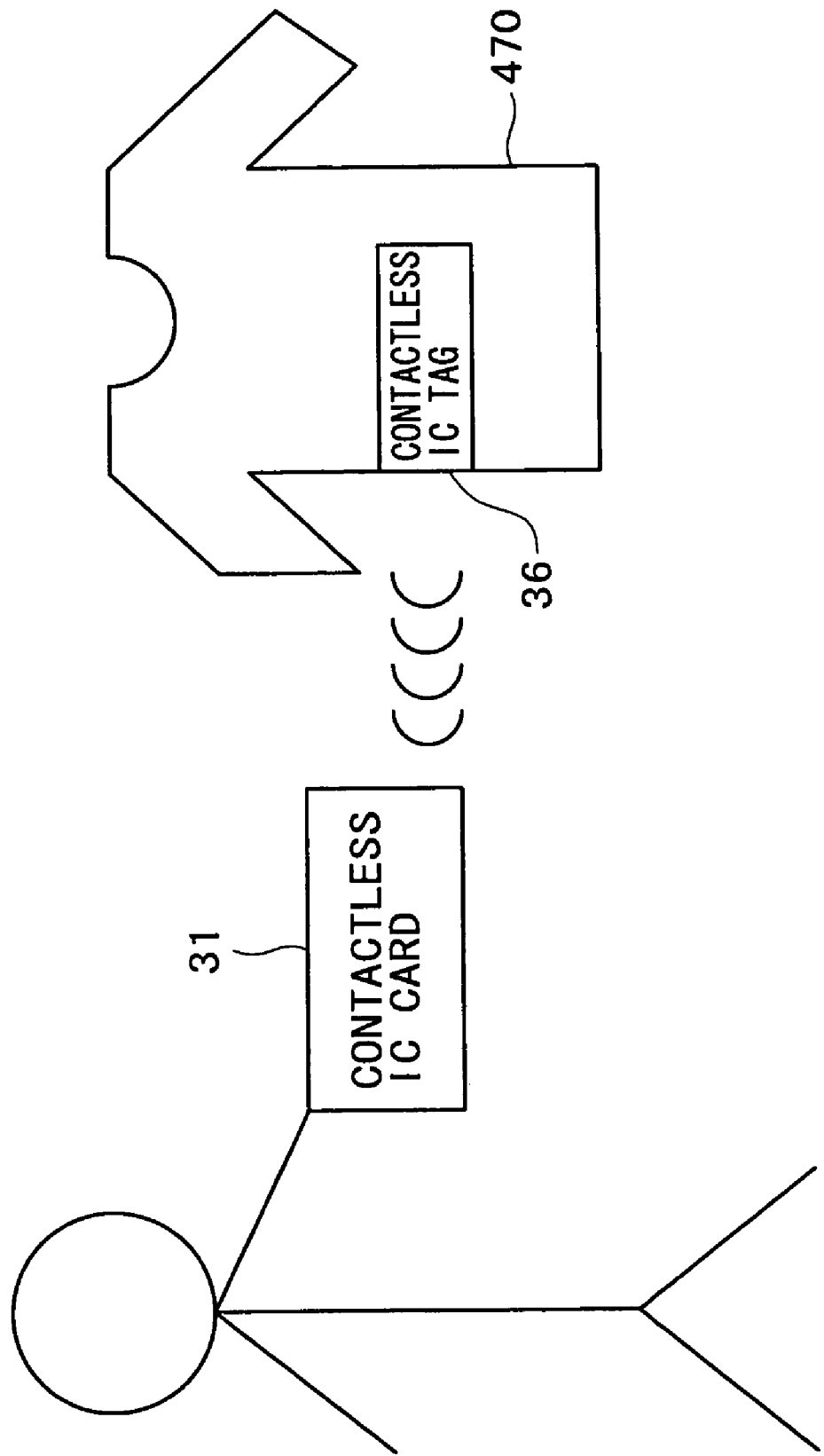
FIG. 12 is a schematic view illustrating communication between a contactless IC card and a contactless IC tag shown in FIG. 1.

At step S1, the transmission/reception section 73 discriminates whether or not the antenna 203 (FIG. 5) of a contactless IC tag 36 is relatively brought close to the antenna 74 of the contactless IC card 31. If the user brings a contactless IC card 31 in which identification information of the user is stored close (for example, within a range of 3 cm) to a contactless IC tag 36 mounted on a T-shirt 470 which is a commodity in the selling agent favorite to the user as seen in FIG. 12, then the contactless IC card 31 and the contactless IC tag 36 can communicate with each other utilizing electromagnetic induction. If it is discriminated at step S1 that the antenna 203 of a contactless IC tag 36 is not relatively brought close to the contactless IC card 31, then the process is repeated until after it is discriminated that the antenna 203 is relatively brought close to the contactless IC card 31.

If it is discriminated at step S1 that a contactless IC tag 36 is relatively brought close to the contactless IC card 31, then the control section 71 produces, at step S2, a signal for requesting a commodity ID stored in the contactless IC tag 36 (memory 201 of the contactless IC tag 36) and supplies the signal to the transmission/reception section 73.

At step S3, the transmission/reception section 73 transmits a signal for requesting a commodity ID to the closely positioned contactless IC tag 36 through the antenna 74. In response to the requesting signal, the contactless IC tag 36 reads out a commodity ID (for example, commodity A) stored in the memory 201 therein and transmits the commodity ID to the contactless IC card 31 (at step S54 of FIG. 11 hereinafter described).

Then at step S4, the transmission/reception section 73 receives the commodity ID corresponding to the contactless IC tag 36 and transmitted from the closely positioned contactless IC tag 36 (antenna 203 of the contactless IC tag 36) through the antenna 74. Then at step S5, the transmission/reception section 73 stores the received commodity ID into the memory 72.

By the processes at steps S1 to S5, the user can bring the contactless IC card 31 owned thereby (the contactless IC card 31 in which the user ID is stored) close to the contactless IC tag 36 mounted on the favorite commodity in the selling agent (the contactless IC tag 36 in which the commodity ID is stored) to cause the contactless IC card 31 to read the commodity ID of the commodity to which the contactless IC card 31 is relatively brought close.

At step S6, the transmission/reception section 73 discriminates whether or not the IC card reader/writer 401 (FIG. 8) of the information providing apparatus 34 is relatively brought close to the antenna 74 of the contactless IC card 31. If the user brings the contactless IC card 31 owned thereby (the contactless IC card 31 in which the user ID of the user is stored in advance and the commodity ID of the favorite commodity is stored) close to (or mounted on) the IC card reader/writer 401 of the information providing apparatus 34 in the selling agent, then the contactless IC card 31 and the IC card reader/writer 401 utilize electromagnetic induction to communicate with each other. If it is discriminated at step S6 that the IC card reader/writer 401 is not relatively brought close to the antenna 74, then the processing returns to step S1 so that the processes described above are repeated.

Through the repetitions of the processes at steps S1 to S6, the user can successively read the commodity IDs of favorite commodities into the contactless IC card 31. In other words, a plurality of commodity IDs can be stored into the contactless IC card 31.

If it is discriminated at step S6 that the IC card reader/writer 401 of the information providing apparatus 34 is brought close to the antenna 74, then the information providing apparatus 34 transmits a signal requesting the user ID and the IDs of commodities stored in the memory 72 of the contactless IC card 31 through the IC card reader/writer 401 (at step S102 of FIG. 14 hereinafter described). Thus, the transmission/reception section 73 of the contactless IC card 31 accepts the request for the user ID and the commodity IDs through the antenna 74.

At step S8, the transmission/reception section 73 reads out the user ID (for example, the user A) of the user, by whom the contactless IC card 31 is owned, stored in advance in the memory 72 and the commodity ID or IDs (for example, the commodity A) stored by the processes at steps S1 to S5 described hereinabove from the memory 72. If the processes at steps S1 to S5 are executed repetitively, then a plurality of commodity IDs (for example, the commodity A, commodity B and commodity D) are read out.

At step S9, the transmission/reception section 73 transmits the user ID (in the present example, the user A) and the commodity ID or IDs (in the present example, the commodity A, commodity B and commodity D) thus read out to the IC card reader/writer 401 of the closely positioned information providing apparatus 34 through the 74, whereafter the processing is ended.

Now, a commodity ID readout process by the contactless IC tag 36 of FIG. 5 which corresponds to the process by the contactless IC card 31 described above with reference to FIG. 10 is described with reference to a flow chart of FIG. 11.

At step S51, the transmission/reception section 202 of the contactless IC tag 36 discriminates whether or not the antenna 74 of a contactless IC card 31 is relatively brought close to the antenna 203 of the contactless IC tag 36. The process at step S51 is repeated until after it is discriminated that the antenna 74 is relatively brought close to the antenna 203.

If it is discriminated at step S51 that the antenna 74 is relatively brought close to the antenna 203, then the contactless IC card 31 transmits a signal for requesting a commodity ID back to the contactless IC tag 36 through the antenna 74 at step S2 of FIG. 10 described above. Thus, the transmission/reception section 202 of the contactless IC tag 36 accepts the signal for requesting a commodity ID transmitted thereto from the contactless IC card 31 at step S52.

At step S53, the transmission/reception section 202 reads out the commodity ID (for example, the commodity A) of the commodity, on which the contactless IC tag 36 is mounted, stored in the memory 201. Then at step S54, the transmission/reception section 202 transmits the commodity ID to the closely positioned contactless IC card 31 through the antenna 203.

Figure 11:
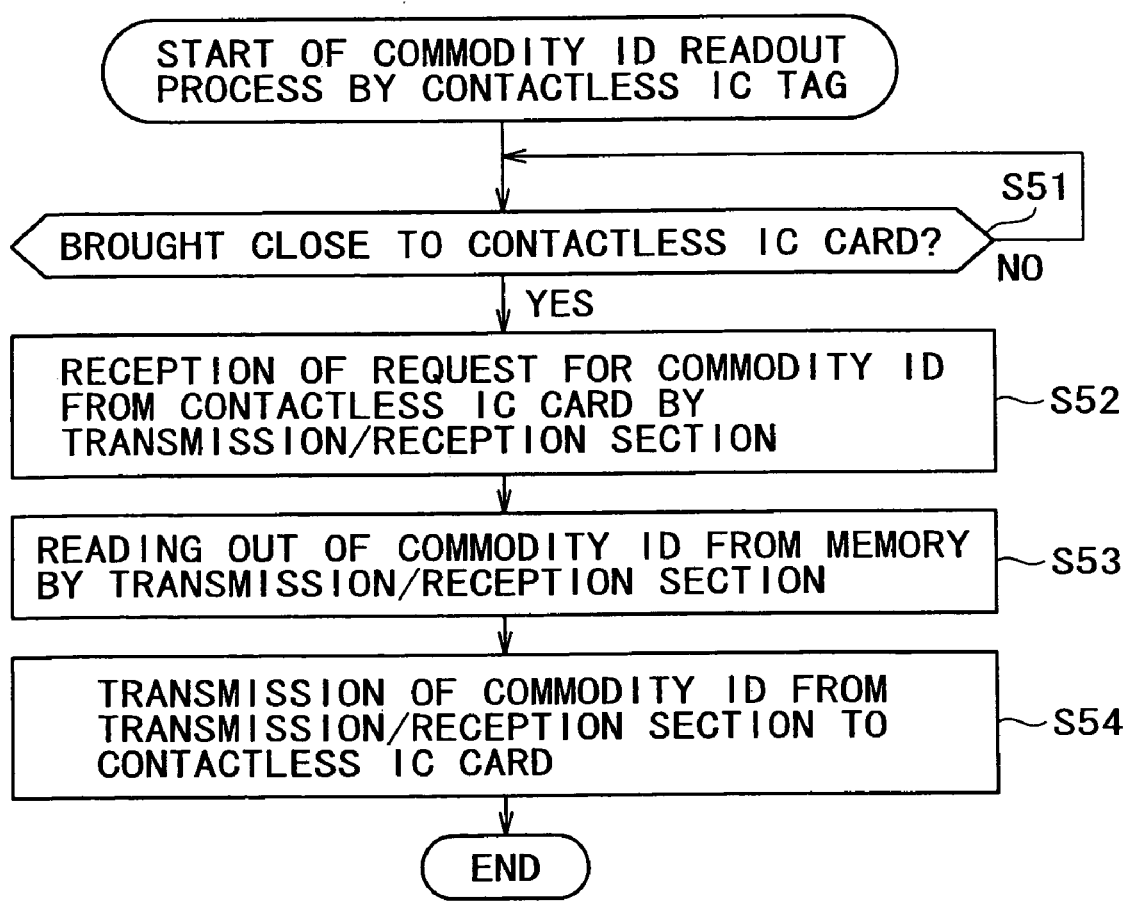
FIG. 11 is a flow chart illustrating a commodity ID readout process by the contactless IC tag of FIG. 5.

By the processes in FIGS. 10 and 11, in the garment selling agent, the user can store a commodity ID of a favorite commodity into the contactless IC card 31 in which the user ID of the user is stored only by bringing the contactless IC card 31 close to the contactless IC tag 36 mounted on the favorite commodity.

Now, a recommendation information display process by the information providing apparatus 34 of FIG. 8 is described with reference to FIGS. 14 and 15. It is to be noted that this process is executed by the information providing apparatus 34 relatively brought close to the contactless IC card 31 at steps S6 to S9 of FIG. 10 described hereinabove. In other words, the process is started in a state wherein at least one commodity ID is stored in the contactless IC card 31 (naturally the user ID of the user is stored in the contactless IC card 31).

At step S101, the IC card reader/writer 401 of the information providing apparatus 34 discriminates whether or not a contactless IC card 31 is relatively brought close thereto (mounted thereon). More particularly, the transmission/reception section 453 of the IC card reader/writer 401 discriminates whether or not the antenna 74 of a contactless IC card 31 is relatively brought close to the antenna 454. If it is discriminated that a contactless IC card 31 is not relatively brought close to the antenna 454, then the process at step S101 is repeated. If a contactless IC card 31 is relatively brought close to (mounted on) the IC card reader/writer 401 of the information providing apparatus 34 as seen in FIG. 13, then an affirmative discrimination is made at step S101.

Figure 13:
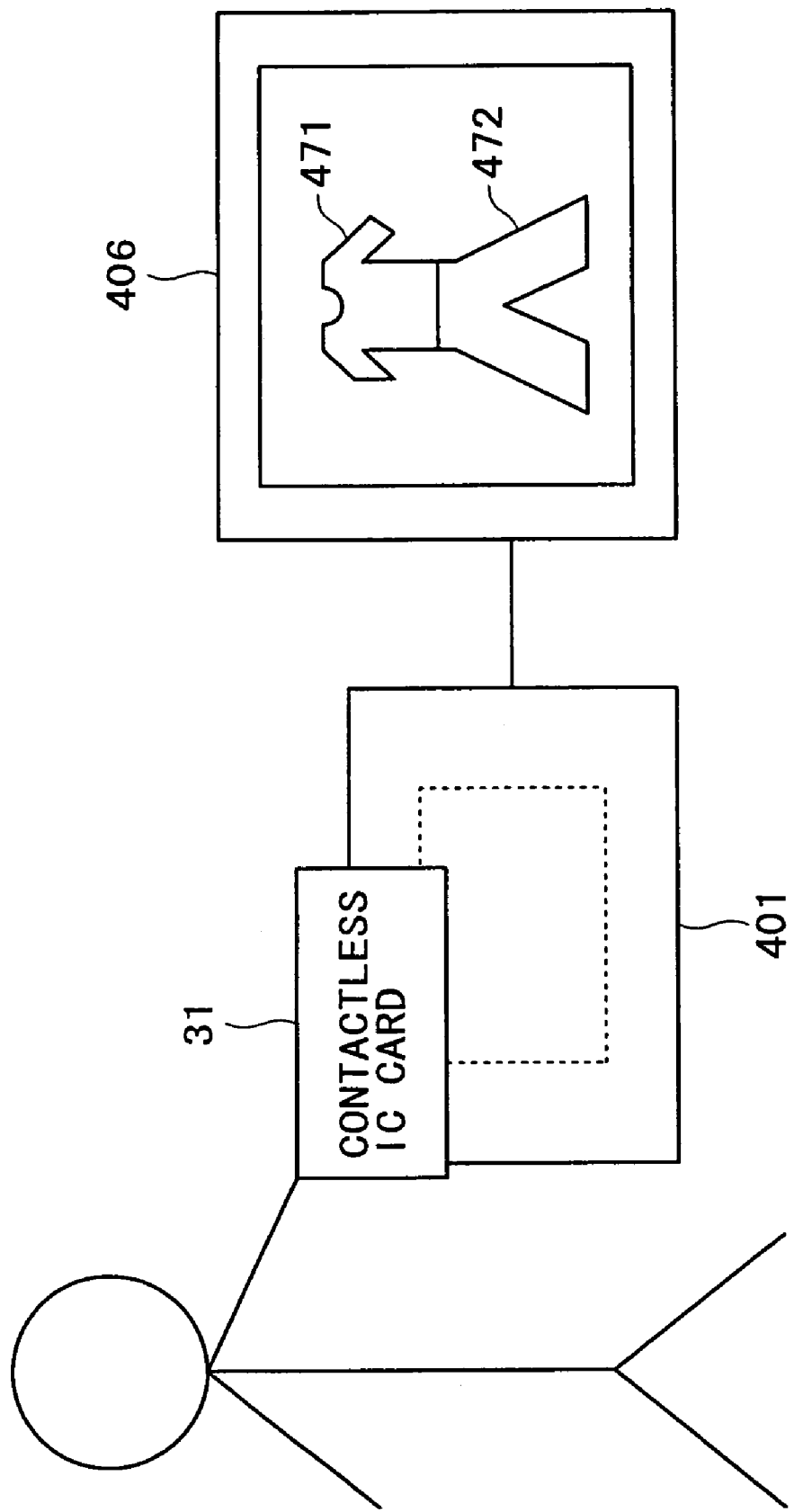
FIG. 13 is a schematic view illustrating communication between a contactless IC card shown in FIG. 1 and the IC card reader/writer shown in FIG. 8.

If it is discriminated at step S101 that a contactless IC card 31 is relatively brought close to the IC card reader/writer 401 (when the state illustrated in FIG. 13 is detected), then the processing advances to step S102, at which the requesting section 402 produces a signal for requesting the user ID and a commodity ID or IDs stored in the memory 72 of the closely positioned contactless IC card 31 to the contactless IC card 31 and supplies the signal to the IC card reader/writer 401. The IC card reader/writer 401 transmits the requesting signal to the contactless IC card 31 through the antenna 454. As described hereinabove, the contactless IC card 31 has stored in advance therein the user ID (identification information) of the user who owns the contactless IC card 31 and further has one or more commodity IDs corresponding to a commodity or commodity favorite to the user stored therein as a result of the processes at steps S1 to S5 of FIG. 10.

In response to the request (request by the process at step S102), the contactless IC card 31 transmits the user ID and commodity ID or IDs stored in the memory 72 to the IC card reader/writer 401 (the process at step S8 of FIG. 10). At step S103, the IC card reader/writer 401 receives the user ID and the commodity ID or IDs from the contactless IC card 31. In the present case, the user ID is the user A, and the commodity IDs are the commodity A, commodity B and commodity D. The requesting section 402 acquires the user ID and the commodity ID or IDs received by the IC card reader/writer 401.

At step S104, the requesting section 402 produces a signal for requesting user information corresponding to the acquired user ID and transmits the signal to the transmission section 403. The transmission section 403 transmits a signal for requesting user information corresponding to the user ID to the customer information management server 33 through the Internet 32 at step S105.

As described hereinabove, the customer information management server 33 has the user information corresponding to the user ID stored therein. Therefore, when the request from the information providing apparatus 34 at step S104 is received, the customer information management server 33 reads out user information (in the present example, the user information A) corresponding to the user ID (in the present example, the user A) and transmits the user information to the information providing apparatus 34. More particularly, the communication section 101 of the customer information management server 33 receives the request (signal for requesting user information corresponding to the user ID) through the Internet 32 and outputs the request to the control section 102. The control section 102 reads out the user information corresponding to the user ID from the user information recording section 103 in response to the request and outputs the user information to the communication section 101. The communication section 101 transmits the received user information to the information providing apparatus 34 through the Internet 32.

Then at step S106, the reception section 404 receives the user information (in the present example, the user information A) transmitted thereto from the customer information management server 33 (communication section 101 of the customer information management server 33) through the Internet 32 and supplies the received user information to the recommendation information production section 405. The user information A received then includes, for example, such information as illustrated in FIG. 16.

In the user information 490 illustrated in FIG. 16 (in the present example, the user information A), the user ID is "103176"; the sex "male"; the age group "from 25 to 29"; and the liking information is "soccer" for the sports and "white T-shirt" for the clothes. In this manner, the user information 490 corresponding to the user ID includes the liking information of the user as well as the information relating to the user.

Referring to FIG. 5, at step S107, the requesting section 402 produces a signal for requesting commodity information of the commodity or commodities (in the present example, the commodity information A, commodity information B and commodity information D) corresponding to the commodity ID or IDs (in the present example, the commodity A, commodity B and commodity D) received by the process at step S103 and transmits the signal to the transmission section 403. The transmission section 403 receives the signal and transmits, at step S108, a signal for requesting commodity information of the commodity ID or IDs to the commodity information management server 35 connected locally. If a plurality of IDs are acquired by the process at step S103, then a signal for requesting commodity information corresponding to the plural commodity IDs is produced and transmitted.

As described hereinabove with reference to FIG. 7, the commodity information management server 35 has commodity information corresponding to the commodity IDs recorded therein. Therefore, when the request from the information providing apparatus 34 at step S108 is received, the commodity information management server 35 reads out the commodity information (in the present example, the commodity information A, commodity information B and commodity information D) corresponding to the commodity IDs (in the present example, the commodity A, commodity B and commodity D) and transmits the commodity information to the information providing apparatus 34. More particularly, the communication section 251 of the commodity information management server 35 receives the request (signal for requesting commodity information corresponding to the commodity ID or IDs) and outputs the request to the control section 252. The control section 252 reads out the commodity information corresponding to the commodity ID or IDs in response to the request and outputs the commodity information to the communication section 251. The communication section 251 transmits the commodity information to the information providing apparatus 34.

Thus, at step S109, the reception section 404 receives the commodity information (in the present example, the commodity information A, commodity information B and commodity information D) transmitted thereto from the commodity information management server 35 and supplies the received commodity information to the recommendation information production section 405. One piece of the commodity information received at this time (for example, the commodity information A) includes, for example, such information as illustrated in FIG. 17.

Referring to FIG. 17, in the commodity information 500 illustrated (in the present example, the commodity information A), the commodity ID is "9726420"; the category is T-shirt; the maker is "XX clothing"; the color is "white"; and the size is "M size". In this manner, the commodity information 500 corresponding to a commodity ID includes detailed information of the commodity.

At step S110, the recommendation information production section 405 produces recommendation information based on the user information (user information 490 of FIG. 16) acquired by the process at step S106 and the commodity information (commodity information A, commodity information B and commodity information D) of the commodity or commodities acquired by the process at step S109. For example, where the commodity information A includes information relating to a white T-shirt and the commodity information B includes information relating to a dark T-shirt while the commodity information D includes information relating to a jersey for the soccer, the recommendation information production section 405 produces information for recommending the commodity A and the commodity D as recommendation information based on the information of liking of a white T-shirt and the liking relating to the soccer included in the user information 490 of FIG. 16.

At step S111, the display section 406 displays an image (or text) based on the recommendation information produced by the recommendation information production section 405 and then ends the processing. For example, as seen on the display section 406 of FIG. 13, an image 471 indicating a T-shirt 470 whose commodity ID corresponds to the commodity A and another image 472 indicating a jersey for the soccer whose commodity ID corresponds to the commodity D are displayed.

Through the processes of FIGS. 14 and 15, the recommendation information can be presented based on the liking information of the user and the information of the commodity or commodities favorite to the user in the selling agent. In other words, information conforming with the liking of the user can be provided.

Further, since the customer information management server 33 is connected to the Internet 32 as in the information providing system 1 shown in FIG. 1, the customer information management server 33 can be utilized also by another selling agent. For example, if the contactless IC cards 31 are credit cards and a credit company manages the customer information management server 33, then information can be provided to customers and selling agents who utilize the credit card system.

It is to be noted that, while the commodities in the example described above are garments, they are not limited to them, but the information providing system 1 can be applied to commodities sold by selling agents such as furniture, books and CDs (Compact Discs) and all objects such as books and rented CDs which are lent or borrowed by libraries, CD rental shops and so forth.

Further, the information stored in the contactless IC tag 36 may be any information with which a commodity (object) on which the contactless IC tag 36 is mounted can be identified.

Furthermore, while, in the example described above, the information stored in advance in the contactless IC card 31 is only user ID whereas user information (for example, the user information 490 of FIG. 16) corresponding to the user ID is recorded in the customer information management server 33, the user information may otherwise be stored in advance in the contactless IC card 31. In this instance, since the information providing apparatus 34 can acquire the user ID and the user information from the contactless IC card 31, the necessity for the information providing apparatus 34 to access the customer information management server 33 is eliminated and also the necessity to provide the customer information management server 33 in the information providing system 1 is eliminated.

Further, the customer information management server 33 may be provided in a selling agent, or the commodity information management server 35 may be connected to the Internet 32 so that information may be supplied to another selling agent (for example, a branch shop).

Furthermore, while the information stored in advance in the contactless IC tag 36 is only a commodity ID whereas commodity information (for example, the commodity information 500 of FIG. 17) corresponding to the commodity ID is recorded in the commodity information management server 35, the commodity information may otherwise be stored in the contactless IC tag 36 in advance. In this instance, since the information providing apparatus 34 can acquire the commodity ID and the commodity information from the contactless IC tag 36, the necessity for the information providing apparatus 34 to access the commodity information management server 35 is eliminated, and also the necessity to separately provide the commodity information management server 35 in the information providing system 1 is eliminated.

Further, while the user information in the example described above is such user information 490 as illustrated in FIG. 16, it is not limited to this but may be any information which relates to the user. For example, the user information may only include liking information or may include a history of commodities purchased by the user. Also the commodity information is not limited to such commodity information 500 as illustrated in FIG. 17, but may be any information relating to a commodity. For example, the commodity information may only include a genre of commodities.

Furthermore, while the information providing apparatus 34 presents (displays) a recommendable commodity or commodities based on liking information of the user from among a plurality of commodities (favorite commodities) close to which the user brings the contactless IC card 31, alternatively the information providing apparatus 34 may produce information which recommends the user to purchase a commodity in combination with another commodity (favorite commodity) close to which the user brings the contactless IC card 31 and present (display) the information.

Now, examples of recommendation information produced by the recommendation information production section 405 of the information providing apparatus 34 are described.

For example, the information may be such as to recommend only those commodities really favorite to the user in coordination from among a plurality of commodities corresponding to commodity IDs read by the contactless IC card 31 by operation of the user. Further, the information may be such as to recommend a commodity which may cause the user to look more foppish if it is purchased together with a commodity corresponding to a commodity ID read by the contactless IC card 31 by operation of the user.

Furthermore, the recommendation information may additionally include a commodity which is often purchased by other users having a same age group or a same hobby or liking as that of the user. Further, the recommendation information may additional include some other commodity purchased by some other user who has purchased a like commodity to that corresponding to the commodity ID read by the user using the contactless IC card 31.

Where a purchase history in the past is utilized to produce recommendation information, the purchase history of the user should be stored into the information providing apparatus 34. Further, the purchase history of the user read by the information providing apparatus 34 may be transmitted through the Internet 32 to the customer information management server 33 so that it may be recorded together with the user information or may be recorded into the commodity information management server 35 in the selling agent. Furthermore, the purchase history may be stored into the memory 72 of the contactless IC card 31. Where the purchase history is recorded in this manner, for example, a commodity or commodities suitable for a commodity or commodities purchased by the user in the past may be selectively recommended from among a plurality of commodity IDs read by the user using the contactless IC card 31.

As described above, by bringing the contactless IC card 31 owned by the user and having at least the identification information of the user stored therein to a commodity on which a contactless IC tag 36 in which at least identification information of the commodity is stored is mounted, the selling agent side can recommend a commodity conforming to the liking of the user.

In other words, the selling agent side can provide the user with optimum information, from among those of commodities actually sold by the selling agent, of an object of purchase close to which the user actually brings the contactless IC card 31 (that is, those commodities in which the user is actually interested).

Further, the selling agent side can recommend more suitable purchase while the user can find out more suitable commodities to the user itself.

It is to be noted that, while the examples described above relate to a case wherein the medium owned by a user is a contactless IC card 31, the medium may not be limited to this, but the user may own, for example, a portable terminal in which a contactless IC chip is embedded. Further, although the user brings its contactless IC card 31 close to a commodity to store only the commodity ID of the favorite commodity into the contactless IC card 31, otherwise the commodity IDs of all commodities in the selling agent may be stored into the contactless IC chip (contactless IC chip embedded in the portable terminal) when the user enters the selling agent. In this instance, recommendation information is produced from among all of the commodities. This example is described with reference to FIGS. 18 and 19.

Figure 18:
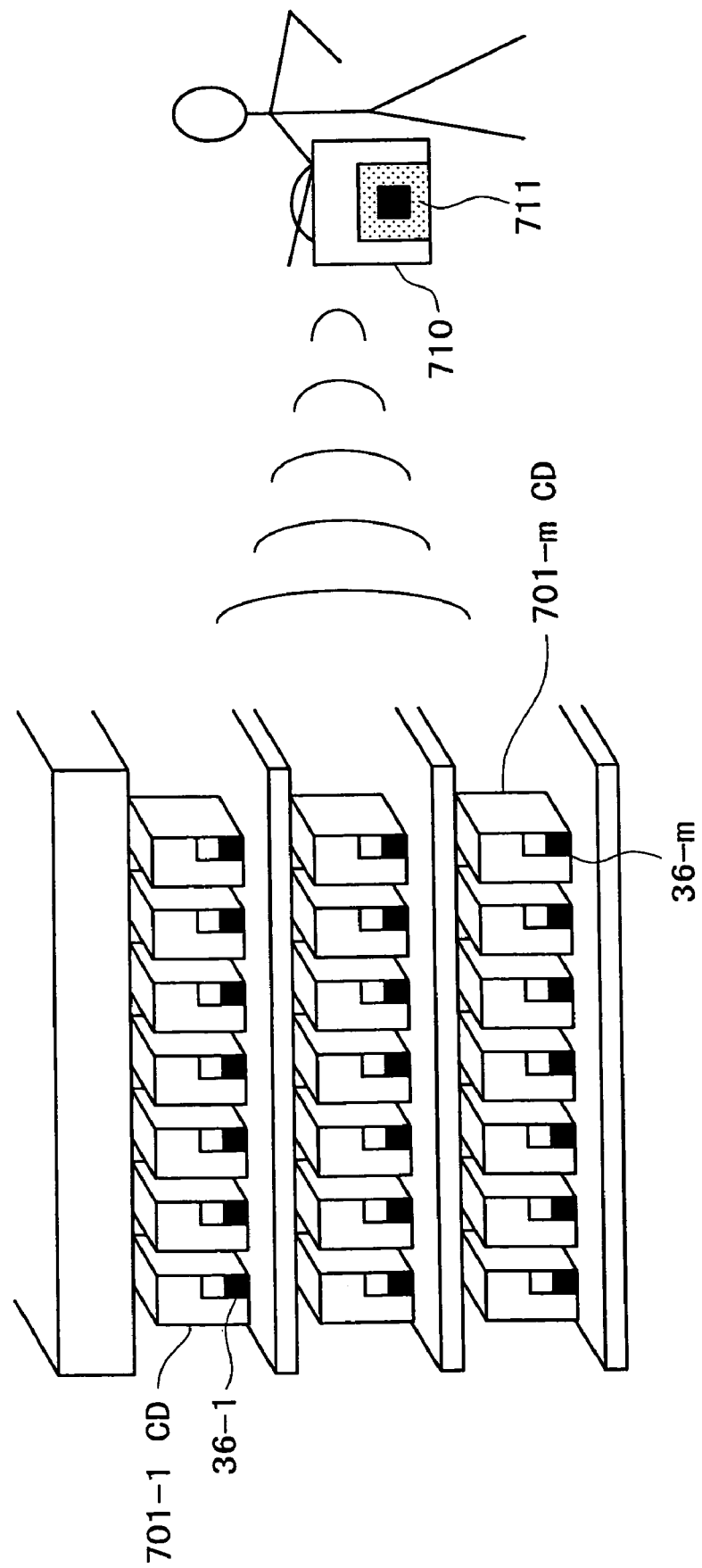
FIG. 18 is a schematic view illustrating a general configuration of another information providing system to which the present invention is applied.

Referring first to FIG. 18, the user owns a portable terminal 710 in which a contactless IC chip 711 is embedded. The contactless IC chip 711 has functions similar to those of the contactless IC card 31 described hereinabove. In particular, the contactless IC chip 711 has identification information of the user stored therein. Further, the contactless IC chip 711 can read information (commodity ID and so forth) stored in a contactless IC tag 36.

When the user who owns the contactless IC chip 711 enters a selling agent, the contactless IC chip 711 acquires and stores identification information (commodity IDs) of all commodities in the selling agent. More particularly, since the communication between the contactless IC chip 711 and a contactless IC tag 36 is controlled so as to be performed within a range of, for example, a radius of 20 m, the contactless IC chip 711 acquires identification information (commodity IDs) stored in the contactless IC tags 36 mounted on all commodities located within the range of a radius of 20 m. While, in the present example, the communication between the contactless IC chip 711 and a contactless IC tag 36 is limited to the range of a radius of 20 m, the range of communication is not limited to this, but it may be set within a radium of 10 m or another radius of 50 m depending upon the scale of the selling agent.

In the example of FIG. 18, the contactless IC chip 711 reads and stores all of m commodity IDs stored in contactless IC tags 36-1 to 36-m mounted on CDs 701-1 to 701-m in a CD shop, respectively. More particularly, the contactless IC chip 711 may issue a request for a commodity ID to all of the contactless IC tags 36-1 to 36-m close to which the contactless IC chip 711 is relatively brought within the range of a radius of 20 m by the processes at steps S1 to S5 of FIG. 10 described hereinabove to acquire the commodity IDs of them.

Further, the portable terminal 710 has functions similar to those of the information providing apparatus 34 described hereinabove and includes a radio communication interface, for example, complying with the IEEE (Institute of Electrical Electronic Engineers) 1394 standards. In particular, the portable terminal 710 can acquire commodity information corresponding to a commodity ID from the commodity information management server 35 installed in the selling agent via the radio communication interface and acquire user information corresponding to a user ID from the customer information management server 33 through a base station not shown and the Internet 32. Further, the portable terminal 710 can produce recommendation information.

Further, for example, where a user ID and user information are stored in advance in a storage section (not shown) of the portable terminal 710, the portable terminal 710 need not acquire the user information from the customer information management server 33 but may merely acquire only commodity information from the commodity information management server 35 installed in the selling agent. Further, where commodity information is stored in the memory 201 of the contactless IC tag 36 as described above, only it is necessary for the portable terminal 710 to read the commodity information from a contactless IC tag 36 (the portable terminal 710 need not access the commodity information management server 35). It is to be noted that, while a radio communication interface is utilized for the communication in the example just described, infrared rays may alternatively be used for the communication.

Figure 19:
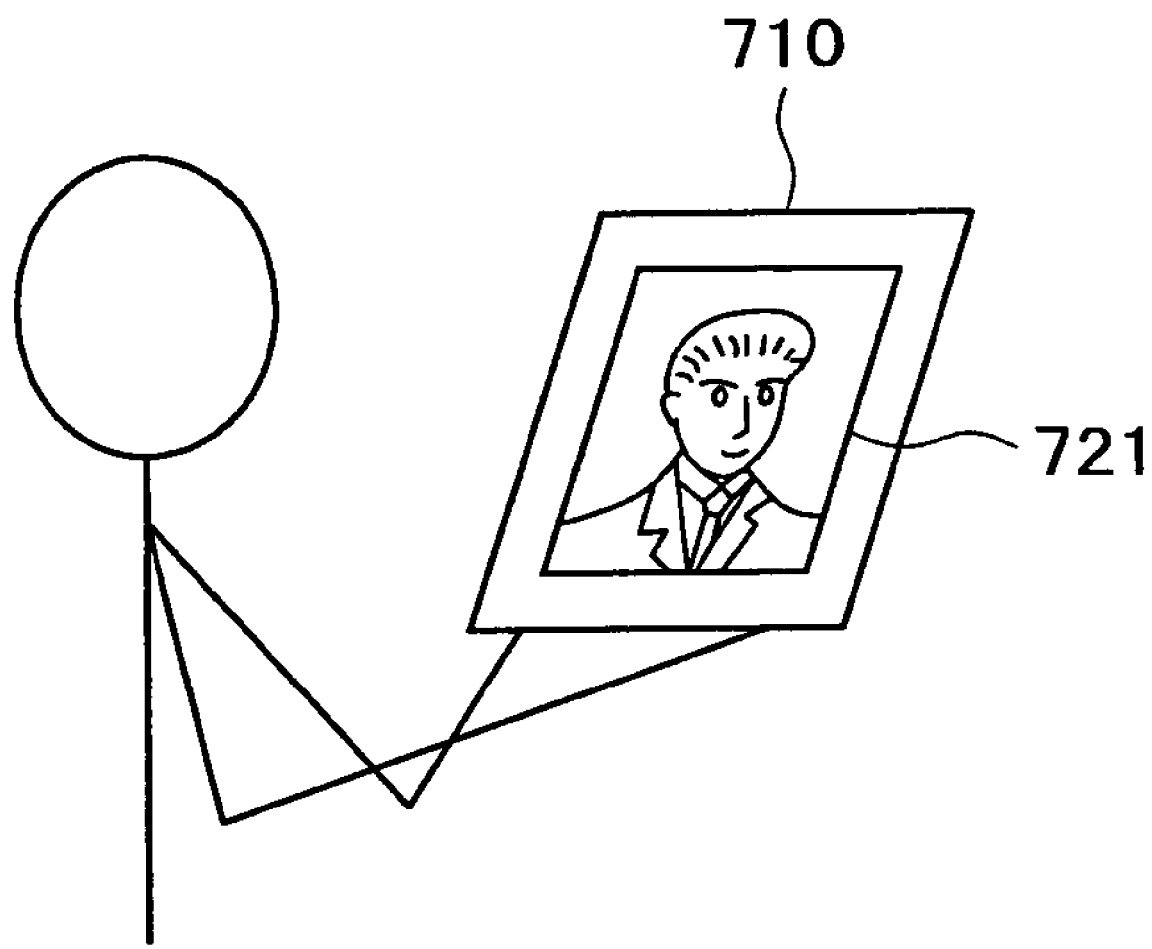
FIG. 19 is a schematic view showing an example wherein an image based on recommendation information is displayed on a portable terminal shown in FIG. 18.

Consequently, the portable terminal 710 can produce recommendation information based on user information and commodity information corresponding to all commodities in the selling agent (all commodities within the range of a radius of 20 m) and display an image based on the recommendation information on a display section 721 of the portable terminal 710 (a display section corresponding to the display section 406 of the information providing apparatus 34 because the portable terminal 710 has functions similar to those of the information providing apparatus 34) as seen in FIG. 19.

It is to be noted that, while, in the present example, a recommendation information production section (function corresponding to the recommendation information production section 405 of FIG. 8) is provided in the portable terminal 710, it need not necessarily be provided in the portable terminal 710, but, for example, the information providing apparatus 34 may be provided in the selling agent (FIG. 1) such that recommendation information may be produced by the information providing apparatus 34 side and passed to the portable terminal 710. More particularly, a user information and a commodity ID or IDs acquired by the portable terminal 710 are transmitted to the information providing apparatus 34 (transmitted by communication which utilizes a radio communication interface or electromagnetic induction), and the information providing apparatus 34 produces recommendation information based on the received user information and commodity ID or IDs and sends back the produced recommendation information.

In this manner, the portable terminal 710 which includes the contactless IC chip 711 can display a recommendable commodity or commodities based on the liking of the user from among all of the commodities in the selling agent as recommendation information.

The user can enjoy a presentation of recommendation information conforming to the liking of the user rapidly only when it enters the selling agent and therefore can save the time required to intentionally search for a commodity or commodities conforming to the liking of the user.

Further, by allowing the portable terminal 710, which is owned by the user and in which the contactless IC chip 711 storing at least identification information of the user is embedded, to acquire identification information of all commodities on each of which a contactless IC tag 36 in which at least identification information of the commodity is stored is mounted, the selling agent side can recommend a commodity or commodities conforming to the liking of the user.

Furthermore, the selling agent side can provide optimum information to the user from among those commodities which are actually sold by the selling agent and make an object of purchase.

It is to be noted that, while, in the examples described above, identification information of a user is stored in a contactless IC card 31 or a contactless IC chip 711 to acquire identification information of a commodity, the medium is not limited to them, but any medium may be used even if it utilizes electromagnetic induction for communication. This similarly applies to the contactless IC tag 36.

While the series of processes described above can be executed by hardware, it may otherwise be executed by software. In this instance, the processes described above are executed by such an information providing apparatus 34 as shown in FIG. 20.

Figure 20:
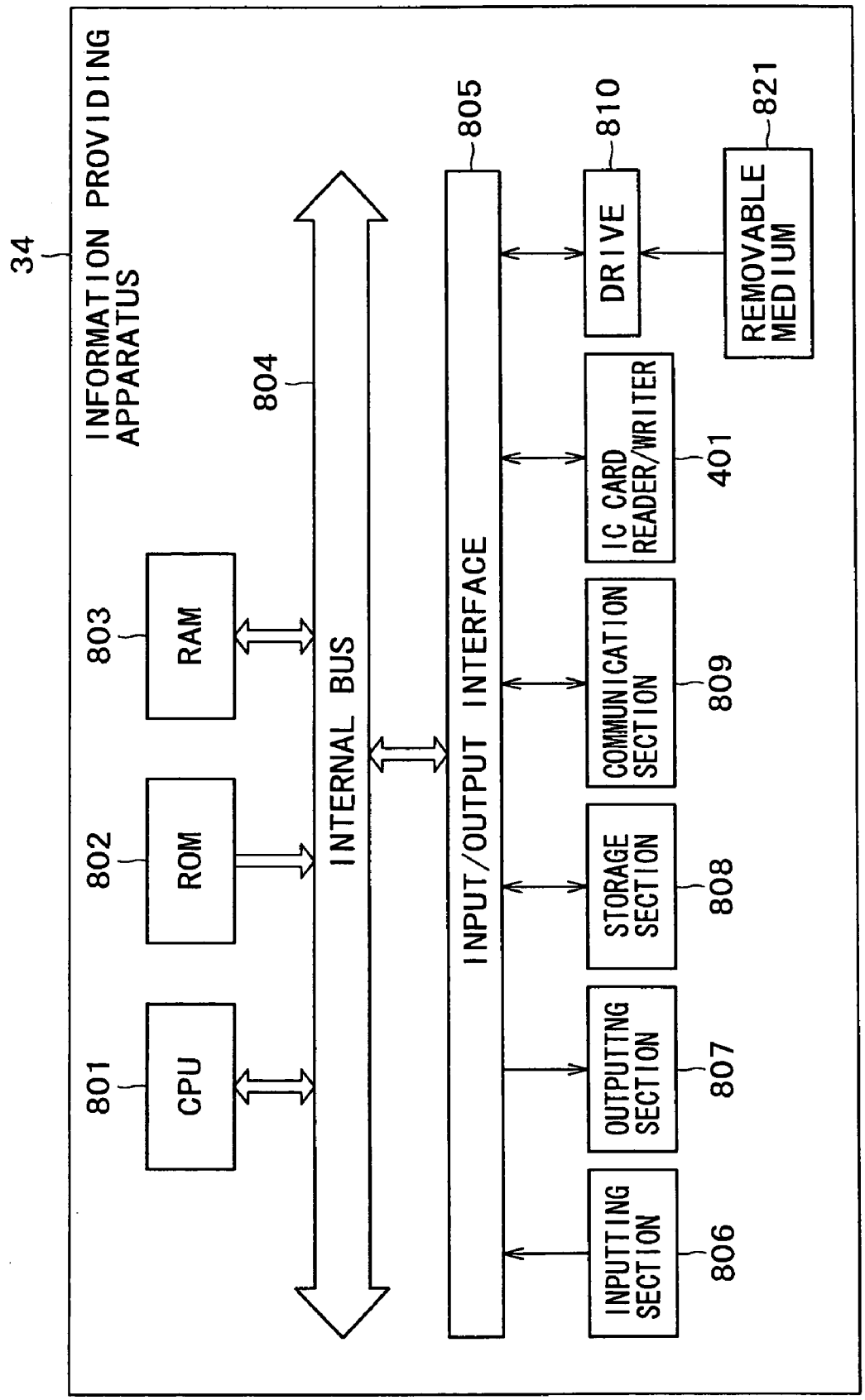
FIG. 20 is a block diagram showing an example of a configuration of a personal computer to which the present invention is applied.

Referring to FIG. 20, a central processing unit (CPU) 801 executes various processes in accordance with a program stored in a ROM (Read Only Memory) 802 or a program loaded from a storage section 808 into a RAM (Random Access Memory) 803. Also data necessary for the CPU 801 to execute the processes are suitably stored into the RAM 803.

The CPU 801, ROM 802 and RAM 803 are connected to one another by an internal bus 804. Also an input/output interface 805 is connected to the internal bus 804.

An inputting section 806 including a keyboard, a mouse and so forth, an outputting section 807 including a display unit which may be a CRT or an LCD (Liquid Crystal Display) unit, a speaker and so forth, a storage section 808 formed from a hard disk or the like, a communication section 809 including a modem, a terminal adapter and so forth, and an IC card reader/writer 401 are connected to the input/output interface 805. The communication section 809 performs a communication process through various networks including a telephone circuit and a CATV.

Further, as occasion demands, a drive 810 is connected to the input/output interface 805. A removable medium 821 which may be a magnetic disk, an optical disk, a magneto-optical disk or a semiconductor memory is suitable loaded into the drive 810, and a computer program read from the removable medium 821 by the drive 810 is installed into the storage section 808 as occasion demands.

Where the series of processes is executed by software, a program which constructs the software is installed from a network or a recording medium.

The recording medium is formed as a package medium such as, as shown in FIG. 20, a removable medium 821 which has the program recorded thereon or therein and is distributed to provide the program to a user separately from a computer. Else, the recording medium is formed as a ROM 802, a hard disc included in the storage section 808 in which the program is recorded and which is provided to a user in a state wherein the program is incorporated in an apparatus body in advance.

FIG. 21 shows an example of a general configuration of a further information providing system 1001 to which the present invention is applied.

Referring to FIG. 21, a contactless IC (Integrated Circuit) card 1031 is owned by a user and has stored in advance therein identification information (user ID) of the user by whom the contactless IC card 1031 is owned. Contactless IC chips 1032-1 to 1032-n are mounted on n shelves (shelves for books) classified, for example, for different genres and individually have identification information (genre IDs) of the genres stored therein. Here, n is an arbitrary number equal to or greater than 1.

m books on which contactless IC tags 1033-1-1 to 1033-1-m are mounted are placed on the shelf for books on which the contactless IC chip 1032-1 is mounted while books on which contactless IC tags 1033-n-1 to 1033-n-m are mounted are placed on the shelf for books on which the contactless IC chip 1032-n is mounted. Such contactless IC tags are mounted in all books in a selling agent, and each of the contactless IC tags has stored therein a book ID which corresponds to the book on which the contactless IC tag is mounted. m is an arbitrary number equal to or greater than 1, and in the example of FIG. 21, m=7 since seven books are placed.

In the following description, where there is no necessity to individually distinguish the contactless IC chips 1032-1 to 1032-n from one another, any of them is referred to merely as contactless IC chip 1032, and where there is no necessity to individually distinguish the contactless IC tags 1033-1-1 to 1033-1-m and the contactless IC tags 1033-n-1 to 1033-n-m, any of them is referred to merely as contactless IC tag 1033.

Each of the contactless IC chips 1032 has an IC card reader function and utilizes, when it is relatively brought close to a contactless IC card 1031 or a contactless IC tag 1033, electromagnetic induction to communicate with it and read information stored in it, and then transmits the information to a book information management server 1037 through a LAN (Local Area Network) 1035.

A display apparatus 1034 communicates with the book information management server 1037 through the LAN 1035 and communicates with a customer information management server 1038 through the LAN 1035 and the Internet 1036. The book information management server 1037 is connected to the LAN 1035 and communicates with the contactless IC chips 1032 through the LAN 1035 to manage information of the books placed on the shelves. The customer information management server 1038 communicates with a contactless IC chip 1032 or the display apparatus 1034 through the Internet 1036 and the LAN 1035 and manages liking information relating to likings of users.

The customer information management server 1038 has stored therein in advance user information corresponding to identification information (user ID) stored in the contactless IC card (for example, user information including hobby and liking information). For example, a credit company who sells a credit card as a contactless IC card 1031 performs such processes as to acquire information including hobby and liking information of the user, store the information into the contactless IC card 1031 and record user information corresponding to the identification information and other necessary processes.

The book information management server 1037 has stored in advance therein book information corresponding to identification (book IDs) of the books stored in the contactless IC tags 1033-1 to 1033-m (for example, book information including a genre, an author, an age group, an amount of money and so forth). For example, upon arrival of books, the book store side performs such processes as to record book IDs and corresponding book information into the contactless IC tags 1033-1 to 1033-m and the book information management server 1037.

It is to be noted that the contactless IC chip 1032, contactless IC tag 1033, book information management server 1037 and display apparatus 1034 are provided in the book store (selling agent). On the other hand, the customer information management server 1038 is provided outside the book store (for example, managed by the credit company) and connected by the Internet 1036.

Further, in the example of FIG. 21, while it is shown that only one user owns a contactless IC card 1031, a plurality of users may each own a contactless IC card 1031. In this instance, the contactless IC cards 1031 have stored in advance therein identification information (user IDs) different among the different users by whom they are owned.

The contactless IC card 1031 of FIG. 21 has a functional configuration same as that of the contactless IC card 31 described hereinabove with reference to FIG. 2. Therefore, overlapping description of the contactless IC card 1031 is omitted herein to avoid redundancy.

User information corresponding to the identification information (user ID) of the user and stored in the memory 72 of the contactless IC card 1031 shown in FIG. 2 is stored in the customer information management server 1038 of FIG. 22.

FIG. 22 shows an example of a functional configuration of the customer information management server 1038 shown in FIG. 21.

The customer information management server 1038 includes a reception section 1101, a read information storage section 1102, a customer information recording section 1103, a recommendation information production section 1104, a requesting section 1105 and a transmission section 1106.

The reception section 1101 receives information transmitted from another apparatus through the Internet 1036 and transmits the received information to the read information storage section 1102, recommendation information production section 1104 or requesting section 1105. The read information storage section 1102 stores information supplied thereto from the reception section 1101 and supplies the stored information to the recommendation information production section 1104. The customer information recording section 1103 stores a user ID and user information (information including hobby and liking information of the user) corresponding to the user ID.

The customer information recording section 1103 has stored in advance therein user information similar to that described hereinabove with reference to FIG. 4. Therefore, detailed description of the customer information recording section 1103 relating to user information is omitted herein to avoid redundancy. It is to be noted, however, that details of the user information are hereinafter described with reference to FIG. 39.

The recommendation information production section 1104 produces recommendation information, which is to be recommended to the user, based on the user information recorded in the customer information recording section 1103 and book information, and outputs the recommendation information to the transmission section 1106. The requesting section 1105 produces a signal for requesting predetermined information to another apparatus and supplies the signal to the transmission section 1106. For example, the requesting section 1105 produces a signal for requesting the book information management server 1037 for book information corresponding to a book genre ID received by the reception section 1101 and supplies the signal to the transmission section 1106.

The transmission section 1106 transmits recommendation information supplied thereto from the recommendation information production section 1104 or a requesting signal supplied thereto from the requesting section 1105 to an object apparatus through the Internet 1036.

The contactless IC tags 1033 mentioned hereinabove with reference to FIG. 21 have a functional configuration same as that of the contactless IC tag 36 described hereinabove with reference to FIG. 5. Therefore, overlapping description of the functional configuration of the contactless IC tags 1033 is omitted hereinto avoid redundancy.

Figures 23, 24:
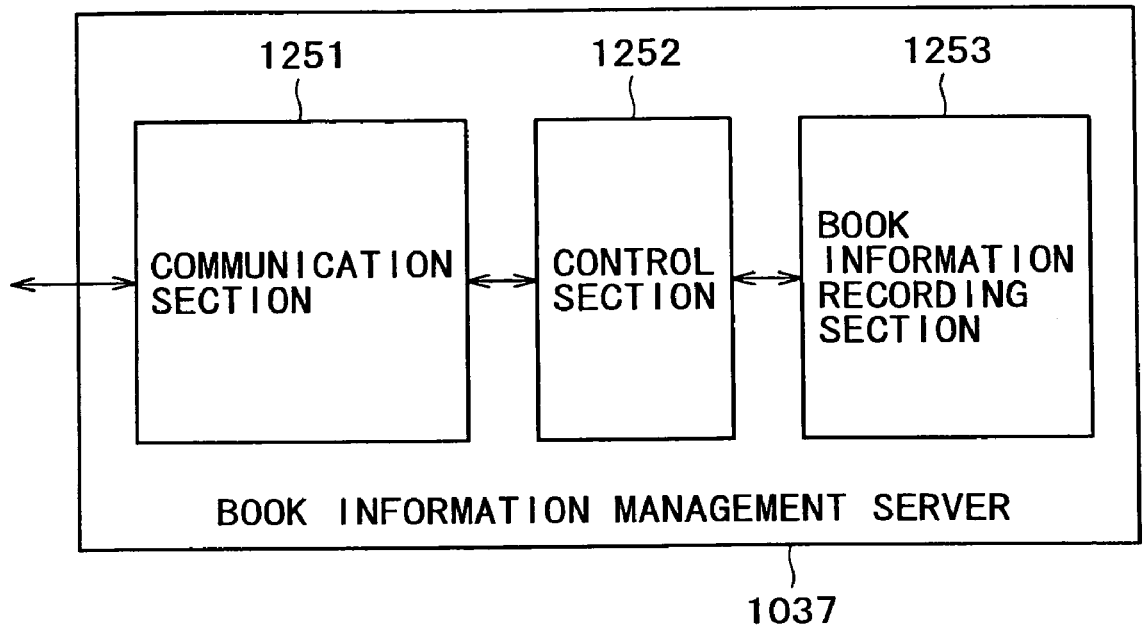
FIG. 23 is a block diagram showing an example of a functional configuration of a book information management server shown in FIG. 21.
FIG. 24 is a view illustrating information recorded in a book information recording section shown in FIG. 23.

FIG. 23 shows an example of a functional configuration of the book information management server 1037 shown in FIG. 21.

Referring to FIG. 23, the book information management server 1037 includes a communication section 1251, a control section 1252 and a book information recording section 1253.

The book information recording section 1253 has recorded therein genre IDs of the shelves for books stored in the contactless IC chips 1032-1 to 1032-n, books IDs of a plurality of books placed on the shelves and book information of the books as seen in FIG. 24. Referring to FIG. 24, in the example illustrated, the number of shelves for books is 4 (n=4), and the genre IDs corresponding to the shelves for books are genre A, genre B, genre C and genre D. Further, the book IDs corresponding to the genre IDs are book E and book F for genre A, book G and book H for genre B, book I and book J for genre C and book K and book L for genre D. Further, the book information corresponding to the book IDs is book information E for book E, book information F for book F, and book information G for book G and is stored in the book information recording section 1253. Each piece of the book information includes information of the genre, author, age group, amount of money and so forth of a book corresponding to a book ID. It is to be noted that details of the book information are hereinafter described with reference to FIG. 38.

Referring back to FIG. 23, in the example illustrated, the communication section 1251 communicates with the contactless IC chip 1032 through the LAN 1035 and communicates with the customer information management server 1038 through the LAN 1035 and the Internet 1036. The control section 1252 executes a control process for reading out information from the book information recording section 1253 and other necessary processes.

Figure 25:
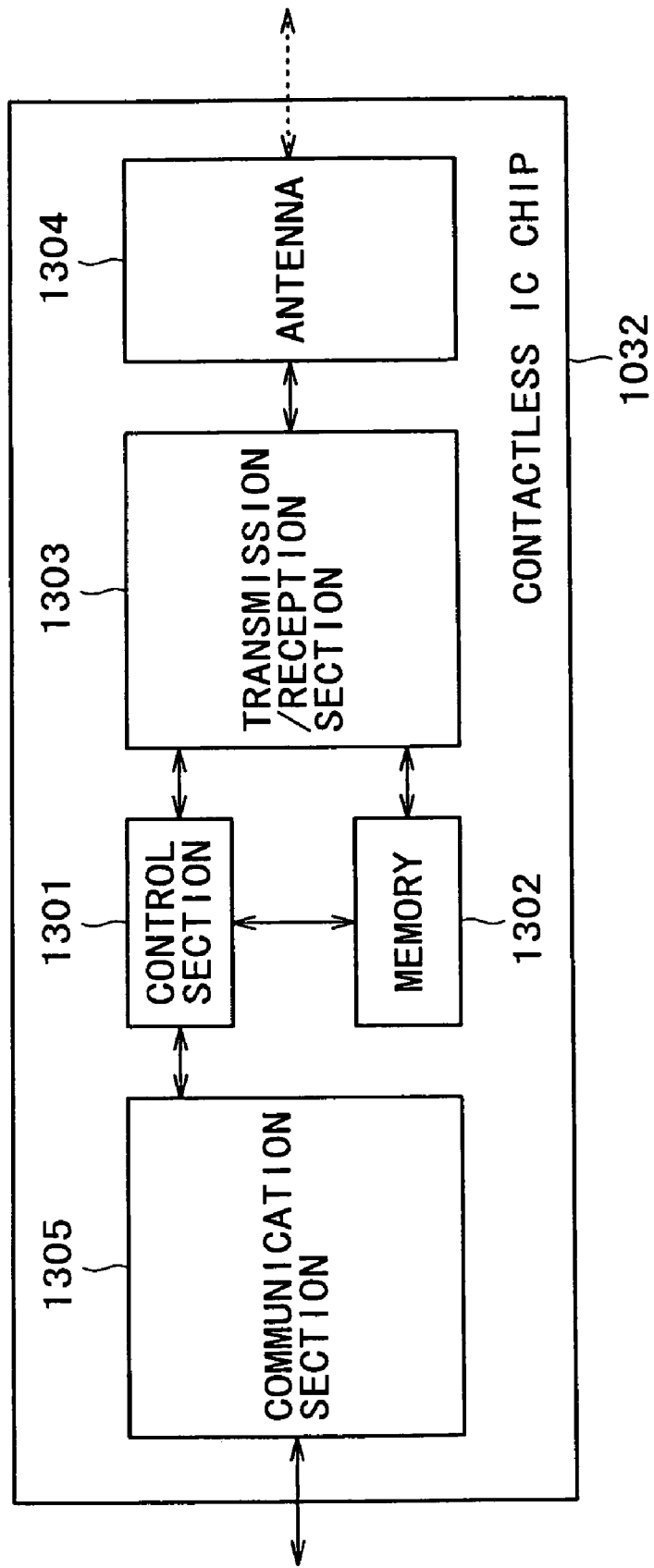
FIG. 25 is a block diagram showing an example of a functional configuration of a contactless IC chip shown in FIG. 21.

FIG. 25 shows an example of a functional configuration of the contactless IC chips 1032 of FIG. 21.

Referring to FIG. 25, each contactless IC chip 1032 includes a control section 1301, a memory 1302, a transmission/reception section 1303, an antenna 1304 and a communication section 1305.

The memory 1302 has stored in advance therein identification information (genre ID) of the shelf for the book on which the contactless IC chip 1032 is mounted. The transmission/reception section 1303 controls communication with an apparatus which can utilize electromagnetic induction for communication through the antenna 1304. The control section 1301 executes a control process for reading out information from the memory 1302 and other necessary processes. The communication section 1305 communicates with the book information management server 1037 through the LAN 1035 and communicates with the customer information management server 1038 through the LAN 1035 and the Internet 1036.

Figure 26:
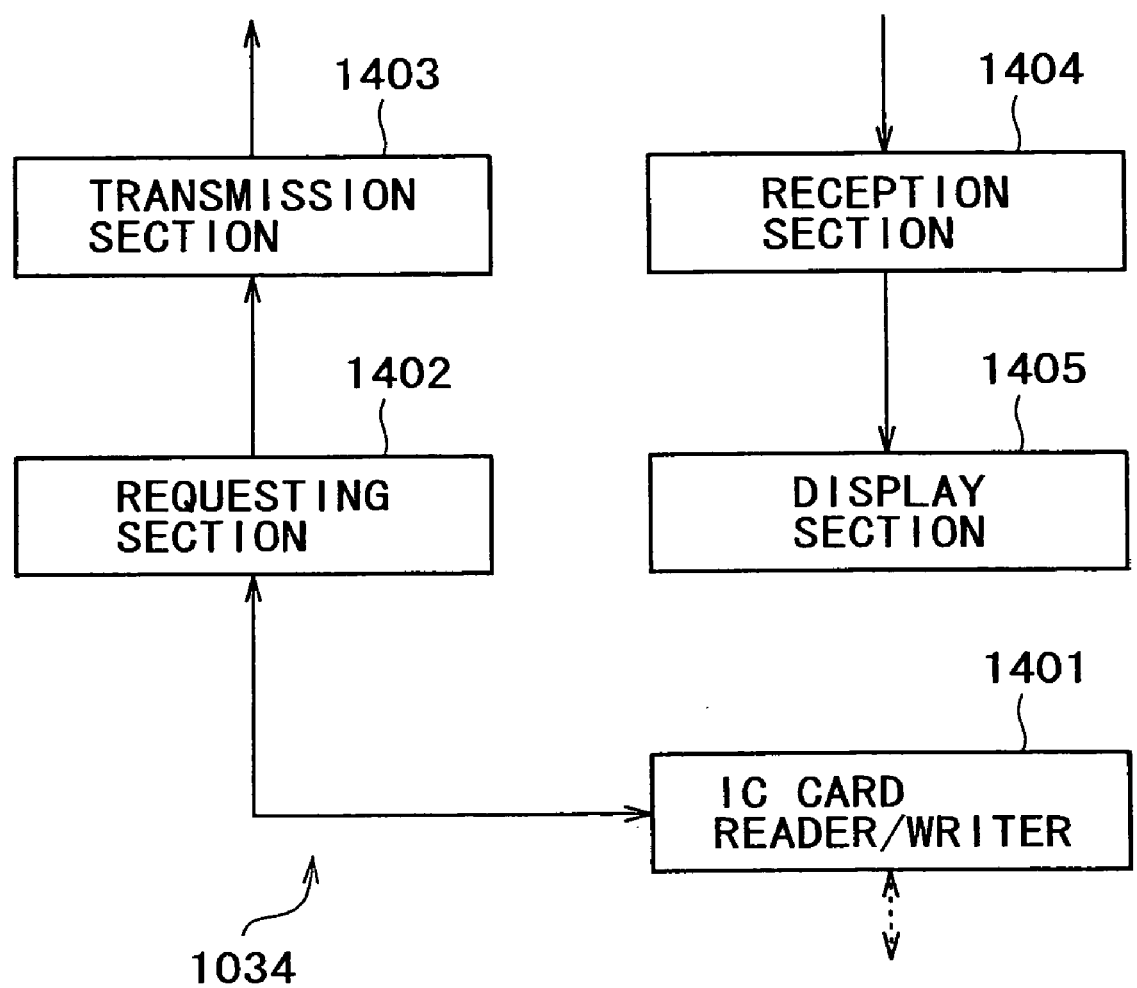
FIG. 26 is a block diagram showing an example of a functional configuration of a display apparatus shown in FIG. 21.

FIG. 26 shows an example of a functional configuration of the display apparatus 1034 of FIG. 21.

Referring to FIG. 26, the display apparatus 1034 includes an IC card reader/writer 1401, a requesting section 1402, a transmission section 1403, a reception section 1404 and a display section 1405.

The IC card reader/writer 1401 utilizes electromagnetic induction to read or write information from or into another apparatus with which it communicates. The requesting section 1402 transmits a signal for requesting predetermined information to the transmission section 1403 or the IC card reader/writer 1401. The transmission section 1403 transmits information to the book information management server 1037 through the LAN 1035 and transmits information to the customer information management server 1038 through the LAN 1035 and the Internet 1036. The reception section 1404 receives information from the book information management server 1037 through the LAN 1035 or receives information from the customer information management server 1038 through the LAN 1035 and the Internet 1036. The display section 1405 displays an image, a text or the like based on recommendation information supplied from the reception section 1404.

The IC card reader/writer 1401 shown in FIG. 26 has a functional configuration same as that of the IC card reader/writer 401 described hereinabove with reference to FIG. 9. Therefore, overlapping description of it is omitted herein to avoid redundancy. It is to be noted, however, that the memory 452 shown in FIG. 9 of the IC card reader/writer 1401 does not have identification information (user ID) of the user or the like stored therein.

Now, a book management method is described with reference to FIGS. 27 to 29.

First, a book ID reading process executed by the contactless IC chip 1032 of FIG. 25 is described with reference to a flow chart of FIG. 27.

At step S1001, the control section 1301 of the contactless IC chip 1032 produces a book ID requesting signal to a contactless IC tag 1033 and supplies the produced requesting signal to the transmission/reception section 1303.

At step S1002, the transmission/reception section 1303 transmits the book ID requesting signal to all neighboring (for example, within a range of a radius of 50 cm) contactless IC tags 1033 through the antenna 1304. For example, when the contactless IC chip 1032-1 executes the processes at steps S1001 and S1002, the book ID requesting signal is transmitted to the contactless IC tags 1033-1-1 to 1033-1-m which neighbor with the contactless IC chip 1032-1. The contactless IC tags 1033 which receive the requesting signal transmit book IDs (at step S1053 of FIG. 28 hereinafter described) to the contactless IC chip 1032 from which the request signal has been issued.

Thus, at step S1003, the transmission/reception section 1303 of the contactless IC chip 1032 receives the book IDs from the neighboring contactless IC tags 1033 through the antenna 1304 and supplies them to the control section 1301.

At step S1004, the control section 1301 reads out the genre ID (ID corresponding to the shelf for books on which the contactless IC chip 1032 is mounted) stored in the memory 1302.

At step S1005, the communication section 1305 transmits the book IDs received at step S1003 (book IDs of all of the neighboring books) and the genre ID read out at step S1004 to the book information management server 1037 through the LAN 1035 under the control of the control section 1301.

At step S1006, the control section 1301 discriminates whether or not a predetermined period of time (for example, 30 seconds) elapses after the last issuance of a book ID request (production of a book ID requesting signal). The process at step S1006 is repeated until after the predetermined period of time elapses. When it is discriminated that the predetermined period of time elapses, the processing returns to step S1001 so that the processes beginning with the process at step S1001 are repeated.

Figure 27:
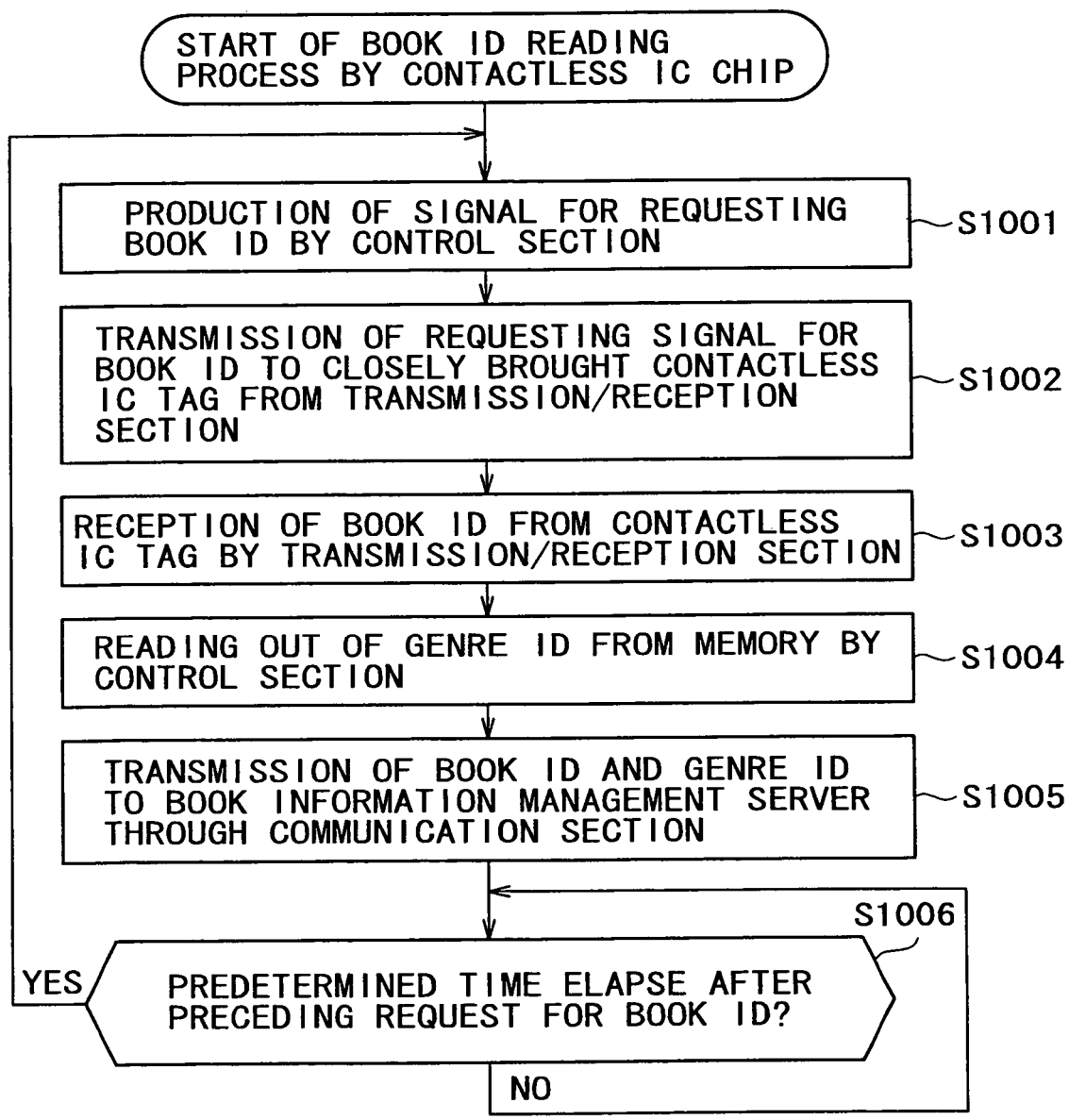
FIG. 27 is a flow chart illustrating a book ID reading process by the contactless IC chip of FIG. 25.

In short, in the process of FIG. 27, the contactless IC chip 1032 acquires book IDs from the neighboring contactless IC tags 1033 after every predetermined period of time and transmits the acquired book IDs to the book information management server 1037 together with the genre ID stored in the contactless IC chip 1032 itself.

Now, a book ID reading out process by a contactless IC tag 1033 of FIG. 5 corresponding to the process by contactless IC chip 1032 of FIG. 27 is described with reference to a flow chart of FIG. 28.

At step S1051, the transmission/reception section 202 of the contactless IC tag 1033 discriminates whether or not a request for a book ID is received from the contactless IC chip 1032 (whether or not a book ID requesting signal is transmitted from the contactless IC chip 1032), and the process at step S1051 is repeated until after it is discriminated that a request for a book ID is received. More particularly, when a book ID requesting signal is transmitted from the contactless IC chip 1032 at step S1002 of FIG. 27, a discrimination of YES is made. In other words, the request for a book ID is transmitted from the neighboring contactless IC chip 1032. In the example of FIG. 21, a book ID request transmitted from the contactless IC chip 1032-1 is received by the contactless IC tags 1033-1-1 to 1033-1-m.

If it is discriminated at step S1051 that a book ID request is received from the contactless IC chip 1032, then the transmission/reception section 202 reads out the book ID from the memory 201. Since the book ID of the book on which the contactless IC tag 1033 is mounted is stored in the memory 201, the book ID is read out.

At step S1053, the transmission/reception section 202 transmits the book ID through the antenna 203 to the contactless IC chip 1032 which has issued the request for a book ID in the process at step S1051, whereafter the process is ended.

Now, a book ID acquiring process by the book information management server 1037 of FIG. 23 corresponding to the process of FIG. 27 by the contactless IC chip 1032 is described with reference to a flow chart of FIG. 29.

At step S1101, the control section 1252 of the book information management server 1037 discriminates whether or not a book ID and a genre ID are transmitted to the book information management server 1037 from a contactless IC chip 1032 (through the LAN 1035) and waits until after they are received. As described hereinabove, the contactless IC chip 1032 transmits a book ID and a genre ID after every predetermined interval of time as described hereinabove with reference to FIG. 27. When a book ID and a genre ID are transmitted from the contactless IC chip 1032 at step S1005 of FIG. 27, the control section 1252 makes a discrimination of YES at step S1101.

When it is discriminated at step S1101 that a book ID and a genre ID are transmitted from the contactless IC chip 1032, the communication section 1251 receives them through the LAN 1035 at step S1102.

At step S1103, the control section 1252 uses the received book ID for updating. Since books are purchased by users, a book sometimes disappears from a bookshelf. Thus, by updating a book ID based on a genre ID, the books placed on the bookshelves can be managed by the book information management server 1037. After the process at step S1103, the processing returns to step S1101 so that the steps described above are repeated.

Figure 28:
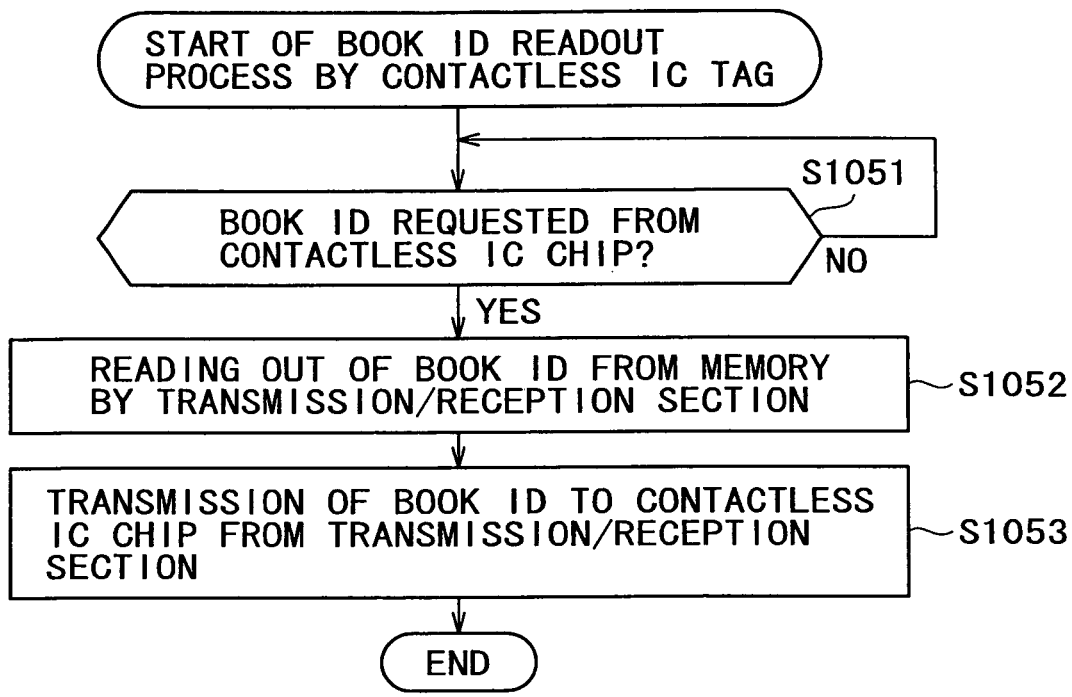
FIG. 28 is a flow chart illustrating a book ID readout process by a contactless IC tag shown in FIG. 21.
Figure 29:
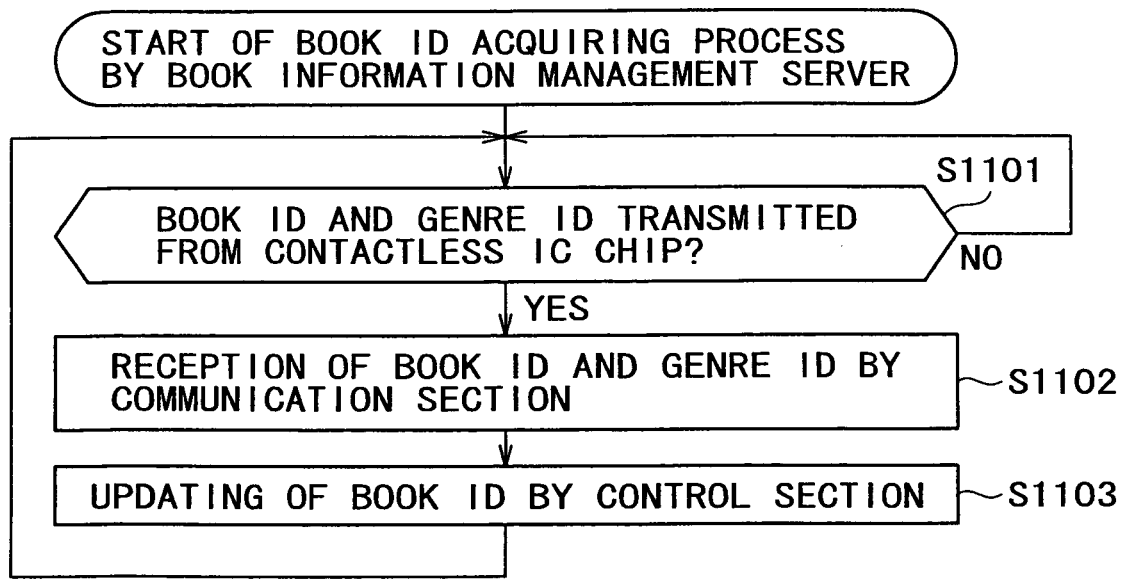
FIG. 29 is a flow chart illustrating a book ID acquiring process by the book information management server of FIG. 23.

By the processes of FIGS. 27 to 29, the contactless IC chip 1032 reads the book IDs stored in the contactless IC tags 1033 neighboring therewith (placed on the bookshelf) after every predetermined interval of time and transmits them to the book information management server 1037 together with the genre ID, and consequently, the book information management server 1037 can manage the books.

It is to be noted that, while, in the example described above, the contactless IC chip 1032 transmits a genre ID to the book information management server 1037 together with book IDs, since the book information corresponding to a book ID includes information also regarding a genre, it is not always necessary to send the genre IDs.

Now, processes executed when a user relatively brings a contactless IC card 1031 thereof close to a bookshelf on which a book in which the user is interested is placed in a selling agent are described with reference to FIGS. 30 to 32. The processes are executed in parallel to those described hereinabove with reference to FIGS. 27 to 29.

First, a user ID acquiring process of the contactless IC chip 1032 of FIG. 25 is described with reference to a flow chart of FIG. 30.

At step S1201, the transmission/reception section 1303 of the contactless IC chip 1032 discriminates whether or not a contactless IC card 1031 is relatively brought close to (for example, positioned within the range of a radius of 50 cm around) the contactless IC chip 1032 and waits until after it is discriminated that a contactless IC card 1031 is relatively brought close to the contactless IC chip 1032. In particular, when a user who owns a contactless IC card 1031 relatively brings the contactless IC card 1031 close to a contactless IC chip 1032 in which the user is interested, the transmission/reception section 1303 makes a discrimination of YES at step S1201.

When it is discriminated at step S1201 that a contactless IC card 1031 is relatively brought close to the contactless IC chip 1032, the control section 1301 produces a signal for requesting a user ID (a user ID requesting signal) and supplies it to the transmission/reception section 1303 at step S1202.

At step S1203, the transmission/reception section 1303 transmits the user ID requesting signal to the closely positioned contactless IC card 1031 (contactless IC card 1031 which has been discriminated to be relatively brought close) through the antenna 1304. For example, if the contactless IC card 1031 is relatively brought close to the contactless IC chip 1032-1, the contactless IC chip 1032-1 transmits a user ID requesting signal to the contactless IC card 1031. The contactless IC card 1031 receives the requesting signal and transmits a user ID (for example, the user A) to the contactless IC chip 1032 from which the request has been issued (in the example described, the contactless IC chip 1032-1) (at step S1254 of FIG. 31 hereinafter described).

Then at step S1204, the transmission/reception section 1303 receives the user ID (for example, user A) from the (closely positioned) contactless IC card 1031 to which the requesting signal has been transmitted through the antenna 1304 and supplies the received user ID to the control section 1301.

At step S1205, the control section 1301 reads out a genre ID stored in the memory 1302 (an ID (for example, genre A) corresponding to a bookshelf on which the contactless IC chip 1032 is mounted).

At step S1206, the communication section 1305 transmits the user ID received at step S1204 and the genre ID (for example, genre A) read out at step S1205 to the customer information management server 1038 through the LAN 1035 and the Internet 1036 under the control of the control section 1301, whereafter the processing is ended.

Figure 30:
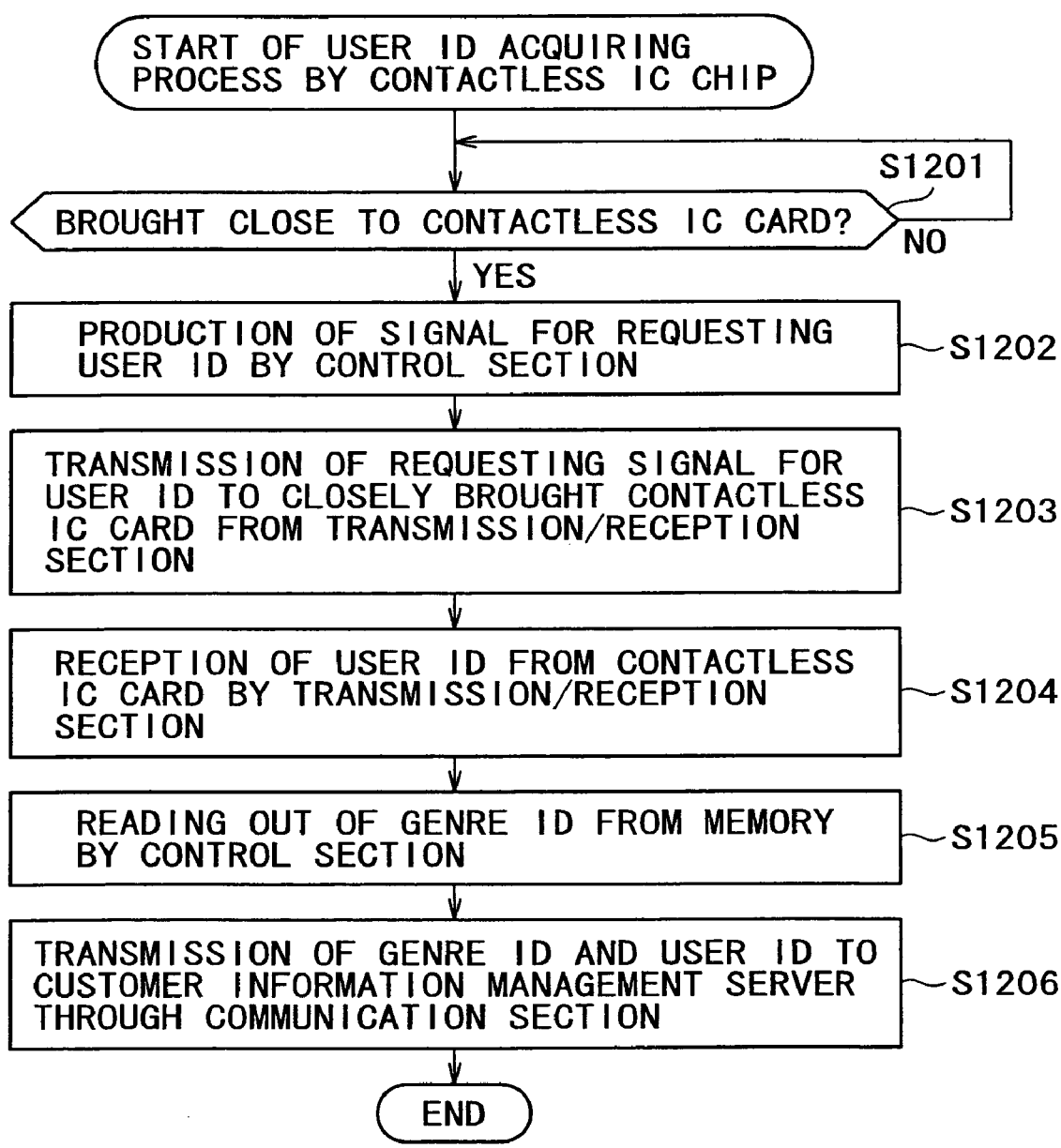
FIG. 30 is a flow chart illustrating a user ID acquiring process by the contactless IC chip of FIG. 25.

By the process of FIG. 30, the contactless IC chip 1032 acquires, when a contactless IC card 1031 owned by a user is brought close thereto, the user ID stored in the contactless IC card 1031, reads out the corresponding genre ID stored in the contactless IC chip 1032 and transmits the user ID and the genre ID to the customer information management server 1038. If this process is repeated, then the genre IDs (one or more genre IDs) of the bookshelves on which books in which the user is interested are placed and the user ID are cumulatively stored into the customer information management server 1038.

Now, a user ID reading out process of the contactless IC card 1031 of FIG. 2 corresponding to the process of FIG. 30 by the contactless IC chip 1032 is described with reference to a flow chart of FIG. 31.

At step S1251, the transmission/reception section 73 (FIG. 2) of the contactless IC card 1031 discriminates whether or not a contactless IC chip 1032 is relatively brought close to the contactless IC card 1031, and waits until it is discriminated that a contactless IC chip 1032 is relatively brought close to the contactless IC card 1031. A user owns a contactless IC card 1031 in which an ID of the user is stored and relatively brings the contactless IC card 1031 close to a shelf on which a book in which the user is interested is placed (a shelf of a genre in which the user is interested) so that communication is performed between the contactless IC card 1031 and the contactless IC chip 1032. This process corresponds to the process at step S1201 of FIG. 30 described above. Thus, when the user who owns the contactless IC card 1031 relatively brings the contactless IC card 1031 close to a contactless IC chip 1032 in which the user is interested, a discrimination of YES is obtained at step S1251.

After it is discriminated at step S1251 that a contactless IC chip 1032 is relatively brought close to the contactless IC card 1031, the transmission/reception section 73 receives a signal for requesting a user ID (user ID requesting signal) from the contactless IC chip 1032. As described hereinabove, when a contactless IC card 1031 is relatively brought close to a contactless IC chip 1032 at step S1201 of FIG. 30 (when a discrimination of YES is made at step S1201), since the contactless IC chip 1032 transmits a user ID requesting signal at step S1203, the contactless IC card 1031 receives the user ID requesting signal.

At step S1253, the transmission/reception section 73 reads out a user ID (in the present example, user A) from the memory 72 in accordance with the user ID requesting signal received at step S1252. Since the user ID corresponding to the user who owns the contactless IC card 1031 is stored in the memory 72, the user ID is read out.

At step S1254, the transmission/reception section 73 transmits the user ID read out by the process at step S1253 (in the present example, user A) to the contactless IC chip 1032 (contactless IC chip 1032 which has transmitted the user ID requesting signal at step S1203) through the antenna 74.

Now, a user ID and genre ID acquiring process by the customer information management server 1038 of FIG. 22 corresponding to the process of FIG. 30 by the contactless IC chip 1032 is described with reference to a flow chart of FIG. 32. It is to be noted that this process is started when a genre ID and a user ID are transmitted from the communication section 1305 of a contactless IC chip 1032 at step S1206 of FIG. 30.

At step S1301, the reception section 1101 receives a genre ID and a user ID (in the present example, genre ID and user A) transmitted from a contactless IC chip 1032 by the process at step S1206 of FIG. 30.

At step S1302, the read information storage section 1102 stores the genre IA and the user ID received at step S1301, whereafter the processing is ended.

Figure 31:
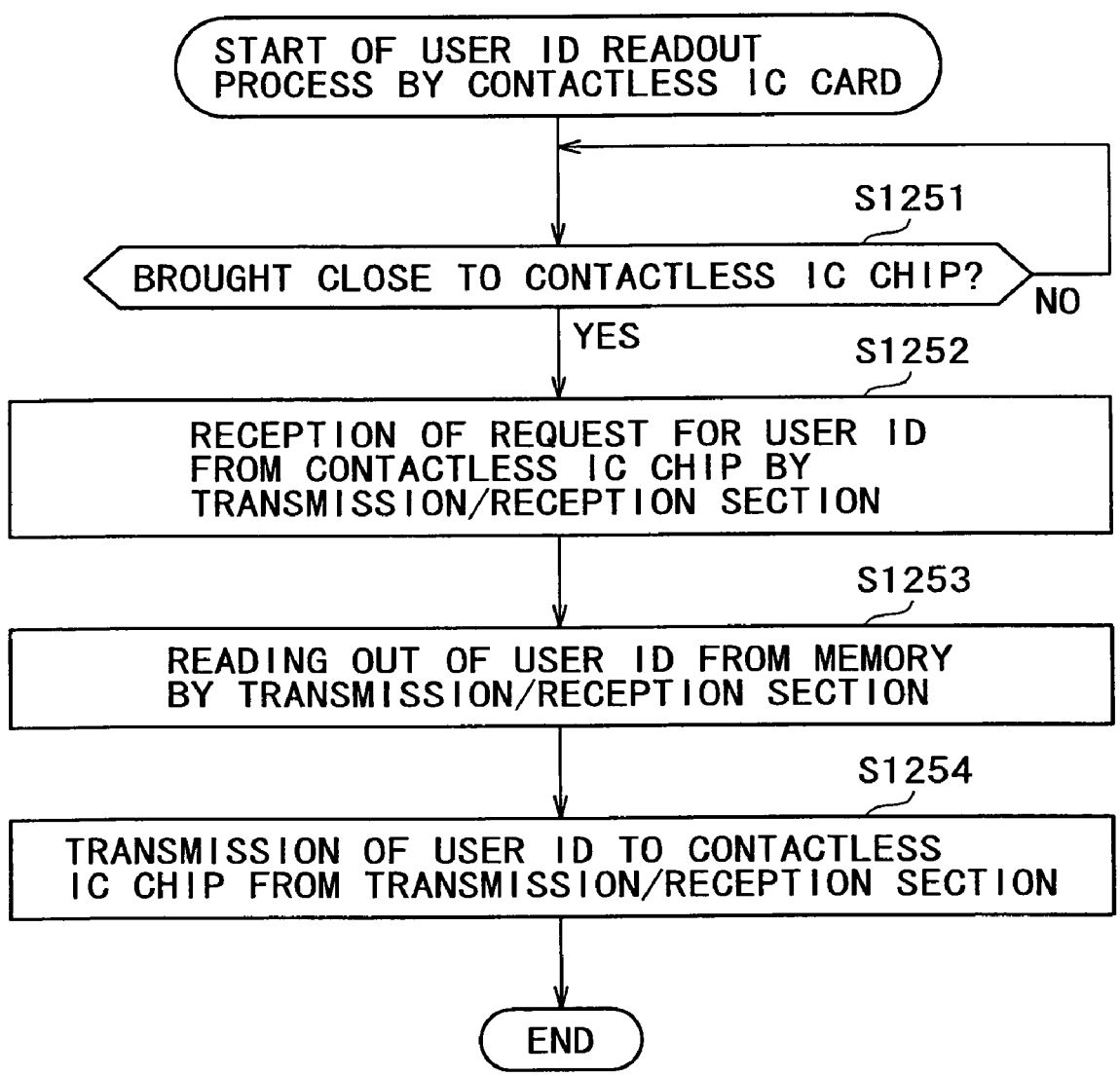
FIG. 31 is a flow chart illustrating a user ID readout process by a contactless IC card shown in FIG. 21.
Figures 32, 33:
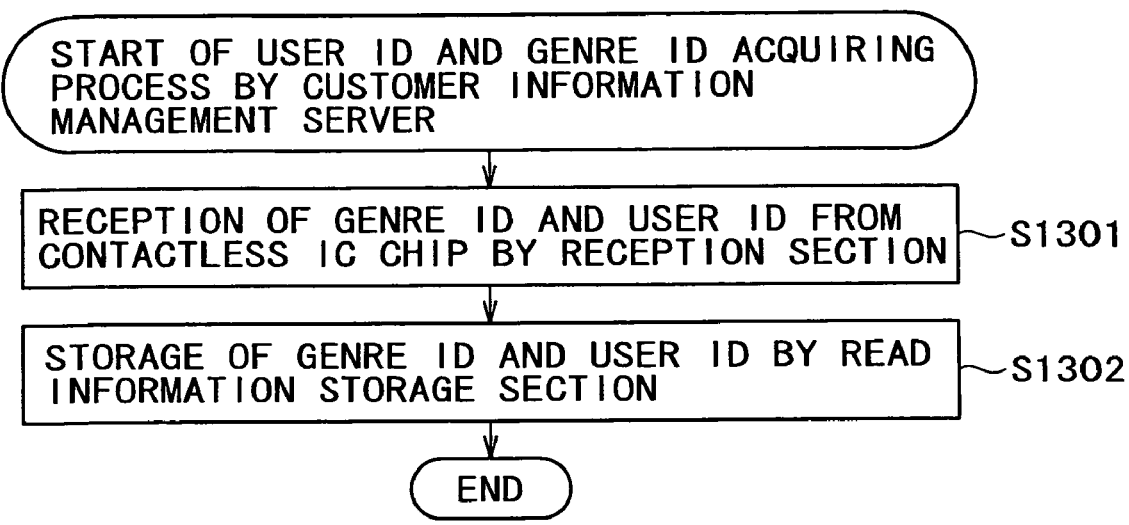
FIG. 32 is a flow chart illustrating a user ID and genre ID acquiring process by the customer information management server of FIG. 22.
FIG. 33 is a view illustrating information to be stored into a read information storage section shown in FIG. 22 at step S1302 of FIG. 32.

By the processes of FIGS. 30 to 32, when a user relatively brings a contactless IC card 1031 owned thereby close to a contactless IC chip 1032 mounted on a bookshelf in which the user is interested, a genre ID stored in the contactless IC chip 1032 and a user ID stored in the contactless IC card 1031 are stored into the read information storage section 1102 of the customer information management server 1038. Since the user can successively access books in which the user is interested in a selling agent (bookshop), the processes of FIGS. 30 to 32 are repeated every time, and the information (user ID and genre ID) is cumulatively stored into the read information storage section 1102 of the customer information management server 1038. As a result, such information as seen in FIG. 33 is stored into the read information storage section 1102 of the customer information management server 1038.

In FIG. 33, the user ID is user A and the genre IDs are genre A, genre B, genre C and genre D. Such information as illustrated in FIG. 33 is stored when a user whose user ID is user A is interested in the genre A, genre B, genre C and genre D in a selling agent and relatively and successively brings the contactless IC card 1031 close to the contactless IC chips 1032 mounted on the bookshelves corresponding to the genres.

Now, processes for producing and displaying recommendation information are described with reference to FIGS. 34 to 36. The processes are executed after the processes of FIGS. 27 to 29 and the processes of FIGS. 30 to 32 are executed. In particular, the processes are executed after a book ID is transmitted to the book information management server 1037 after every interval of time and a genre ID of a genre in which a user is interested is transmitted to the customer information management server 1038. In other words, the processes are executed in a state wherein a plurality of genre IDs, a plurality of book IDs and book information are recorded in the book information management server 1037 and at least one genre ID is stored corresponding to one user ID in the read information storage section 1102 of the customer information management server 1038.

First, a recommendation information display process by the display apparatus 1034 of FIG. 26 is described with reference to a flow chart of FIG. 34.

At step S1351, the IC card reader/writer 1401 (FIG. 9) of the display apparatus 1034 discriminates whether or not a contactless IC card 1031 is relatively brought close to (mounted on) the IC card reader/writer 1401. More particularly, the transmission/reception section 453 (FIG. 9) of the IC card reader/writer 1401 discriminates whether or not the antenna 454 of the IC card reader/writer 1401 is relatively brought close to the antenna 74 of a contactless IC card 1031. If no contactless IC card 1031 is relatively brought close to the antenna 454, then the IC card reader/writer 1401 waits until after it is discriminated that a contactless IC card 1031 is relatively brought close to the IC card reader/writer 1401. When a contactless IC card 1031 is relatively brought close to (mounted on) the IC card reader/writer 1401 of the display apparatus 1034 as seen in FIG. 37, the discrimination at step S1351 becomes YES.

Figure 37:
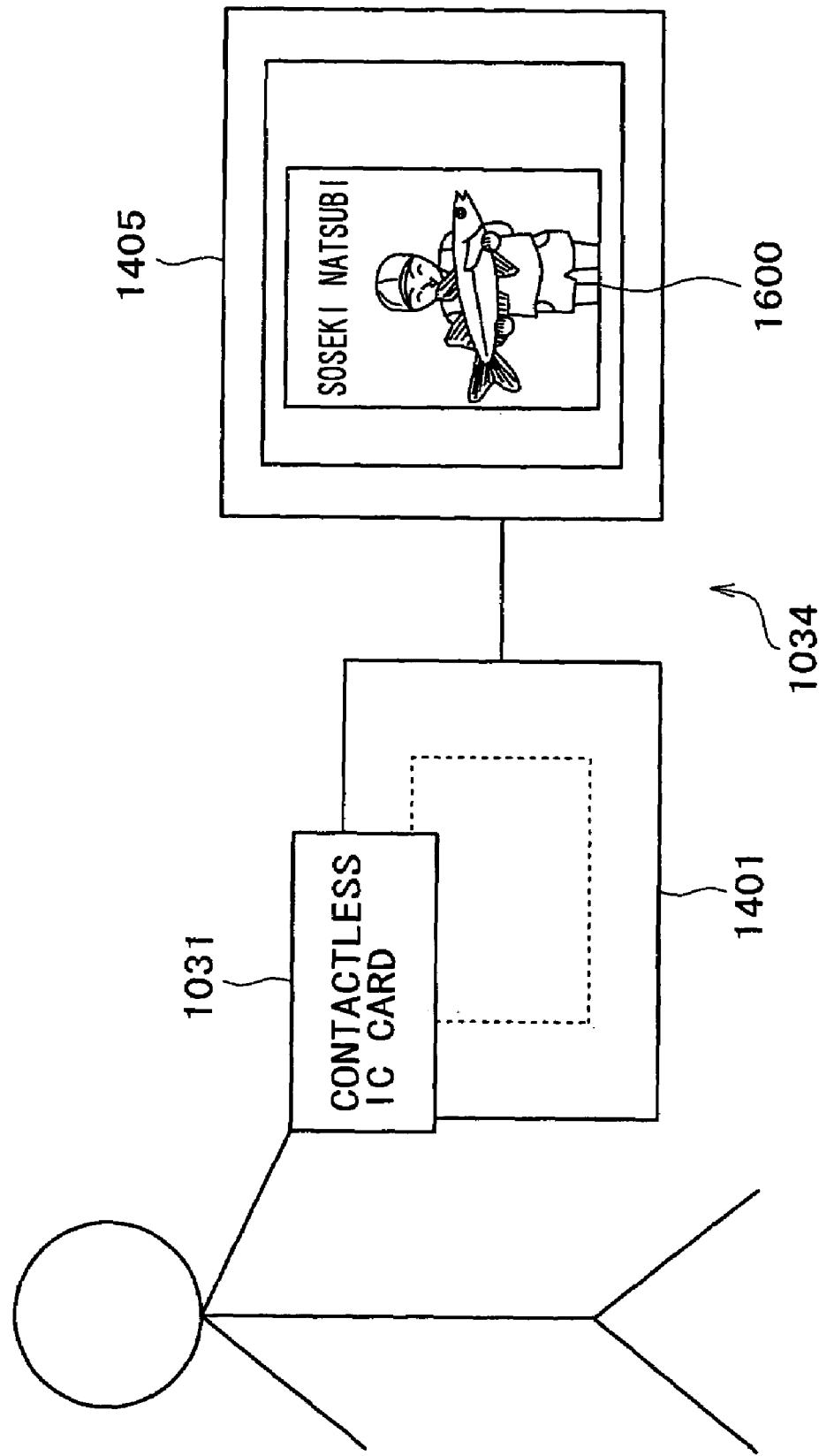
FIG. 37 is a schematic view showing an image displayed on the display section at step S1357 of FIG. 34.

When it is discriminated at step S1351 that a contactless IC card 1031 is relatively brought close to the IC card reader/writer 1401 (when the state illustrated in FIG. 37 is established), the processing advances to step S1352, at which the requesting section 1402 produces a signal (user ID requesting signal) for requesting the closely positioned contactless IC card 1031 for a user ID stored in the memory 72 of the contactless IC card 1031 and supplies the signal to the IC card reader/writer 1401. The IC card reader/writer 1401 transmits the requesting signal to the contactless IC card 1031 through the antenna 454. As described hereinabove, the user ID (identification information) of the user who owns the contactless IC card 1031 is stored in advance in the contactless IC card 1031.

Thus, the contactless IC card 1031 reads out the user ID stored in the memory 72 thereof in accordance with the request (request by the process at step S1352) and transmits the user ID to the IC card reader/writer 1401. The process by the contactless IC card 1031 in this instance is similar to that of FIG. 31, and therefore, overlapping description of the process is omitted herein to avoid redundancy. At step S1353, the IC card reader/writer 1401 receives the user ID (in the present example, user A) from the contactless IC card 1031. The requesting section 1402 acquires the user ID (in the present example, user A) received by the IC card reader/writer 1401.

At step S1354, the requesting section 1402 produces a signal (recommendation information requesting signal) for requesting recommendation information corresponding to the acquired user ID and transmits the signal to the transmission section 1403. At step S1355, the transmission section 1403 transmits the recommendation information requesting signal corresponding to the user ID to the customer information management server 1038 through the LAN 1035 and the Internet 1036.

As described hereinabove, the customer information management server 1038 has user information corresponding to user IDs recorded in the customer information recording section 1103 thereof as described hereinabove with reference to FIG. 4 and has a user ID and a genre ID or IDs recorded for each user in the read information storage section 1102 thereof. After the customer information management server 1038 receives the request transmitted from the display apparatus 1034 at step S1354, it produces recommendation information corresponding to the user ID (in the present example, user A) and transmits the recommendation information to the display apparatus 1034. Details of the recommendation information production process in this instance are hereinafter described with reference to FIG. 35.

When the recommendation information is transmitted from the customer information management server 1038 in response to the request transmitted from the display apparatus 1034 at step S1354, the reception section 1404 receives the information (in the present example, recommendation information for user A) transmitted thereto from the customer information management server 1038 through the LAN 1035 and the Internet 1036 at step S1356.

At step S1357, the display section 1405 displays an image (or a text) based on the recommendation information received by the reception section 1404, whereafter the processing is ended. For example, an image 1600 representing a book whose book ID corresponds to book A (for example, information for recommending a novel of Soseki NATSUBI) is displayed as shown on the display section 1405 of FIG. 37.

Now, a recommendation information production process by the customer information management server 1038 of FIG. 22 corresponding to the process of FIG. 34 by the display apparatus 1034 is described with reference to a flow chart of FIG. 35. It is to be noted that the process of FIG. 35 is started when a recommendation information requesting signal corresponding to a user ID is transmitted from the display apparatus 1034 at step S1352 of FIG. 34 described above.

At step S1401, the reception section 1101 of the customer information management server 1038 receives a recommendation information requesting signal corresponding to the user ID (in the present example, user A) transmitted to the customer information management server 1038 from the display apparatus 1034 at step S1352 of FIG. 2. The received requesting signal is supplied to the requesting section 1105 and the recommendation information production section 1104.

At step S1402, the requesting section 1105 acquires a genre ID corresponding to the received user ID (in the present example, user A) from the read information storage section 1102. In the example of FIG. 33, genre A, genre B, genre C and genre D are acquired as genre IDs corresponding to the user A.

At step S1403, the requesting section 1105 issues a request for book information of the genre IDs acquired at step S1402, and at step S1404, the transmission section 1106 transmits the request for book information to the book information management server 1037 through the Internet 1036 and the LAN 1035. In the present example, a request for book information of all books placed on the bookshelves corresponding to genre A, genre B, genre C and genre D is transmitted.

In response to the request, the book information management server 1037 reads out book information of the books corresponding to the genres of the request (in the present example, genre A, genre B, genre C and genre D) from the book information recording section 1253 and transmits the book information to the customer information management server 1038. Since the book information recorded in the book information recording section 1253 is updated after every predetermined interval of time (for example, 30 seconds), information of the books currently placed for sales in the selling agent is read out.

When book information corresponding to a genre ID or IDs is transmitted from the book information management server 1037 in response to the request transmitted to the book information management server 1037 by the process of step S1404, the reception section 1101 receives the book information from the book information management server 1037 at step S1405. In the example of FIG. 24, the book information from the book information E to the book information L is received. One of the pieces of the book information received at this time (for example, the book information F) includes such pieces of information, for example, as illustrated in FIG. 38.

In the example of FIG. 38, the book ID is "9726420" (a particular numerical value corresponding, for example, to the book F); the genre is "novel"; the author is "Soseki NATSUBI"; the age group is "18 to 25 years"; and the amount of money is "500 yen". In this manner, book information corresponding to a book ID (for example, book information F corresponding to the book F) includes detailed information of the book.

At step S1406, the reception section 1101 transmits the received book information to the recommendation information production section 1104.

At step S1407, the recommendation information production section 1104 acquires, from within the user information recorded in the customer information recording section 1103, user information of the user ID supplied thereto from the reception section 1101 by the process at step S1401. In the present example, since the user ID is user A, the user information A corresponding to the user A of FIG. 4 is acquired. The user information A acquired at this time includes, for example, such pieces of information as illustrated in FIG. 39.

Referring to FIG. 39, the user ID is "103176" (a particular numeral value corresponding, for example, to the user A); the sex is "male"; the age group is "21 to 25 years"; and the liking information is "Soseki NATSUBI" for the novel, "Doriemon" for the comics, and "soccer" for the sports. In this manner, user information includes not only liking information of the user but also information relating to the user.

At step S1408, the recommendation information production section 1104 produces recommendation information corresponding to the user (in the present example, the user A) based on the liking information of the user (such user information as illustrated in FIG. 39 acquired at step S1407) and the book information (book information received at step S1406). In the present example, since the liking information of the user A is such as illustrated in FIG. 39 and the book information is such information of eight books as illustrated in FIG. 24, the recommendation information production section 1104 searches for books which conform to the liking of the user A and produces recommendation information for recommending the books searched out in this manner. More particularly, since the book information of the book F illustrated in FIG. 38 includes information that the author is "Soseki NATSUBI" and also the liking information of the user A illustrated in FIG. 39 includes information that the user likes "Soseki NATSUBI", the recommendation information production section 1104 produces information for recommending the book F. It is to be noted that, though not illustrated in FIG. 38, the book information F includes image information of a cover or covers of the book and so forth.

At step S1409, the transmission section 1106 transmits the recommendation information produced by the recommendation information production section 1104 to the display apparatus 1034 through the Internet 1036 and the LAN 1035, whereafter the processing is ended. As recognized from the foregoing description of steps S1356 and S1357 of FIG. 34, the display apparatus 1034 receives the recommendation information and displays an image based on the recommendation information. Consequently, such an image 1600 as seen in FIG. 37 is displayed on the display apparatus 1034.

Now, a book information reading out process by the book information management server 1037 of FIG. 23 corresponding to the process of FIG. 35 by the customer information management server 1038 is described with reference to a flow chart of FIG. 36. It is to be noted that the process of FIG. 36 is started when a book information request is transmitted to the book information management server 1037 from the customer information management server 1038 at step S1404 of FIG. 35.

At step S1501, the communication section 1251 of the book information management server 1037 receives a request for book information corresponding to a genre ID transmitted to the book information management server 1037 from the customer information management server 1038 (step S1404 of FIG. 35).

At step S1502, the control section 1252 reads out book information corresponding to a genre ID or IDs received at step S1501 (in the present case, genre A, genre B, genre C and genre D) from the book information recording section 1253. In the present example, since the genre IDs corresponding to user A stored in the read information storage section 1102 are genre A, genre B, genre C and genre D and the genre IDs recorded in the book information recording section 1253 are genre A, genre B, genre C and genre D, the book information E to L corresponding to the eight books recorded in the book information recording section 1253 is read out.

At step S1503, the communication section 1251 transmits the book information (book information E to L) read out by the control section 1252 to the customer information management server 1038 through the LAN 1035 and the Internet 1036, whereafter the processing is ended.

Figure 36:
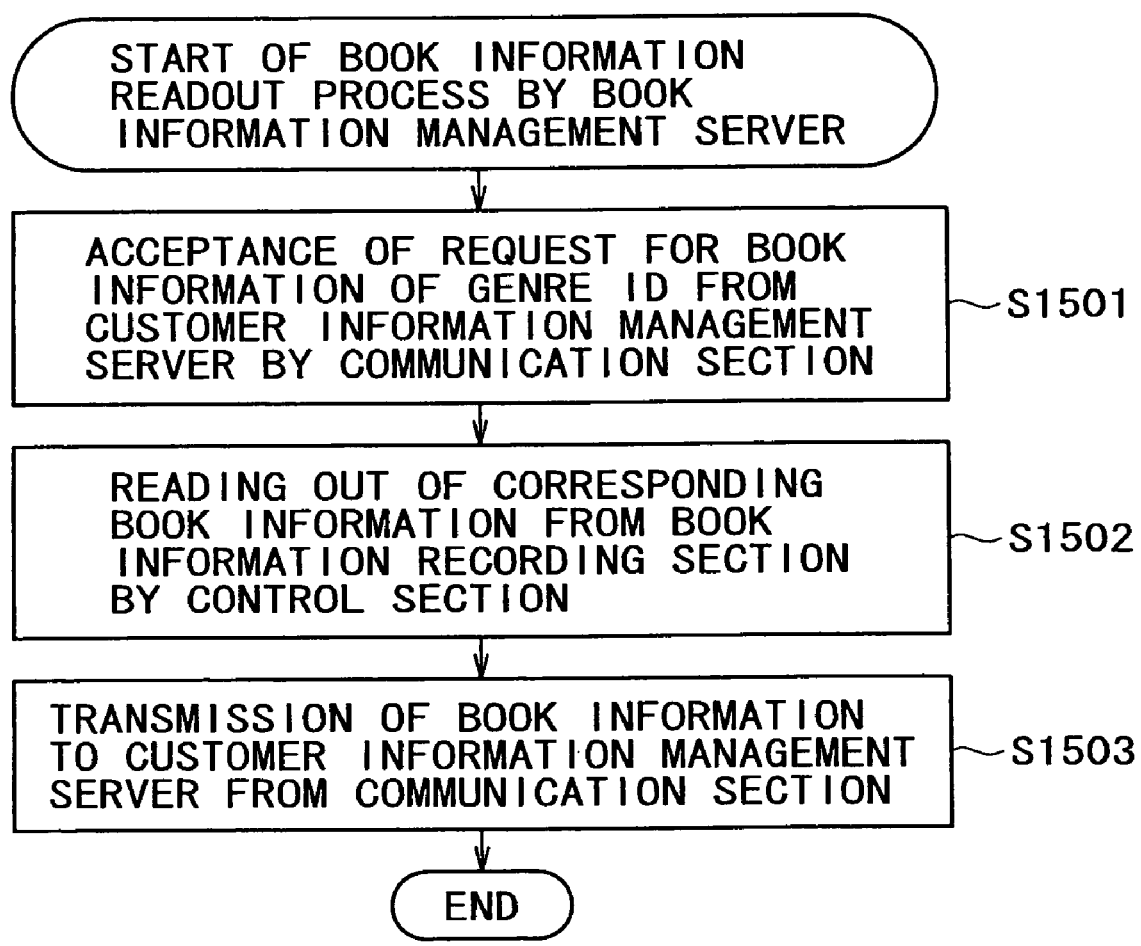
FIG. 36 is a flow chart illustrating a book information readout process by the book information management server of FIG. 23.

By the processes of FIGS. 34 to 36, when a user relatively brings a contactless IC card 1031 owned thereby close to the IC card reader/writer 1401 of the display apparatus 1034, it can receive provision of information conforming to the liking of the user itself from within the genres of books in which the user is interested (from among the genres stored in the read information storage section 1102 of the customer information management server 1038 by the processes of FIGS. 30 to 32).

In other words, the book information management server 1037 can manage stocks of books and so forth by acquiring the book IDs stored in the contactless IC tags 1033 by the contactless IC chip 1032 after every predetermined interval of time. Meanwhile, the customer information management server 1038 can acquire information of those books in which the user is interested by acquiring the genre ID of a bookshelf to which the contactless IC card 1031 is relatively brought close through the contactless IC chip 1032 and acquiring book information corresponding to the genre ID from the book information management server 1037. Further, since the customer information management server 1038 stores in advance therein liking information of the user corresponding to the user ID stored in the contactless IC card 1031, it can provide recommendation information conforming to the user based on the book information corresponding to genre IDs in which the user is interested and the liking information of the user stored in advance.

By the processes described above, the book information management server 1037 can present recommendation information based on liking information of the user and information of books which the user likes (in which the user is interested) in the selling agent. In other words, information conforming to the liking of the user can be provided.

Further, since the book information management server 1037 acquires book IDs acquired by the contactless IC chips 1032 from the contactless IC tags 1033 after every interval of time, books which are actually presented for sales in the selling agent can be recommended to the user.

It is to be noted that, while, in the example described above, the book information management server 1037 acquires book IDs stored in the contactless IC tags 1033 from the contactless IC chips 1032 after every predetermined interval of time, the acquisition of book IDs is not limited to this, but the book information management server 1037 may otherwise acquire book IDs of books in the selling agent when a user brings (mounts) its contactless IC card 1031 close to (on) the display apparatus 1034 to receive recommendation information. In this instance, the necessity for the contactless IC chips 1032 to acquire book IDs stored in the contactless IC tags 1033 after every predetermined interval of time is eliminated.

Further, since the customer information management server 1038 is connected to the Internet 1036 as seen from the information providing system 1001 of FIG. 21, the same customer information management server 1038 can be utilized also by another selling agent. For example, if the contactless IC card 1031 is a credit card and a credit company manages the customer information management server 1038, then information can be provided to customers and selling agents who make use of the credit card system.

Furthermore, while, in the example described above, books are managed, the object of the management is not limited to books, but the information providing system 1001 can be applied to all objects such as commodities presented for sales in selling agents of clothing, furniture and so forth and such books and rented CDs as are rented from CD rental shops or the like.

Meanwhile, the information to be stored in each contactless IC tag 1033 may be any information only if it can be used to identify a commodity (object) on which the contactless IC tag 1033 is mounted. Information to be stored also in each contactless IC chip 1032 may similarly be any information only if it can be used to identify a bookshelf (shelf on which objects are to be placed) on which the contactless IC chip 1032 is mounted. Furthermore, each contactless IC tag 1033 may not be mounted on a shelf but be mounted at any place positioned close to an object of the same (a place at which it can communicate with the object).

Further, while, in the example described above, the information stored in advance in the contactless IC card 1031 is only a user ID whereas user information corresponding to the user ID (for example, user information of FIG. 39) is recorded in the customer information management server 1038, the user information may otherwise be recorded in advance in the contactless IC card 1031. In this instance, since the customer information management server 1038 can acquire the user ID and the user information from the contactless IC card 1031, there is no necessity to record the customer information in the customer information management server 1038, but only it is necessary for the customer information management server 1038 to produce recommendation information.

Further, the customer information management server 1038 may be provided in a selling agent, or the book information management server 1037 may be connected to the Internet 1036 so that it may be commonly used by another selling agent (for example, a branch).

Furthermore, while the information to be stored in advance in each contactless IC tag 1033 is only a book ID and book information corresponding to the book ID (for example, book information of FIG. 38) is recorded in the book information management server 1037, the book information may be stored in advance in the contactless IC tag 1033. In this instance, since the customer information management server 1038 can acquire the book ID and the book information from the contactless IC tag 1033, the necessity for the customer information management server 1038 to access the book information management server 1037 is eliminated, and it is not necessary to provide the book information management server 1037 in the information providing system 1001.

Further, while, in the example described above, the customer information management server 1038 produces recommendation information, alternatively the book information management server 1037 or the display apparatus 1034 may produce recommendation information. For example, where the book information management server 1037 produces recommendation information, when the user brings its contactless IC card 1031 close to the display apparatus 1034, the book information management server 1037 acquires liking information (user information) of the corresponding customer from the customer information management server 1038 and produces recommendation information based on book information recorded in the book information management server 1037 itself.

Furthermore, while, in the example described above, the user information is such as illustrated in FIG. 39, the user information is not limited to this but may be any information relating to the user. For example, the user information may include only liking information or may include information of a history of commodities (books) purchased by the user. Also the book information is not limited to such information as illustrated in FIG. 38 but may be any information relating to the book (object) similarly. For example, the book information may only include information of the genre of the book.

Further, while the customer information management server 1038 produces information of a book to be recommended based on the liking information of the user from among a plurality of books (favorite books) to which the user relatively brings its contactless IC card 1031 close, alternatively the customer information management server 1038 may produce information for recommendation of purchase of books in combination of a book (favorite book) to which the user relatively brings its contactless IC card 1031 close. For example, if a favorite book is a novel, then information for recommendation of books of the history of the age in which the author of the novel lived may be produced.

Now, examples of recommendation to be produced are described.

The recommendation information may be information, for example, for selectively recommending, from among a plurality of books corresponding to a plurality of genre IDs read by the user using the contactless IC card 1031, only those books which really conform to the liking of the user.

Further, the recommendation information may include information of a book which other users who belong to the same age group as or have a similar taste or liking to the user often purchase. Or, the recommendation information may include information of some other book purchased simultaneously by another user who purchases the same book as a book corresponding to a genre ID read by the user using the contactless IC card 1031.

Where a purchase history in the past is utilized to produce recommendation information, a purchase history of the user may be stored in the display apparatus 1034. Further, for example, the purchase history of the user read by the display apparatus 1034 may be transmitted to the customer information management server 1038 through the Internet 1036 so that it may be recorded together with the user information by the customer information management server 1038. Furthermore, the purchase history may be stored into the memory 72 of the contactless IC card 1031. Where a purchase history is recorded in this manner, recommendation information may be produced so as to selectively recommend, from among books corresponding to a plurality of genre IDs read by the user using the contactless IC card 1031, those books which conform to books purchased by the user in the past.

Further, while, in the example just described, a genre ID is recorded in each contactless IC chip 1032, it, may not necessarily be stored in each contactless IC chip 1032, but only a book ID stored in each contactless IC tag 1033 is read by a contactless IC chip 1032 and transmitted to the book information management server 1037 or the like. It is to be noted, however, that, as seen from FIG. 21, where the genre IDs are sent to the book information management server 1037, the user need not bring the contactless IC card 1031 close to one after another of those books in which the user is interested but may bring the contactless IC card 1031 close only to the contactless IC chips 1032 in which the genre IDs are stored, and consequently, the time and labor required by the user can be saved. Since a user generally likes commodities (books) which belong to a similar genre, where a genre ID (contactless IC chip 1032) is provided between book IDs (contactless IC tags 33), the time and labor required by the user can be saved, and consequently, recommendation information can be provided rapidly.

In summary, by relatively bringing a contactless IC card 1031 owned by a user and having at least identification information of the user stored therein close to a contactless IC chip 1032 in which a genre ID corresponding to a genre of books is stored (that is, a contactless IC chip 1032 positioned in the proximity of contactless IC tags 1033 in which book IDs are stored) and further relatively bringing (mounting) the contactless IC card 1031 close to (on) the display apparatus 1034, the book selling agent side can recommend commodities (books) conforming to the liking of the user.

In other words, the selling agent side can provide information optimum to the user from among commodities (books) to which the user has actually brought the contactless IC card 1031 close (that is, in which the user is interested) from among commodities (books) which are actually presented for sales in the selling agent (bookstore) and make an object of purchase.

Further, the selling agent side can recommend further purchase to the user while the user can find out commodities (books) which match the user better.

It is to be noted that, while, in the example described above, the present invention is applied to media (contactless IC card 1031, contactless IC chips 1032 and contactless IC tags 1033) which make use of electromagnetic induction for communication, the application of the present invention is not limited to them, but the present invention can be applied to any other media which perform wireless communication when they are brought close to each other.

Further, while, in the example described above, the selling agent side (display apparatus 1034, book information management server 1037 and customer information management server 1038) provide recommendation information conforming to the user when the user relatively brings the contactless IC card 1031 owned by the user close to a shelf of books in which the user is interested in the selling agent, recommendation information may be provided otherwise only when the user enters the selling agent and relatively brings (mounts) the contactless IC card 1031 close to (on) the display apparatus 1034. In other words, recommendation information may be provided based only on liking information of the user while the user does not access the commodities in the selling agent. This example is described with reference to FIGS. 40 to 47. In this example, the site is a library, and the commodities are books.

Figure 40:
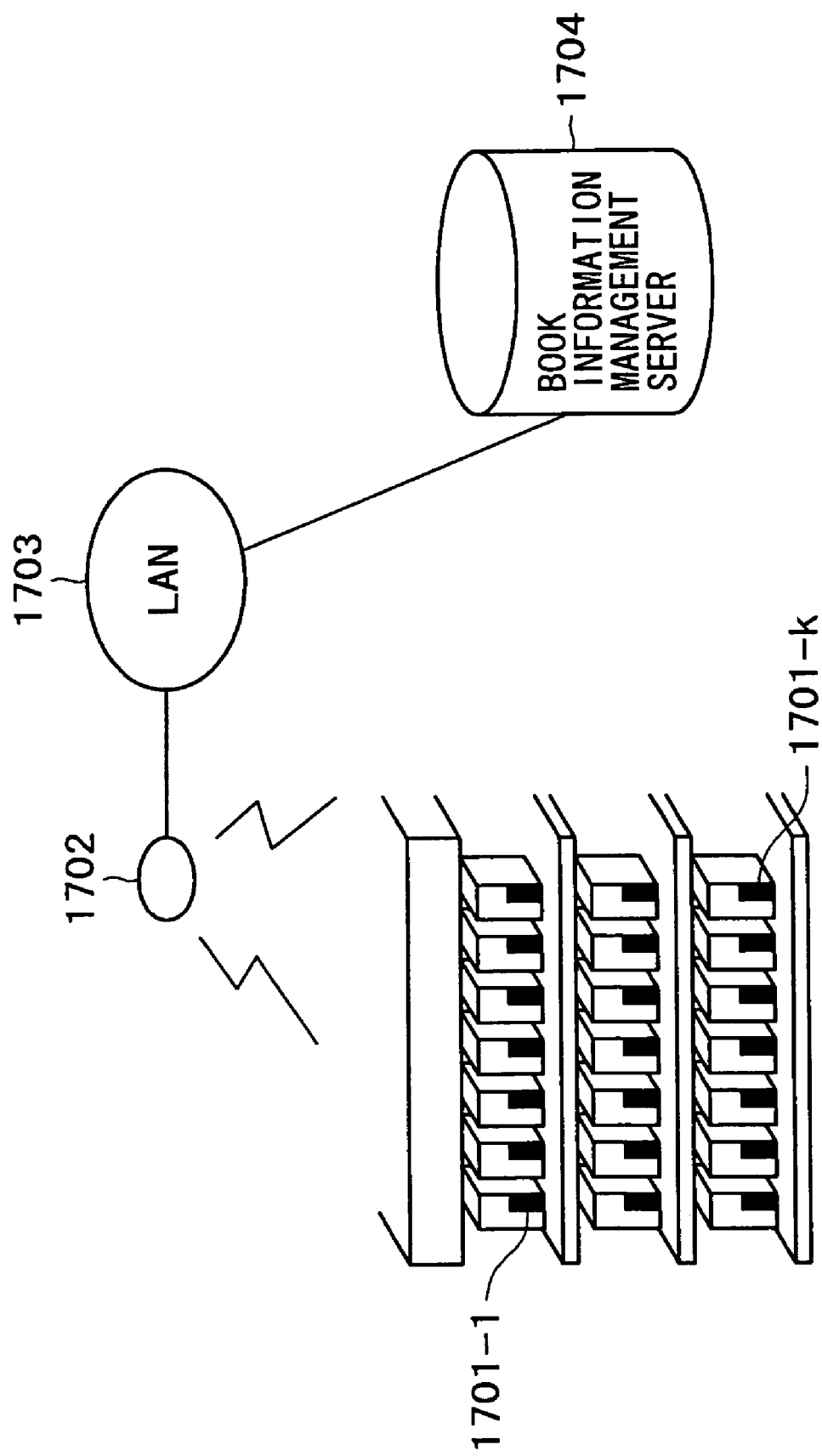
FIG. 40 is a schematic view showing a system wherein a book information management server manages books.

Referring first to FIG. 40, radio tags 1701-1 to 1701-k in which book IDs different from one another are stored are individually mounted on all of books in the library (books which can be lent). The radio tags 1701-1 to 1701-k communicate with a radio access point 1702 by radio communication. The radio access point 1702 is connected to a LAN 1703, and also a book information management server 1704 is connected to the LAN 1703. Book information corresponding to the book IDs stored in the radio tags 1701-1 to 1701-k is stored in advance in the book information management server 1704.

In the following description, where there is no necessity to individually identify the radio tags 1701-1 to 1701-k, they are referred to simply as radio tags 1701.

Figure 41:
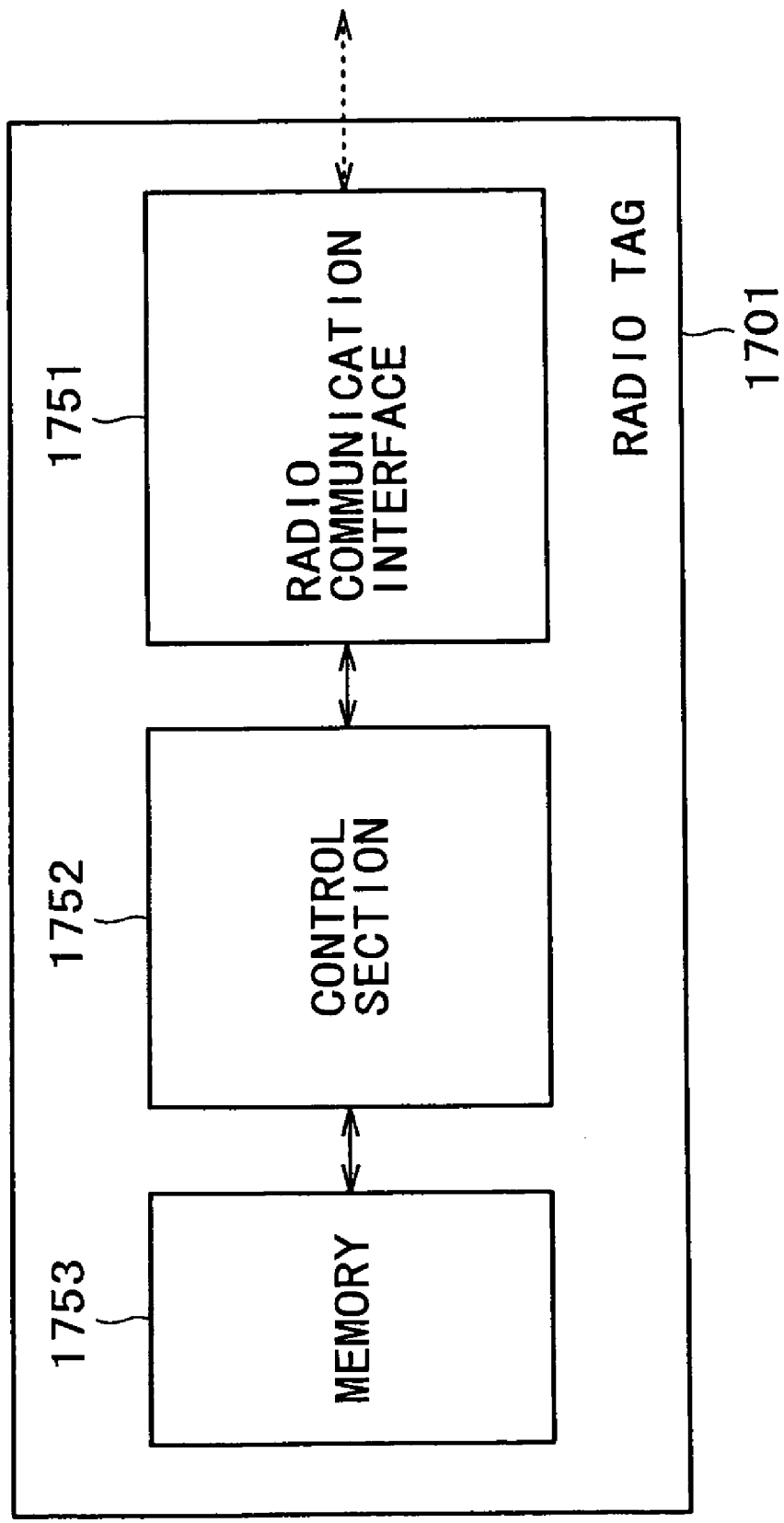
FIG. 41 is a block diagram showing an example of a functional configuration of a radio tag shown in FIG. 40.

FIG. 41 shows an example of a functional configuration of the radio tags 1701 of FIG. 40.

The radio tag 1701 includes a radio communication interface 1751, a control section 1752 and a memory 1753.

The memory 1753 has stored in advance therein identification information (book ID) of a book on which the radio tag 1701 in which the memory 1753 is provided is mounted. The control section 1752 controls reading out of the book ID stored in the memory 1753 and controls communication with any apparatus with which the radio tag 1701 can communicate by radio communication through the radio communication interface 1751. For example, radio communication based on the standards such as the IEEE (Institute of Electrical and Electronic Engineers) 802.11b is performed.

Now, an example of a functional configuration of the book information management server 1704 of FIG. 40 is described with reference to FIG. 42.

The book information management server 1704 includes a reception section 1801, a control section 1802, a book information storage section 1803, a recommendation information production section 1804, a requesting section 1805 and a transmission section 1806.

The reception section 1801 receives information transmitted from some other apparatus through the LAN 1703 and supplies the received information to the control section 1802, recommendation information production section 1804 and requesting section 1805. The control section 1802 controls reception of the reception section 1801 and production of recommendation information by the recommendation information production section 1804 and controls storage into the book information storage section 1803. The book information storage section 1803 has stored therein book information corresponding to the book IDs stored individually in the radio tags 1701-1 to 1701-k. It is to be noted that details of the information stored in the book information storage section 1803 are hereinafter described with reference to FIG. 44.

The recommendation information production section 1804 produces recommendation information based on liking information of a user and outputs the recommendation information to the transmission section 1806. The requesting section 1805 produces a signal for requesting predetermined information to some other apparatus and outputs the signal to the transmission section 1806. The transmission section 1806 transmits a signal supplied thereto to a pertaining apparatus.

Figure 42:
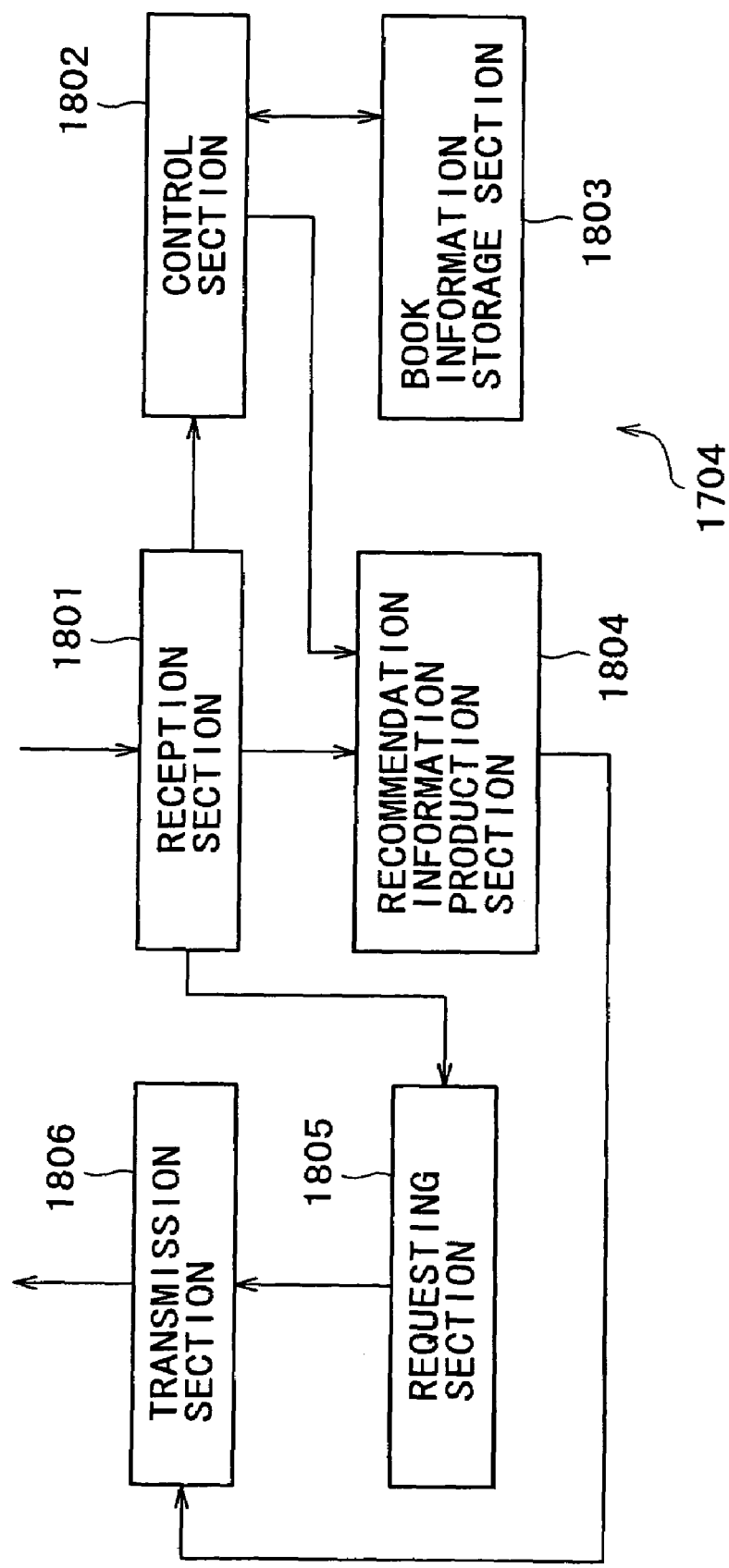
FIG. 42 is a block diagram showing an example of a functional configuration of a book information management server shown in FIG. 40.

Now, a book information management process by the book information management server 1704 of FIG. 42 is described with reference to a flow chart of FIG. 43.

At step S1701, the reception section 1801 of the book information management server 1704 discriminates whether or not a book is placed. More particularly, the reception section 1801 discriminates through the LAN 1703 and the radio access point 1702 whether or not a book is placed (whether or not communication between the radio access point 1702 and a radio tag 1701 of a book placed on a shelf is started). When a book is placed on a shelf, the radio tag 1701 starts radio communication with the radio access point 1702, and therefore, the reception section 1801 can perform the discrimination described above.

If it is discriminated at step S1701 that a book is placed, then the reception section 1801 receives the book ID of the placed book at step S1702. At step S1703, the control section 1802 sets a flag corresponding to the received book ID from among a plurality of book IDs stored in the book information storage section 1803 to 1. The book information storage section 1803 stores the book IDs of all books and corresponding book information as illustrated in FIG. 44. In particular, the book ID also of a book being lent and corresponding book information are stored in the book information storage section 1803, and by setting the flag for a book ID to 0 or 1, it can be discriminated whether or not the book is currently present in the library (whether or not the book is not in a lent state or whether or not the book is present).

Referring to FIG. 44, the book IDs are book M, book N, book O, book P and book Q; and the book information corresponding to the book IDs is book information M for book M, book information N for book N, book information O for book O, book information P for book P and book information Q for book Q.

In the example of FIG. 44, those books whose flag is 1, that is, the books whose book ID is book M, book O, book P and book Q, are currently present in the library while the books whose flag is 0, that is, the book whose book ID is book N, is not currently present in the library but in a lent state.

For example, if the book ID of the book placed by the process at step S1701 is book N, then the flag for the book N is changed to 1 by the process at step S1703.

When it is discriminated by the process at step S1701 that no book is placed or after the process at step S1703, the reception section 1801 discriminates whether or not a book is moved at step S1704. More particularly, the reception section 1801 discriminates through the LAN 1703 and the radio access point 1702 whether or not a book is moved similarly as in the process at step S1701 described hereinabove. If a book is moved from a shelf, then the radio tag 1701 ends the radio communication with the radio access point 1702, and therefore, the reception section 1801 can make the discrimination described above from this fact.

If it is discriminated at step S1704 that a book is moved, then the reception section 1801 acquires the book ID of the moved book (for example, book P stored in the radio tag 1701-4) at step S1705. Actually, since the book ID of the moved book is not received, the reception section 1801 reads (or searches for) a radio tag 1701 (in the present example, the radio tag 1701-4) with which the communication of the radio access point 1702 is ended (interrupted) thereby to identify the moved book and acquires the book ID of the moved book.

At step S1706, the control section 1802 sets a flag corresponding to the acquired book ID (in the present example, book F) from among a plurality of book IDs stored in the book information storage section 1803 to zero. Thus, from the flag, it can be discriminated whether or not the book has been lent out (or taken out from its shelf).

If it is discriminated by the process at step S1704 that no book is moved or after the process at step S1706, the processing returns to step S1701 so that the processes described above are repeated.

Figure 43:
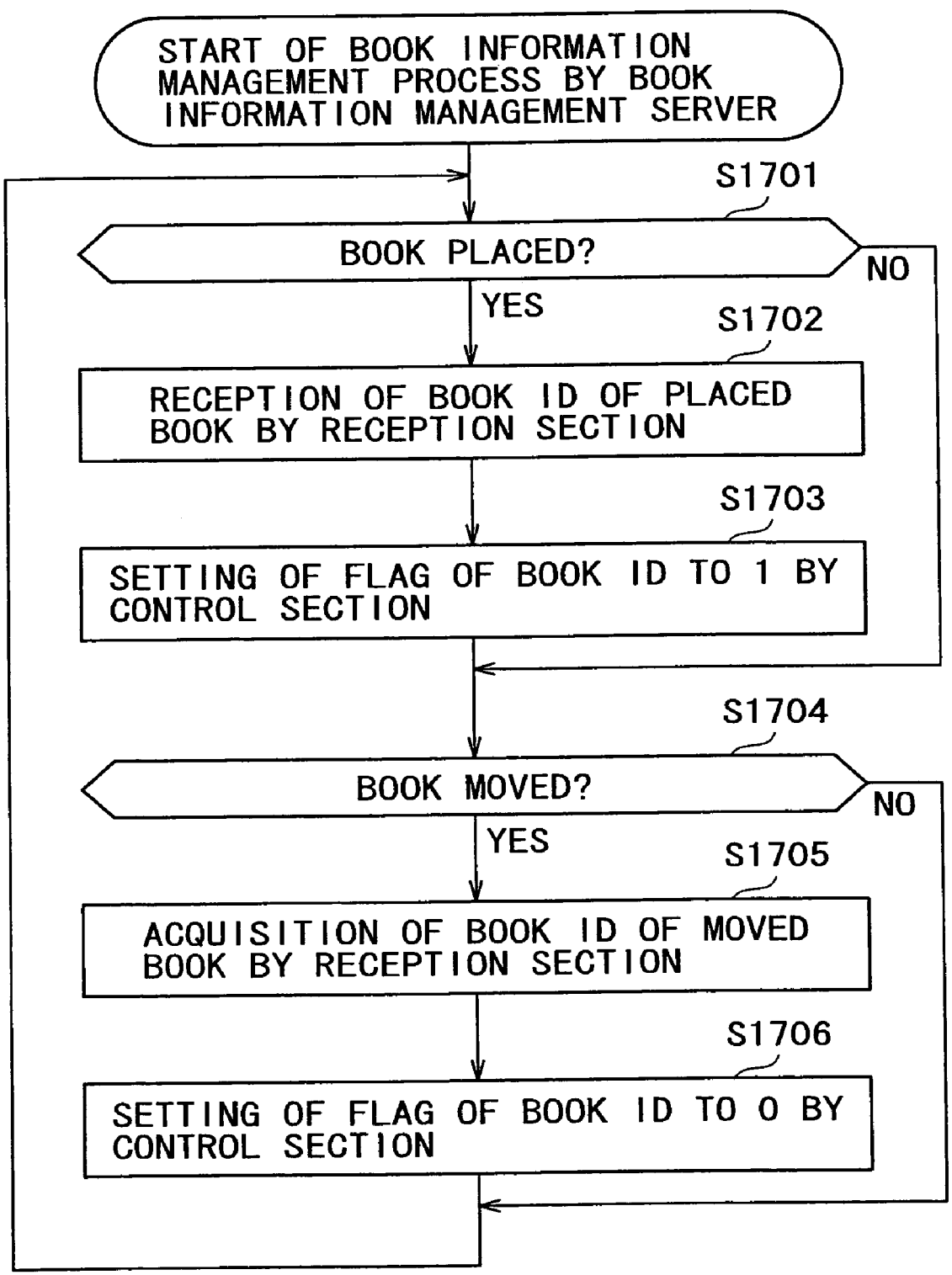
FIG. 43 is a flow chart illustrating a book information management process by the book information management server of FIG. 42.

By the process of FIG. 43, the book information management server 1704 can discriminate whether any book in the library is currently lent or placed on a bookshelf and consequently can manage the books in the library on the real-time basis. Further, for example, when the communication distance between the radio access point 1702 and a radio tag 1701 changes, such a situation that, even if the book is taken out from its bookshelf, it is not in a lent state but exists within the library can be discriminated.

A system which provides information conforming to the liking of a user based on the book information managed by the book information management server 1704 of FIG. 40 in this manner is described with reference to FIG. 45. It is to be noted that the system has a general configuration similar to that of the information providing system 1001 described hereinabove with reference to FIG. 21, and therefore, description of the system of FIG. 45 is described briefly.

Referring to FIG. 45, a user owns a contactless IC card 1851 in which identification information unique to the user is stored similarly as in the contactless IC card 1031 described hereinabove with reference to FIG. 2.

The contactless IC card 1851 performs communication making use of electromagnetic induction when it is relatively brought close to (mounted on) a display apparatus 1852. The display apparatus 1852 is connected to a LAN 1703 (same as the LAN 1703 of FIG. 40) such that it transmits and receives information to and from a book information management server 1704 through the LAN 1703. A customer information management server 1853 is connected to the Internet 1854 and transmits and receives information to and from the book information management server 1704 through the Internet 1854 and the LAN 1703.

The customer information management server 1853 is different from the customer information management server 1038 described hereinabove with reference to FIG. 22 in that it does not include the recommendation information management server 1104 nor the read information storage section 1102 but merely stores customer information (user information corresponding to user IDs). It is to be noted that the contactless IC card 1851 has a configuration same as that of the contactless IC card 1031 described hereinabove with reference to FIG. 2 while the display apparatus 1852 has a configuration same as that of the display apparatus 1034 described hereinabove with reference to FIG. 26, and therefore, overlapping description of them is omitted herein to avoid redundancy. Thus, in the following description, FIG. 2 is referred to for the description of the configuration of the contactless IC card 1851 and FIG. 26 is referred to for the description of the configuration of the display apparatus 1852.

Now, recommendation information production and display processes by the display apparatus 1852 and the book information management server 1704 are described with reference to FIGS. 46 and 47, respectively.

First, the recommendation information display process by the display apparatus 1852 is described with reference to a flow chart of FIG. 46. It is to be noted that processes at steps S1751 to S1754 are similar to the processes at steps S1351 to S1354 of FIG. 34, respectively, and therefore, overlapping description of them is omitted herein to avoid redundancy. Thus, description is given below of processes at steps S1755 et seq.

At step S1755, the transmission section 1403 of the display apparatus 1852 transmits a recommendation information requesting signal (recommendation information requesting signal corresponding to a user ID received by the process at step S1753) produced by the requesting section 1402 through the process at step S1754 (process corresponding to the process at step S1354 of FIG. 34) to the book information management server 1704 through the LAN 1703.

In response to the recommendation information requesting signal, the book information management server 1704 acquires user information corresponding to the user ID from the customer information management server 1853, produces recommendation information based on the liking of the user included in the user information and transmits the recommendation information to the display apparatus 1852.

Thus, at step S1756, the reception section 1404 receives the recommendation information transmitted thereto from the book information management server 1704. Then at step S1757, the display section 1405 displays an image (or a text) based on the recommendation information, whereafter the processing is ended.

Figure 46:
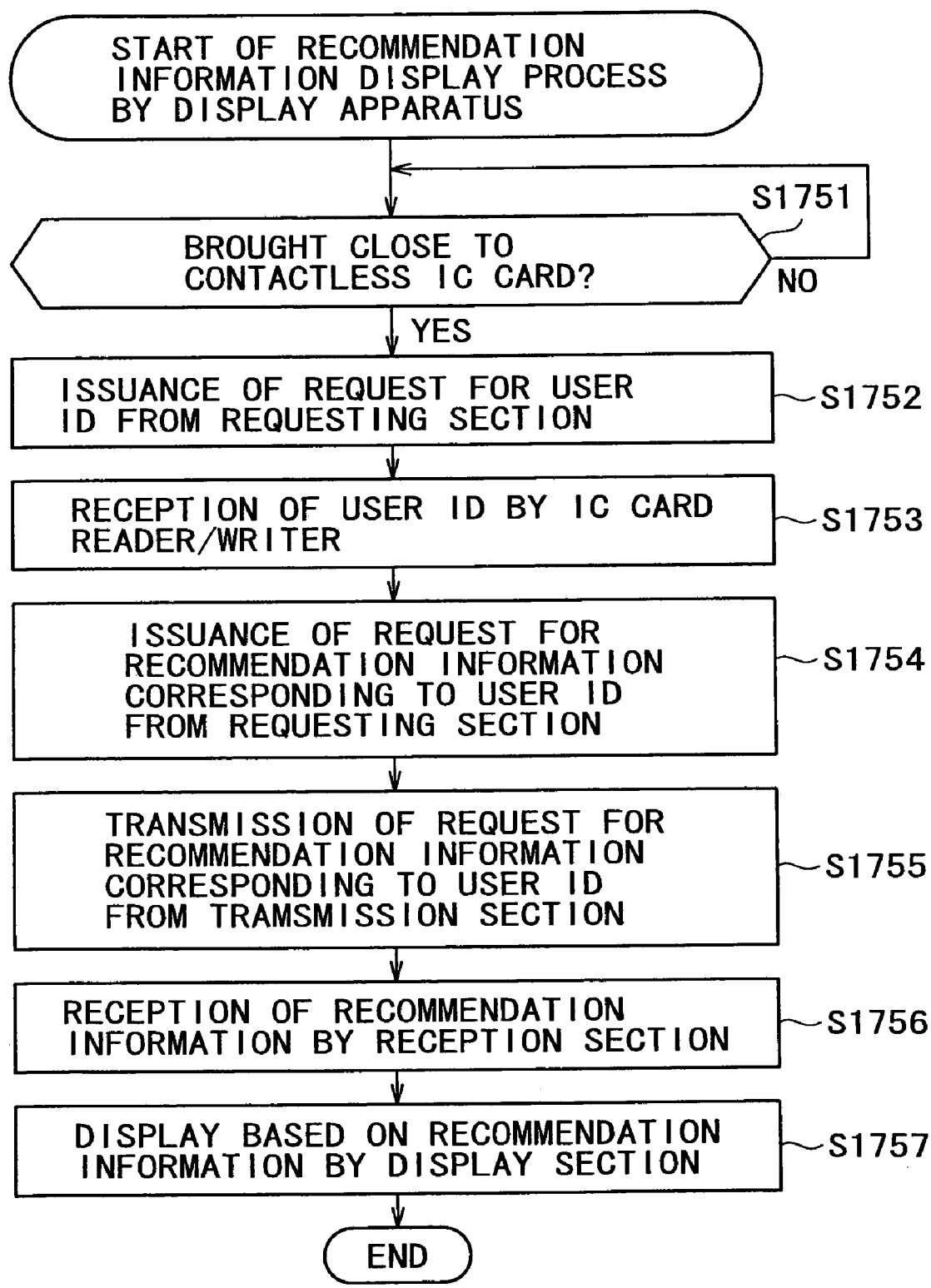
FIG. 46 is a flow chart illustrating a recommendation information display process by a display apparatus shown in FIG. 45.

In short, while, in the process of FIG. 34, the display apparatus 1034 issues a request for recommendation information to the customer information management server 1038 and receives recommendation information from the customer information management server 1038, in the process of FIG. 46, the display apparatus 1852 issues a request for recommendation information to the book information management server 1704 and receives recommendation information from the book information management server 1704.

Now, the recommendation information production process by the book information management server 1704 of FIG. 42 which corresponds to the recommendation information display process of FIG. 46 by the display apparatus 1852 is described with reference to a flow chart of FIG. 47. It is to be noted that this process is started when a recommendation information request is transmitted to the book information management server 1704 from the display apparatus 1852 (step S1755 of FIG. 46).

At step S1801, the reception section 1801 receives a recommendation information request (recommendation information requesting signal) corresponding to a user ID from the display apparatus 1852 and transmits the requesting signal to the recommendation information production section 1804 and the requesting section 1805.

At step S1802, the requesting section 1805 produces a signal (liking information requesting signal) for requesting liking information corresponding to the user ID. The transmission section 1806 transmits the produced liking information requesting signal to the customer information management server 1853 at step S1803.

Since user IDs and user information corresponding to them are recorded in the customer information management server 1853 as described hereinabove, the customer information management server 1853 transmits the user information corresponding to the user ID (for example, such user information as illustrated in FIG. 39) in accordance with the request.

Thus, at step S1804, the reception section 1801 receives the liking information (user information including the liking information) transmitted from the customer information management server 1853. Then at step S1805, the reception section 1801 transmits the liking information to the recommendation information production section 1804.

At step S1806, the control section 1802 acquires book information whose flag is 1 and transmits the book information to the recommendation information production section 1804. In the example of FIG. 44, book information M corresponding to book M, book information O corresponding to book O, book information P corresponding to book P and book information Q corresponding to book Q whose flag is 1 are acquired and supplied to the recommendation information production section 1804.

At step S1807, the recommendation information production section 1804 produces recommendation information based on the liking information (user information) and the book information (book information of the four books supplied at step S1806). In this instance, the recommendation information is produced similarly as at step S1408 of FIG. 35 described hereinabove, and therefore, overlapping description of the production of the recommendation information is omitted herein to avoid redundancy.

At step S1808, the transmission section 1806 transmits the recommendation information produced by the recommendation information production section 1804 to the display apparatus 1852 through the LAN 1703. The display apparatus 1852 displays an image based on the recommendation information (step S1757 of FIG. 46 described hereinabove).

Figure 47:
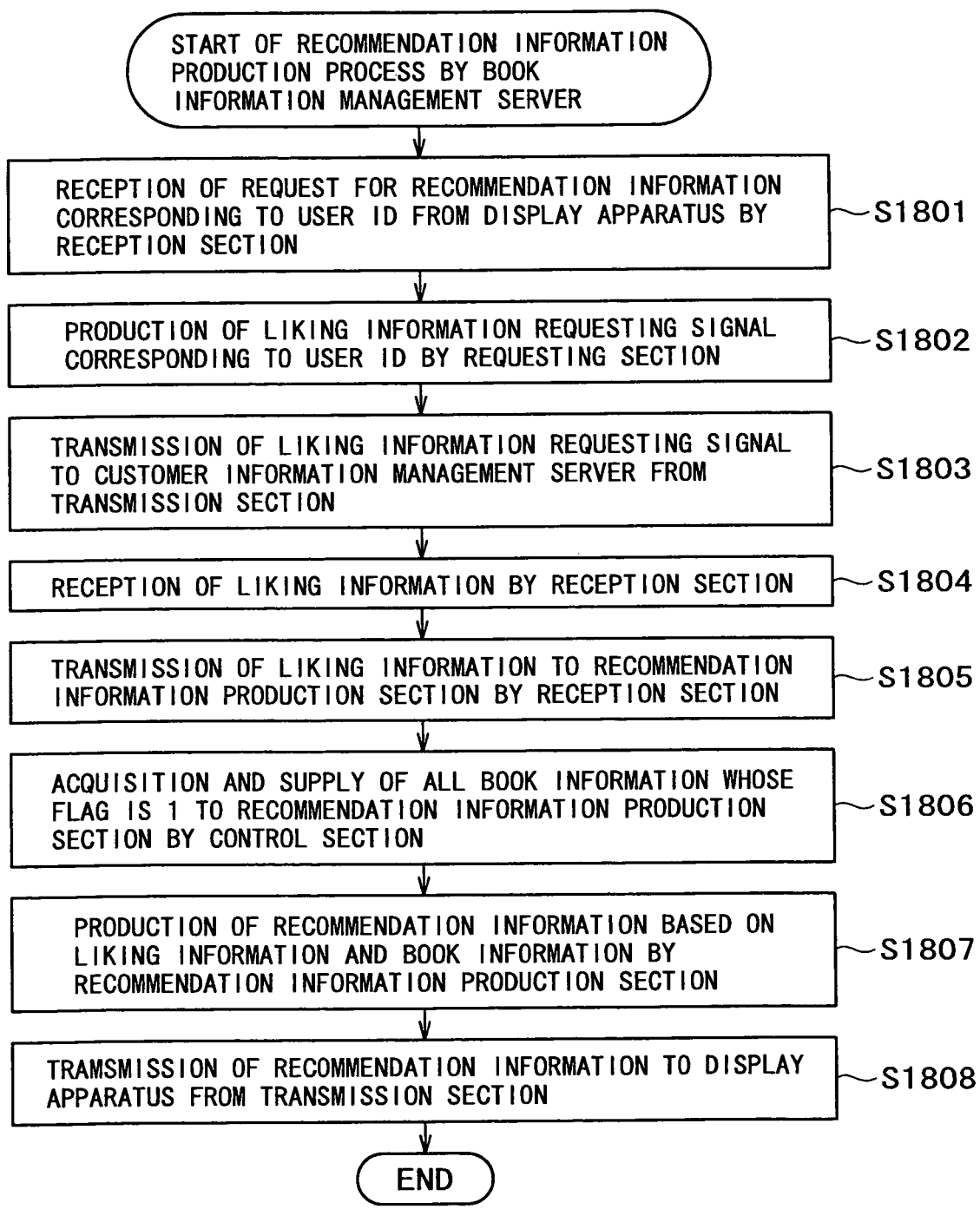
FIG. 47 is a flow chart illustrating a recommendation information production process by the book information management server of FIG. 42.

By the processes of FIGS. 46 and 47, the book information management server 1704 can provide information conforming to the user based on the liking information (user information) of the user from among the books present in the library.

According to the configuration described hereinabove with reference to FIGS. 40 to 47, since the book information management server 1704 communicates with a radio tag 1701 mounted on a book through the radio access point 1702, it can manage all books existing in the library dynamically (on the real-time basis).

Further, since the book information management server 1704 acquires, when the contactless IC card 1851 is relatively brought close to the display apparatus 1852 by the user, user information (liking information of the user) from the customer information management server 1853 based on the user ID stored in the contactless IC card 1851 and produces recommendation information based on the user information, the user can receive provision of book information conforming to the liking of the user itself from among the books currently existing in the library. In this instance, the user can receive provision of information of books conforming to the liking thereof rapidly without the necessity to search for a book conforming to the liking of the user itself in the library. In other words, the library side can recommend books conforming to the user rapidly.

Further, since the customer information management server 1853 is connected to the Internet 1854, the same customer information management server 1853 can be utilized also by another library (selling agent). For example, if the contactless IC card 1851 is a credit card and a credit company manages the customer information management server 1853, then information can be provided to customers (users) and selling agents who make use of the credit card system.

Furthermore, while, in the example described above, books are managed, the object of the management is not limited to books, but the system can be applied to all objects such as commodities presented for sales in selling agents of clothing, furniture, books, CDs and so forth and such rented CDs as are rented from CD rental shops or the like.

Meanwhile, the information to be stored in each radio tag 1701 may be any information only if it can be used to identify a commodity (object, in the example described above, a book) on which the radio tag 1701 is mounted.

Further, while, in the example described above, the information stored in advance in the contactless IC card 1851 is only a user ID whereas user information corresponding to the user ID (for example, user information of FIG. 39) is recorded in the customer information management server 1853, the user information may otherwise be recorded in advance in the contactless IC card 1851. In this instance, since the customer information management server 1853 can acquire the user ID and the user information from the contactless IC card 1851, there is no necessity to provide the customer information management server 1853 in the system of FIG. 45.

Further, the customer information management server 1853 may be provided in a selling agent (in the example described above, a library), or the book information management server 1704 may be connected to the Internet 1854 so that it may be commonly used by another selling agent (another library).

Furthermore, while the information to be stored in advance in each radio tag 1701 is only a book ID and book information corresponding to the book ID is recorded in the book information management server 1704, the book information may be stored in advance in the radio tag 1701 together with the book ID. In this instance, since the book information management server 1704 can acquire the book ID and the book information from the radio tag 1701, only it is necessary for the book information management server 1704 to produce recommendation information.

Further, while, in the example described above, the book information management server 1704 produces recommendation information, alternatively the customer information management server 1853 or the display apparatus 1852 may produce recommendation information. For example, where the customer information management server 1853 produces recommendation information, when the user brings its contactless IC card 1851 close to the display apparatus 1852, the customer information management server 1853 acquires the book information from the book information management server 1704 and produces recommendation information based on liking information (user information) recorded in the customer information management server 1853 itself.

Furthermore, while, in the example described above, the user information is such as illustrated in FIG. 39, the user information is not limited to this but may be any information relating to the user. For example, the user information may include only liking information or may include information of a history of books (commodities) lent by the user. Also the book information may be any information relating to the book (object) similarly.

Now, examples of recommendation to be produced are described.

For example, the recommendation information may include information of a book which other users who belong to the same age group as or have a similar taste or liking to the user often lend.

Where a lending out history in the past is utilized to produce recommendation information, the lending out history of the user may be stored in the display apparatus 1852. Further, for example, the lending out history of the user read by the display apparatus 1852 may be transmitted to the customer information management server 1853 through the Internet 1854 so that it may be recorded together with the user information by the customer information management server 1853. Furthermore, the lending out history may be stored into the memory of the contactless IC card 1851. Where a lending out history is recorded in this manner, recommendation information may be produced so as to selectively recommend books conforming to books lent by the user in the past (for example, books of the same series or the like).

In summary, according to the system of FIGS. 40 to 47, if a contactless IC card 1851 owned by a user and having at least identification information of the user stored therein is relatively brought close to (mounted on) the display apparatus 1852, then the library side can recommend books (commodities) conforming to the liking of the user.

Further, the book information management server 1704 can manage all of the books in the library on the real-time basis by communicating with the radio tags 1701 through the radio access point 1702.

Further, the library side can recommend further lending out to the user while the user can find out books which match the user better.

It is to be noted that, while, in the example described above with reference to FIGS. 40 to 47, communication between the radio tags 1701 and the radio access point 1702 is utilized to manage the books, the media are not limited to them and any media may be utilized only if they perform wireless communication with each other. Further, the media are not limited to those which make use of electromagnetic induction for communication like the contactless IC card 1851 and the display apparatus 1852, but any other media may be utilized only if they perform wireless communication with each other when they are brought close to each other.

While the series of processes described above with reference to FIGS. 21 to 39 or FIGS. 40 to 47 can be executed by hardware, also it may otherwise be executed by software. In this instance, also the processes described above are executed by such a display apparatus 1034 as described hereinabove with reference to FIG. 48 in connection with the information providing system of FIG. 21.

Figure 48:
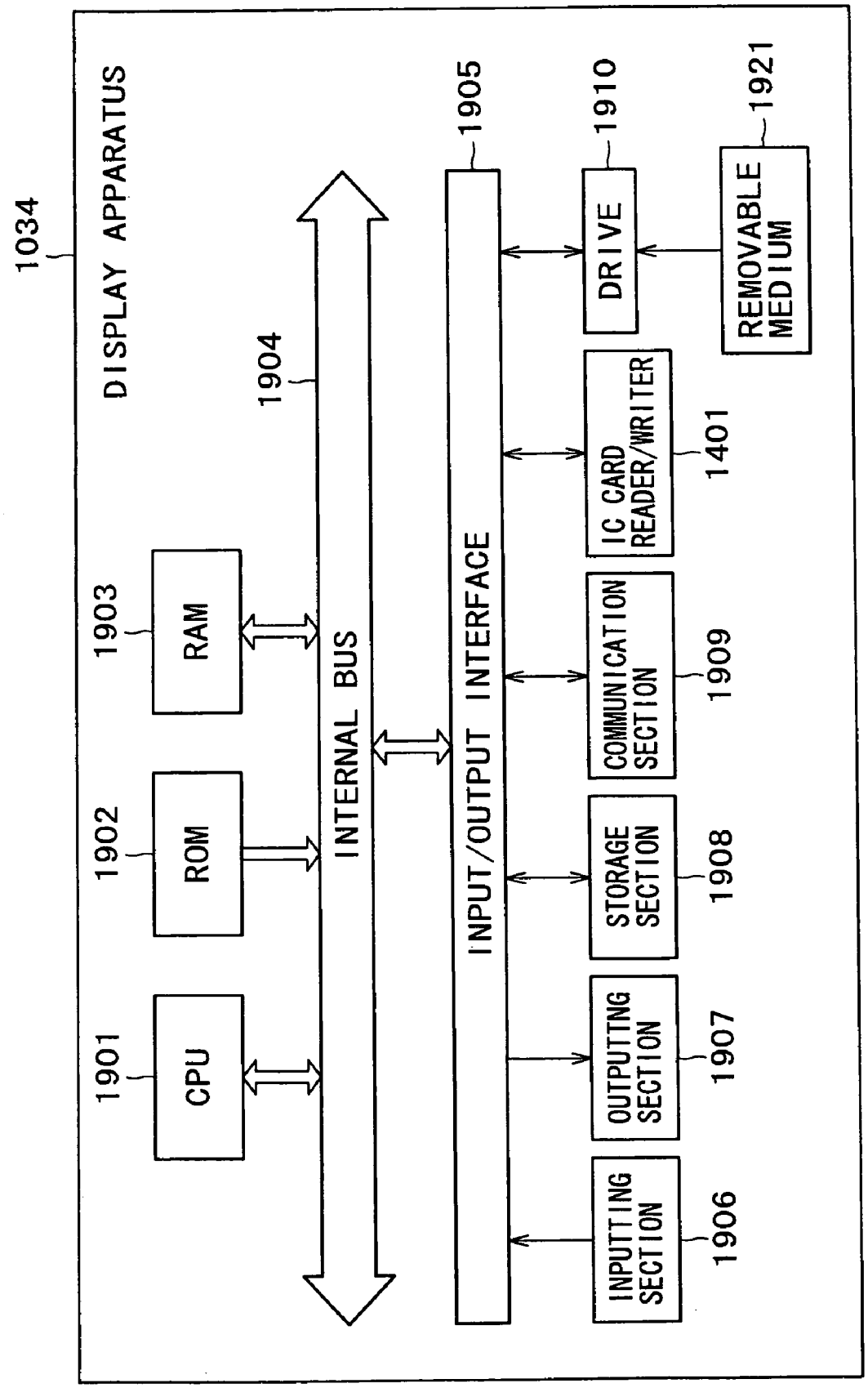
FIG. 48 is a block diagram showing another example of a configuration of a display apparatus to which the present invention is applied.

Referring to FIG. 48, a central processing unit (CPU) 1901 executes various processes in accordance with a program stored in a ROM (Read Only Memory) 1902 or a program loaded from a storage section 1908 into a RAM (Random Access Memory) 1903. Also data necessary for the CPU 1901 to execute the processes are suitably stored into the RAM 1903.

The CPU 1901, ROM 1902 and RAM 1903 are connected to one another by an internal bus 1904. Also an input/output interface 1905 is connected to the internal bus 1904.

An inputting section 1906 including a keyboard, a mouse and so forth, an outputting section 1907 including a display unit which may be a CRT or an LCD (Liquid Crystal Display) unit, a speaker and so forth, a storage section 1908 formed from a hard disk or the like, a communication section 1909 including a modem, a terminal adapter and so forth, and an IC card reader/writer 1401 are connected to the input/output interface 1905. The communication section 1909 performs a communication process through various networks including a telephone circuit and a CATV.

Further, as occasion demands, a drive 1910 is connected to the input/output interface 1905. A removable medium 1921 which may be a magnetic disk, an optical disk, a magneto-optical disk or a semiconductor memory is suitable loaded into the drive 1910, and a computer program read from the removable medium 1921 by the drive 1910 is installed into the storage section 1908 as occasion demands.

Where the series of processes is executed by software, a program which constructs the software is installed from a network or a recording medium.

The recording medium is formed as a package medium such as, as shown in FIG. 48, a removable medium 1921 which has the program recorded thereon or therein and is distributed to provide the program to a user separately from a computer. Else, the recording medium is formed as a ROM 1902, a hard disc included in the storage section 1908 in which the program is recorded and which is provided to a user in a state wherein the program is incorporated in an apparatus body in advance.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus composed of a plurality of apparatus.

While preferred embodiments of the present invention have been described using specific terms, such description is for illustrative purposes only, and it is to be understood that changes and variations may be made without departing from the spirit or scope of the following claims.

What is claimed is:

1. An information providing system comprising:
  a first information processing apparatus configured to utilize electromagnetic induction to transmit first information;
  a second information processing apparatus configured to utilize electromagnetic induction to receive the first information from said first information processing apparatus and transmit the first information and second information; and
  a display apparatus configured to utilize electromagnetic induction to receive the first and second information from said second information processing apparatus;
  said first information processing apparatus including a first storage unit configured to store the first information including at least identification information corresponding to an object on which said first information processing apparatus is mounted, and a first transmission unit configured to utilize electromagnetic induction to transmit the first information stored in said first storage unit to said second information processing apparatus;
  said second information processing apparatus including a first reception unit configured to utilize electromagnetic induction to receive the first information transmitted from said first transmission unit, a second storage unit configured to store the second information including identification information of a user, and a second transmission unit configured to transmit the first information received by said first reception unit and the second information stored in said second storage unit to said display apparatus;

said display apparatus including a second reception unit configured to receive the first and second information transmitted from said a second transmission unit, a production unit configured to produce recommendation information corresponding to predetermined user preferences as related to the first and second information received by said second reception unit, and a display configured to perform a displaying process based on the recommendation information produced by said production unit.

2. An information providing method for an information providing system which includes a first information processing apparatus for utilizing electromagnetic induction to transmit first information stored therein, a second information processing apparatus for utilizing electromagnetic induction to receive the first information from said first information processing apparatus and transmitting second information stored therein together with the first information, and a display apparatus for utilizing electromagnetic induction to receive the first and second information from said second information processing apparatus, comprising:

transmitting said first information processing apparatus of utilizing electromagnetic induction to transmit the stored first information including at least identification information corresponding to an object on which said first information processing apparatus is mounted to said second information processing apparatus;

receiving said second information processing apparatus of utilizing electromagnetic induction to receive the transmitted first information and transmitting the first information and the stored second information including identification information of a user to said display apparatus; and producing by said display apparatus recommendation information corresponding to predetermined user preferences related to the received first and second information, and performing a displaying process based on the produced recommendation information.

3. An information processing apparatus which utilizes electromagnetic induction to transmit information, comprising:

a reception unit configured to use electromagnetic induction to receive first information including at least identification information corresponding to an object on which a first different information processing apparatus is mounted from the first different information processing apparatus;

a storage unit configured to store second information including identification information of a user in advance and storing the first information received by said reception unit;

a transmission unit configured to use electromagnetic induction to transmit the first and second information stored in said storage unit to a second different information processing apparatus; and a production unit configured to produce recommendation information based on said first and second information and predetermined user preferences.

4. An information processing apparatus according to claim 3, wherein the first information received by said reception unit includes not only the identification information corresponding to the object but also object information which is detailed information of the object.

5. An information processing apparatus according to claim 3, wherein the second information stored in said storage unit includes not only the identification information of the user but also liking information regarding liking of the user.

6. An information processing method for an information processing apparatus which utilizes electromagnetic induction to transmit information, comprising the steps of:

utilizing electromagnetic induction to receive first information including at least identification information corresponding to an object on which a first different information processing apparatus is mounted from the first different information processing apparatus;

storing the received first information;

utilizing electromagnetic induction to transmit the stored first information together with second information stored in advance and including identification information of a user to a second different information processing apparatus; and producing recommendation information based on said first and second information and predetermined user preferences.

7. A computer program product for controlling an information processing apparatus which utilizes electromagnetic induction to transmit information, said program causing a computer to execute the steps of:

utilizing electromagnetic induction to receive first information including at least identification information corresponding to an object on which a first different information processing apparatus is mounted from the first different information processing apparatus;

storing the received first information;

utilizing electromagnetic induction to transmit the stored first information together with second information stored in advance and including identification information of a user to a second different information processing apparatus; and producing recommendation information based on said first and second information and predetermined user preferences.

8. A display apparatus which utilizes electromagnetic induction to receive information, comprising:

a reception unit configured to use electromagnetic induction to receive first information including identification information of a user and second information including identification information corresponding to an object on which a first different information processing apparatus is mounted from a second different information processing apparatus;

a production unit configured to produce recommendation information corresponding to predetermined user preferences as they relate to the first and second information received by said reception unit; and a display unit configured to perform a displaying process based on the recommendation information produced by said production unit.

9. A display apparatus according to claim 8, wherein the first information received by said reception unit includes not only the identification information of the user but also liking information regarding liking of the user.

10. A display apparatus according to claim 8, wherein the second information received by said reception unit includes not only the identification information corresponding to the object but also object information which is detailed information of the object.

11. A display apparatus according to claim 8, further comprising a recording unit configured to record liking information regarding liking of the user corresponding to the identification information of the user included in the first information to be received by said reception unit, said production unit acquiring the liking information recorded in said recording unit based on the first information received by said reception unit and producing the recommendation information based on the liking information and the second information.

12. A display apparatus according to claim 8, further comprising a recording unit configured to record object information which is detailed information of the object and corresponds to the identification information regarding the object included in the second information received by said reception unit, said production unit acquiring the object information recorded in said recording unit based on the second information received by said reception unit and producing the recommendation information based on the object information and the first information.

13. A display method for a display apparatus which utilizes electromagnetic induction to receive information, comprising the steps of:
   utilizing electromagnetic induction to receive first information including identification information of a user and second information including identification information corresponding to an object on which a first different information processing apparatus is mounted from a second different information processing apparatus;
   producing recommendation information corresponding to predetermined user preferences as they relate to the received first and second information; and
   performing a displaying process based on the produced recommendation information.

14. A program for controlling a display apparatus which utilizes electromagnetic induction to receive information, said program causing a computer to execute the steps of:
   utilizing electromagnetic induction to receive first information including identification information of a user and second information including identification information corresponding to an object on which a first different information processing apparatus is mounted from a second different information processing apparatus;
   producing recommendation information corresponding to predetermined user preferences as they relate to the received first and second information; and
   performing a displaying process based on the produced recommendation information.

15. An information providing system for providing information, comprising:
   an acquisition unit configured to acquire first information including identification information corresponding to an object of mounting and second information including identification information of a user;
   a requesting unit configured to issue a request for recommendation information to the user;
   a acceptance-unit configured to accept the request for recommendation information from said requesting unit;
   a production unit configured to produce, when the request for recommendation information is accepted by said acceptance unit, the recommendation information based on the first and second information acquired by said acquisition unit and predetermined user preferences; and
   a display unit configured to perform a displaying process based on the recommendation information produced by said production means.

16. An information providing method for an information providing system for providing information, comprising:
   acquiring first information including identification information corresponding to an object of mounting and second information including identification information of a user;
   issuing a request for recommendation information to the user;
   accepting the request for recommendation information by the process of the requesting step;
   producing, when the request for recommendation information is accepted by the process of the acceptance step, the recommendation information based on the first and second information acquired by the process of the acquisition step and predetermined user preferences; and
   controlling a displaying process based on the recommendation information produced by the process of the production step.

17. An information processing apparatus for processing information, comprising:
   a acquisition unit configured to acquire first information including identification information of an object on which a first different information processing apparatus is mounted and second information including identification information of a user;
   a acceptance unit configured to accept a request for recommendation information to the user; and
   a production unit, when the request for recommendation information is accepted by said acceptance unit, the recommendation information based on the first and second information acquired by said acquisition unit and predetermined user preferences.

18. An information processing apparatus according to claim 17, further comprising:
   a storage unit configured to store object information which is detailed information of the object corresponding to the identification information of the object; and
   a identification unit configured to identify whether or not the first different information processing apparatus is present based on the first information acquired by said acquisition unit and the object information stored in said storage unit.

19. An information processing apparatus according to claim 18, further comprising:
   a requesting unit configured to request, when the request for recommendation information is accepted by said acceptance unit, a second different information processing apparatus for liking information representative of liking of the user based on the identification information of the user; and
   a reception unit configured to receive the liking information transmitted from the second different information processing apparatus in response to the request from said requesting means.

20. An information processing apparatus according to claim 17, wherein the first information acquired by said acquisition unit is identification information of a genre corresponding to the object.

21. An information processing apparatus according to claim 17, wherein the first information acquired by said acquisition unit further includes, in addition to the identification information of the object, object information which is detailed information of the object.

22. An information processing apparatus according to claim 17, wherein the second information acquired by said acquisition unit further includes, in addition to the identification information of the user, liking information representative of liking of the user.

23. An information processing apparatus according to claim 17, further comprising a transmission unit configured to transmit the recommendation information produced by said production unit to a display apparatus which performs a display process based on the recommendation information.

24. An information processing apparatus according to claim 17, further comprising:
  a requesting unit configured to request, when the request for recommendation information is accepted by said acceptance means, a second different information processing apparatus for object information which is detailed information of the object based on the identification information of the object; and
  reception unit configured to receive the object information transmitted from the second different information processing apparatus in response to the request from said requesting unit.

25. An information processing apparatus according to claim 17, further comprising storage unit configured to store liking information representative of liking of the user corresponding to the second information.

26. An information processing apparatus according to claim 17, further comprising storage unit configured to store object information which is detailed information of the object corresponding to the identification information of the object.

27. An information processing method for an information processing apparatus for processing information, comprising:
  acquiring first information including identification information of an object on which a first different information processing apparatus is mounted and second information including identification information of a user;
  accepting a request for recommendation information to the user; and
  producing, when the request for recommendation information is accepted by the process of the acceptance step, the recommendation information based on the first and second information acquired by the process of the acquisition step and predetermined user preferences.

28. A computer program product for processing information, said program causing a computer to execute the steps of:
  acquiring first information including identification information of an object on which a first different information processing apparatus is mounted and second information including identification information of a user;
  accepting a request for recommendation information to the user; and
  producing, when the request for recommendation information is accepted by the process of the acceptance step, the recommendation information based on the first and second information acquired by the process of the acquisition step and predetermined user preferences.

* * * * *